United States Patent
Jackson et al.

(10) Patent No.: US 9,674,087 B2
(45) Date of Patent: Jun. 6, 2017

(54) PERFORMING A MULTI-STAGE LOOKUP TO CLASSIFY PACKETS

(71) Applicant: Nicira, Inc., Palo Alto, CA (US)

(72) Inventors: Ethan J. Jackson, San Francisco, CA (US); Jarno Rajahalme, Belmont, CA (US)

(73) Assignee: NICIRA, INC., Palo Alto, CA (US)

( * ) Notice: Subject to any disclaimer, the term of this patent is extended or adjusted under 35 U.S.C. 154(b) by 35 days.

(21) Appl. No.: 14/487,060

(22) Filed: Sep. 15, 2014

(65) Prior Publication Data

US 2015/0078386 A1    Mar. 19, 2015

Related U.S. Application Data

(63) Continuation-in-part of application No. 14/069,284, filed on Oct. 31, 2013.

(60) Provisional application No. 61/878,032, filed on Sep. 15, 2013, provisional application No. 61/986,070, filed on Apr. 29, 2014.

(51) Int. Cl.
*H04L 12/743* (2013.01)
*H04L 29/06* (2006.01)
*H04L 12/721* (2013.01)

(52) U.S. Cl.
CPC .......... *H04L 45/7453* (2013.01); *H04L 69/22* (2013.01); *H04L 45/38* (2013.01)

(58) Field of Classification Search
CPC ...... H04L 45/7453; H04L 69/22; H04L 45/38
See application file for complete search history.

(56) References Cited

U.S. PATENT DOCUMENTS

| | | | | |
|---|---|---|---|---|
| 6,118,760 A | * | 9/2000 | Zaumen | G06F 17/30982 370/229 |
| 6,633,565 B1 | | 10/2003 | Bronstein et al. | |
| 9,036,636 B1 | * | 5/2015 | Sherwood | H04L 45/04 370/392 |

(Continued)

FOREIGN PATENT DOCUMENTS

KR    2014126387 A1 *  8/2014  ......... H04L 47/2491

OTHER PUBLICATIONS

Curtis, Andrew R., et al., "DevoFlow: Scaling Flow Management for High-Performance Networks," SIGCOMM '11, Aug. 15-19, 2011, pp. 254-265, ACM.

(Continued)

*Primary Examiner* — Michael C Lai
(74) *Attorney, Agent, or Firm* — Adeli LLP

(57) ABSTRACT

Some embodiments provide a method for a forwarding element that forwards packets. The method receives a packet. The method performs a first stage lookup of a hash table for a first hash of a first set of header fields and un-wildcards bits of a wildcard mask that corresponds to the first set of header fields. If a matching hash is found in the first stage lookup, the method performs a second stage lookup of the hash table for a second hash of a second set of header fields and un-wildcards bits of the wildcard mask that corresponds to the second set of header fields. The method identifies a matching rule for the packet. The method generates a flow based on the matching rule and the wildcard mask, wherein the flow is used to process each other packets that match each bit which is un-wildcarded.

20 Claims, 65 Drawing Sheets

(56) References Cited

U.S. PATENT DOCUMENTS

| | | | |
|---|---|---|---|
| 9,042,234 B1 * | 5/2015 | Liljenstolpe | H04L 45/00 370/238 |
| 9,203,771 B1 | 12/2015 | Cai et al. | |
| 9,244,843 B1 | 1/2016 | Michels et al. | |
| 2002/0089931 A1 | 7/2002 | Takada et al. | |
| 2003/0214948 A1 | 11/2003 | Jin et al. | |
| 2004/0225638 A1 * | 11/2004 | Geiselhart | G06F 17/3061 |
| 2007/0192543 A1 | 8/2007 | Naik et al. | |
| 2009/0039884 A1 * | 2/2009 | Schiano | G01R 33/441 324/307 |
| 2009/0161547 A1 | 6/2009 | Riddle et al. | |
| 2013/0163427 A1 * | 6/2013 | Beliveau | H04L 67/327 370/235 |
| 2014/0098669 A1 * | 4/2014 | Garg | H04L 47/12 370/235 |
| 2014/0226661 A1 | 8/2014 | Mekkattuparamban et al. | |
| 2014/0233421 A1 | 8/2014 | Matthews | |
| 2014/0280822 A1 | 9/2014 | Chennimalai Sankaran et al. | |
| 2014/0369348 A1 | 12/2014 | Zhang et al. | |
| 2015/0078384 A1 | 3/2015 | Jackson et al. | |
| 2015/0078385 A1 | 3/2015 | Shelly et al. | |
| 2015/0092778 A1 | 4/2015 | Jackson et al. | |
| 2015/0169457 A1 | 6/2015 | Jackson et al. | |

OTHER PUBLICATIONS

Matsumoto, Nobutaka, et al., "LightFlow: Speeding Up GPU-based Flow Switching and Facilitating Maintenance of Flow Table," 2012 IEEE 13th International Conference on High Performance Switching and Routing, Jun. 24, 2012, pp. 76-81, IEEE.

Tung, Ye, "A flow catching mechanism for fast packet forwarding," Computer Communications, Apr. 19, 2001, pp. 1-6, Elsevier.

Zadnik, Martin, et al., "Evolution of Cache Replacement Policies to Track Heavy-hitter Flows," ANCS '10, Oct. 25-26, 2010, 2 pages, ACM.

* cited by examiner

*= Wildcard Field

1805

| Rule | Priority | Match | Actions |
|---|---|---|---|
| 1 | 1000 | tp_dst == 80 | drop |
| 2 | 1000 | tp_dst == 443 | drop |
| 3 | 500 | dl_src == 01:xx:xx | reg1 <= reg5, reg4 <= 1, goto next table |

1810

| Rule | Priority | Match | Actions |
|---|---|---|---|
| 1 | 1000 | reg4 == 1 | output:2 |

1815

| Match | Actions |
|---|---|
| tp_dst == 80 ∪ 443 | drop |
| dl_src = 01:xx:xx − { tp_dst == 80 ∪ 443 } | reg1 <= reg5, reg4 <= 1, output(2) |

*FIG. 18*

| Subtable 2400 | | | |
|---|---|---|---|
| Reg. | Reg., L2 | Reg., L2, L3 | Reg., L2, L3, L4 |
| Hash Value | Hash Value | Hash Value | Hash Value |
| Hash Value | Hash Value | Hash Value | Hash Value |
| Hash Value | Hash Value | Hash Value | Hash Value |
| ••• | ••• | ••• | ••• |
| Stage One 2405 | Stage Two 2410 | Stage Three 2415 | Stage Four 2420 |

*FIG. 24*

Classifier Rule #1: 1.0.0.0/8 (00000001.00000000.00000000.00000000)
Classifier Rule #2: 128.1.0.0/16 (10000000.00000001.00000000.00000000)

| 0001000100010001 | | 0001000000000000 |
|---|---|---|
| Diff Mask | | Wildcard Mask |

| 0001000100010001 | | 0000000000000001 |
|---|---|---|
| Diff Mask | | Wildcard Mask |

*FIG. 52*

Packet Header 1100

(! Packet Header) 0011

Classifier Rule #1 1111

Classifier Rule #2 1010

Wildcard Mask 0010

0=Wildcarded
1=Un-wildcarded

*FIG. 62*

| in_port | eth_src | eth_dst | eth_type | ip_src | ip_dst | proto | tos | ttl | frag | icmp_type | icmp_code | packets | bytes | used | action |
|---|---|---|---|---|---|---|---|---|---|---|---|---|---|---|---|
| 3 | 50:54:00:00:00:03 | 50:54:00:00:00:01 | 0x0800 | 192.168.0.02/0.0.0.0 | 192.168.0.01/0.0.0.0 | 1/0 | 0/0 | 64/0 | no/0x2 | 0/0 | 0/0 | 95 | 9310 | 0.425s | 2 |
| 2 | 50:54:00:00:00:01 | 50:54:00:00:00:03 | 0x0800 | 192.168.0.01/0.0.0.0 | 192.168.0.02/0.0.0.0 | 1/0 | 0/0 | 64/0 | no/0x2 | 0/0 | 0/0 | 95 | 9310 | 0.425s | 3 |

PERFORMING A MULTI-STAGE LOOKUP TO CLASSIFY PACKETS

CLAIM OF BENEFIT TO PRIOR APPLICATIONS

This application claims the benefit of U.S. Provisional Patent Application 61/878,032, filed on Sep. 15, 2013, and U.S. Provisional Patent Application 61/986,070, filed on Apr. 29, 2014. This application is also a continuation in part application of U.S. patent application Ser. No. 14/069,284, filed on Oct. 31, 2013, now published as U.S. Pat. No. 9,602,398. U.S. patent application Ser. No. 14/069,284 claims benefit to U.S. Provisional Patent Application 61/878,032, filed on Sep. 15, 2013. U.S. Patent Applications 61/986,070, 61/878,032, and Ser. No. 14/069,284, now published as U.S. Pat. No. 9,602,398, are incorporated herein by reference.

BACKGROUND

Many current enterprises have large and sophisticated networks comprising switches, hubs, routers, servers, workstations and other network devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components.

In response, there is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Typically, the shared network switching elements are software switching elements. A software switching element brings many features that are standard in a hardware switch to virtualized environments. The software switching element can also be more flexible than the hardware switch. For instance, the software switching element can be programmed to emulate a traditional switch pipeline or can be programmed to extend for new models.

One of the main challenges in developing such a software switching element is performance. A hardware switch has application-specific integrated circuits (ASICs) that are specifically designed to support in-hardware forwarding. The problem with a software switch is that it operates on a host (e.g., x86 box), such as a hypervisor. Thus, methods for increasing the performance of the software switching element are needed.

BRIEF SUMMARY

Embodiments described herein provide a forwarding element that uses at least one of several different algorithms to generate a flow in order to process packets. In some embodiments, the flow is associated with a wildcard mask that informs the forwarding element which bits of a set of match fields in the flow are significant when matching. This means that the forwarding element can ignore the remaining wildcarded bits. As an example, when a packet is received, the forwarding element can process the packet using the flow as long as the bits of the header match each non-wildcarded bit of that flow.

In some embodiments, the different algorithm includes (1) a tuple space search algorithm, (2) a staged lookup algorithm, (3) a number of different prefix tracking algorithms, and (4) a number of different common match algorithms. The forwarding element of some embodiments can process packets using one or more of these different algorithms. As an example, the forwarding element of some embodiments uses a staged lookup algorithm in combination with Layer 3 and/or Layer 4 prefix tracking algorithms. As another example, the forwarding element can use a staged lookup algorithm in combination with a common match algorithm.

In some embodiments, the forwarding element uses a staged lookup algorithm to generate a flow that is associated with a wildcard mask. The staged lookup of some embodiments takes into account the fact that some header fields may change more frequently than others. Based on this fact, it performs a multi-staged search starting with infrequently changing fields, and progressing to frequently changing ones. The ordering of the different stages is important because the staged algorithm of some embodiments is essentially holding off on searching the frequently changing fields (e.g., L3 and L4 fields) until it is necessary to do so. One of the motivations for the staged lookup algorithm, and other algorithms described herein, such as the common match algorithms and prefix tracking algorithms, is to avoid unnecessarily un-wildcarding more bits than necessary; and thereby, optimizing the datapath lookup or cache lookup by matching on fewer bits.

In utilizing the staged lookup algorithm, the forwarding element of some embodiments does not look at all the fields (e.g., in a hash table) at once but first looks at those fields that do not change frequently. If none of those fields matches, the switching element terminates the lookup operation without having to lookup fields that change frequently. For instance, when a packet is received, the forwarding element of some embodiments performs a first stage lookup of a hash table (e.g., a subtable) for a first hash of a first set of header fields and un-wildcards bits of a wildcard mask that corresponds to the first set of header fields. If a matching hash is found in the first stage lookup, the forwarding element performs a second stage lookup of the hash table for a second hash of a second set of header fields and un-wildcards bits of the wildcard mask that corresponds to the second set of header fields. However, if the first stage lookup resulted in no matching hash value, the forwarding element terminates search of that hash table and moves onto the next hash table.

In some embodiments, the forwarding element consults a set of one or more trees when dynamically generating a wildcard mask for a flow. The forwarding element of some embodiments builds a tree structure that includes a set of rules as child nodes (e.g., by segmenting children based on '1' or '0'). When the classifying a new packet, the forwarding element then traverse the tree structure, un-wildcarding bits along the way, starting with the root until it reaches a branch with no leaves. In some embodiments, the set of match fields relates to a set of Layer N header fields. For instance, the tree structure can be built using Layer 3 source or destination IP addresses associated with different rules. As another example, the tree structure can be built using Layer 4 destination and/or source TCP port numbers.

The forwarding element of some embodiments uses a common match algorithm to generate a wildcard mask for a flow. The common match algorithm of some embodiments examines a set of one or more rules to find a "common match". That is, the algorithm attempts to find one or more bits at different positions in which each rule in the set of rules shares with one another. The algorithm then attempts to find the position of one bit from the packet header, which has a different value than the shared bit at the same bit position. The algorithm then unmasks the corresponding bit from the wildcard mask.

In some embodiments, when the forwarding element receives a packet, it examines several rules to find a common match, which includes a set of one or more bits that the rules have in common with one another. The forwarding element then identifies the position of a diff bit from the packet header. The diff bit is a bit from the packet header that is different from a bit in the common match. Once identified, the forwarding element of some embodiments generates a wildcard mask by unmasking a bit from the wildcard mask that is at the same bit position as the position of the diff bit. The forwarding element then processes the packet and generates a flow that is associated with the wildcard mask. Different from an exact match microflow, the flow is used to process each packet that match each bit that is unmasked in accordance with the wildcard mask.

In examining different rules, the forwarding element of some embodiments generates a common match data set that includes a common match value and a common match mask. The common match value identifies the value of each common bit, and the common match mask identifies the position of the common bit. In some embodiments, the common match value is initialized using the value of one of the rules, and the common match mask is initialized using a mask associated with a hash table.

In examining different rules, the forwarding element of some embodiments folds each other rule into the common match data set. The fold operation can entail calculating shared bit data to determine which zero or more bits are shared between the other rule and the common match value. The fold operation can further entail calculating a new common match mask that takes into account that other rule. The fold operation of some can further entail calculating a new common match value to set all of the bits that are not part of the common match mask to zero.

In some embodiments, the forwarding element identifies the position of the diff bit by calculating a value that indicates which zero or more bits is different from the packet header and the common match value. The forwarding element then generates a diff mask by restricting the calculated value to only each bit that is common between all of the rules. The forwarding element of some embodiments then generates the wildcard mask by choosing one bit from the diff mask and unmasking the corresponding bit from the wildcard mask.

Some embodiments extend the common bit test to include a test of multiple bits if necessary. That is, the multi-bit common match algorithm of some embodiments can be used to disqualify one set of one or more rules using a first bit and each other set of rules using a second different bit. By different, the first bit and each other bit can be at the same bit position if the bits are the same, but the two bits cannot be at the same bit position if the bits are not the same. This is because the packet, depending on the header value, will match one of the two sets of contradictory rules, which means that the one set of rules is not disqualified. Thus, one of the keys to the multi-bit common match algorithm is identifying, from the sets of rules, the different shared bits at different bit positions, where each bit disqualifies at least one set of rule in the sets of rule, and all sets of rules are disqualified.

In some embodiments, when the forwarding element receives a packet, it identifies different diff bits for different sets of rules. Each diff bit is a bit in the packet header that is different from a shared bit of one of the sets of rules. The forwarding element then generates a wildcard mask by unmasking multiple bits from the wildcard mask in accord with the positions of the different diff bits. The forwarding element then processes the packet and generates a flow that is associated with the wildcard mask.

The forwarding element of some embodiments examines the different sets of rules to find common matches, where each common match includes a set of one or more bits, which each rule in one of the sets of rules, have in common with one another. The forwarding element may examine the different sets of rules by generating, for each set of rule, a common match data set that includes a common match value and a common match mask. The forwarding element of some embodiments then attempts to fold each rule in a set of rules into one of the common match data sets. In some embodiments, the forwarding element creates a new common match data set if the fold operation results in the common match data set indicating that the set of rules collectively have no bits in common. The forwarding element then chooses one bit from each common match mask and unmasks the corresponding bit from the wildcard mask.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 18 provides an illustrative example how some embodiments cross product several tables in the slow path packet processing pipeline.

FIG. 24 illustrates an example subtable that shows the organization of different fields in different stages.

FIG. 52 conceptually illustrates several examples of generating a wildcard mask from a diff mask.

FIG. 62 illustrates an example of how different common match algorithms can start with a packet rather than a rule.

FIG. 64 illustrates several examples of flows that are stored in a datapath cache.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a switching element that receives a packet and processes the packet by dynamically generating a flow entry with a set of wildcard fields. The switching element then caches the flow entry and processes any subsequent packets that have header values that match the flow entry's non-wildcard match fields. In other words, each subsequent packet does not have to have header values that match all of the flow entry's match fields but only its non-wildcard fields. By generating a flow entry with such wildcard fields, the switching element does not have to generate a new flow entry when it receives a similar packet with one or more different header values. The switching element can continue to process such a similar packet as long as its header values match the non-wildcard fields.

Figure 1:
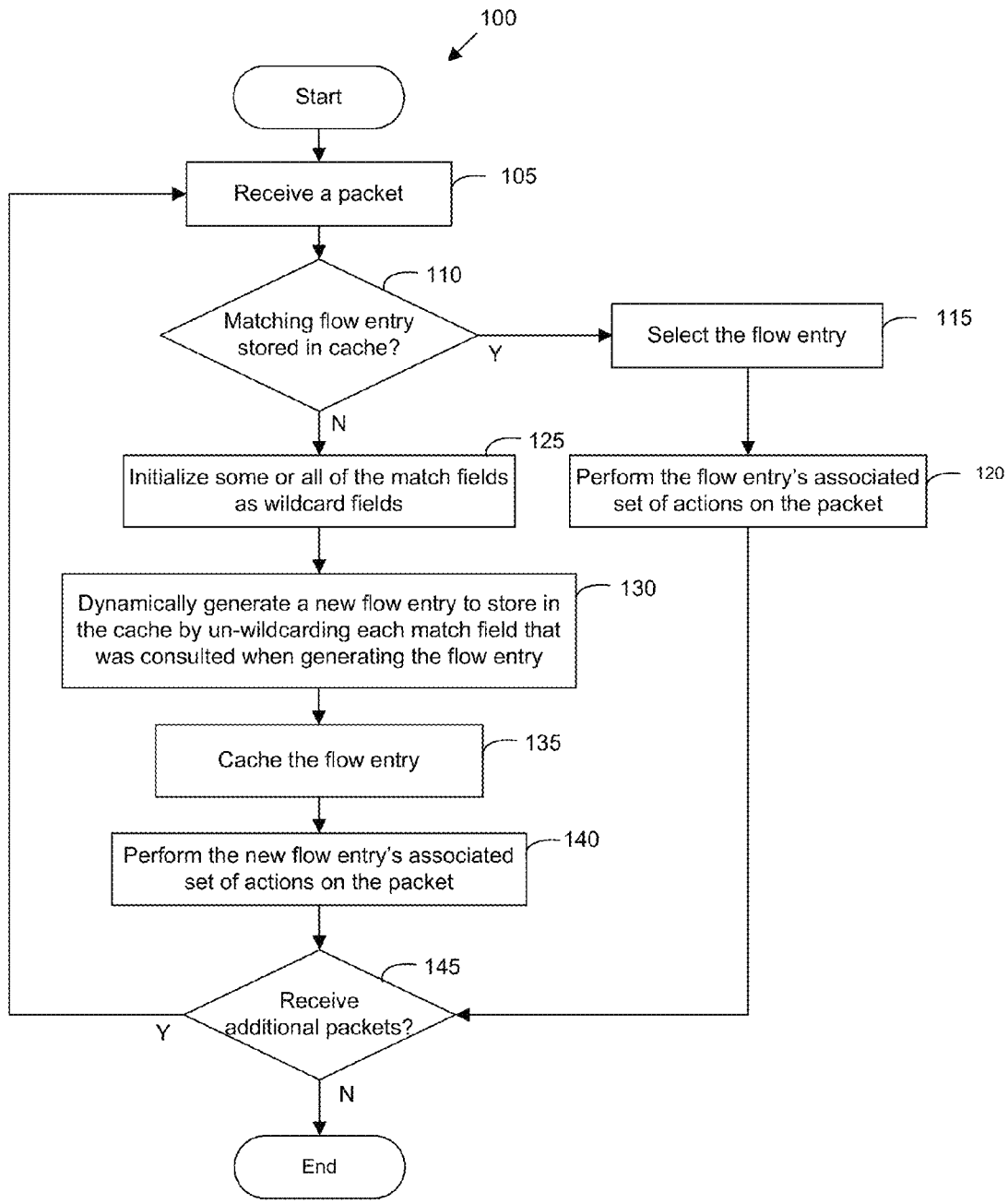
FIG. 1 conceptually illustrates a process that some embodiments use to generate a flow with zero or more wildcard fields.

FIG. 1 conceptually illustrates a process 100 that some embodiments use to process packets. Specifically, the process 100 illustrates an example of dynamically generating a flow with zero or more wildcard fields. In some embodiments, the process 100 is performed by a switching element. The process 100 begins when it receives (at 105) a packet. The process 100 then determines (at 110) whether there is a flow entry stored in the cache that can process the packet. In particular, it determines whether there is a flow entry in which all of its non-wildcard fields match the corresponding header values. If a matching flow entry is found, the process 100 selects (at 115) the flow entry. The process 100 then performs (at 120) a set of actions on the packet according to the selected flow entry.

When there is a miss in the cache, the process 100 dynamically generates a new flow entry. In generating the flow entry, the process 100 initializes (at 125) some or all match as wildcard fields. The process 100 then generates (at 130) a new flow entry by un-wildcarding each match field that was consulted or examined when generating the flow entry. That is, it un-wildcards each match field that it cared about (e.g., looked at) during the generation of the flow entry.

The process 100 of some embodiments generates a flow entry with wildcard fields based on one or more flows in a set of one or more flow tables. As an example, when a packet is received, the process 100 may select a flow from a flow table and un-wildcards each match field that is compared against a packet header value. In some embodiments, the match field is un-wildcarded regardless of whether there was a match between the match field and the header value. The process 100 may iteratively select the next flow in the flow table until a matching flow is found. If a matching flow is found, it then generates a flow entry with zero or more wildcard fields, depending on the number of remaining wildcard match fields. In some cases, the process 100 may recirculate to find one or more other matching flows to generate one consolidated flow entry for multiple flows from one or more flow tables.

In some embodiments, the process 100 uses one of several different classification algorithms to find a matching flow. Examples of such algorithms include a tuple space search algorithm and a staged lookup algorithm. These algorithms will be described below in Section V below.

Alternatively, or conjunctively with such matching, the process 100 of some embodiments un-wildcards match fields based on an action associated with a matching flow. As an example, the process 100 of some embodiments can be configured to do normal L2 processing. In such cases, the process 100 may use a media access control address (MAC) learning algorithm to derive an output port for a given packet based on a set of one or more packet header values. The process 100 can use the algorithm to identify a MAC address of a machine (e.g., a virtual machine) that is connected to its port or attached to its virtual interface. The process 100 can then compare the MAC address to the header's destination Ethernet address and specify an output port if the addresses matches one another. Since the destination MAC address has been looked at, the process 100 can then un-wildcards the corresponding match field when generating the wildcard flow.

As shown in FIG. 1, upon generating the flow entry, the process 100 then stores (at 135) the flow entry in the cache. The process 100 caches the flow entry so that it can process 100 any subsequent packets with header values that match all of the flow's non-wildcard fields. The process 100 performs (at 140) the new flow entry's associated set of actions of the received packet. The process 100 then waits (at 145) for additional packets. If there is another packet, the process 100 returns to 105, which is described above. Otherwise, the process 100 then ends.

Some embodiments perform variations on the process 100. The specific operations of the process 100 may not be performed in the exact order shown and described. The specific operations may not be performed in one continuous series of operations, and different specific operations may be performed in different embodiments.

Figure 2:
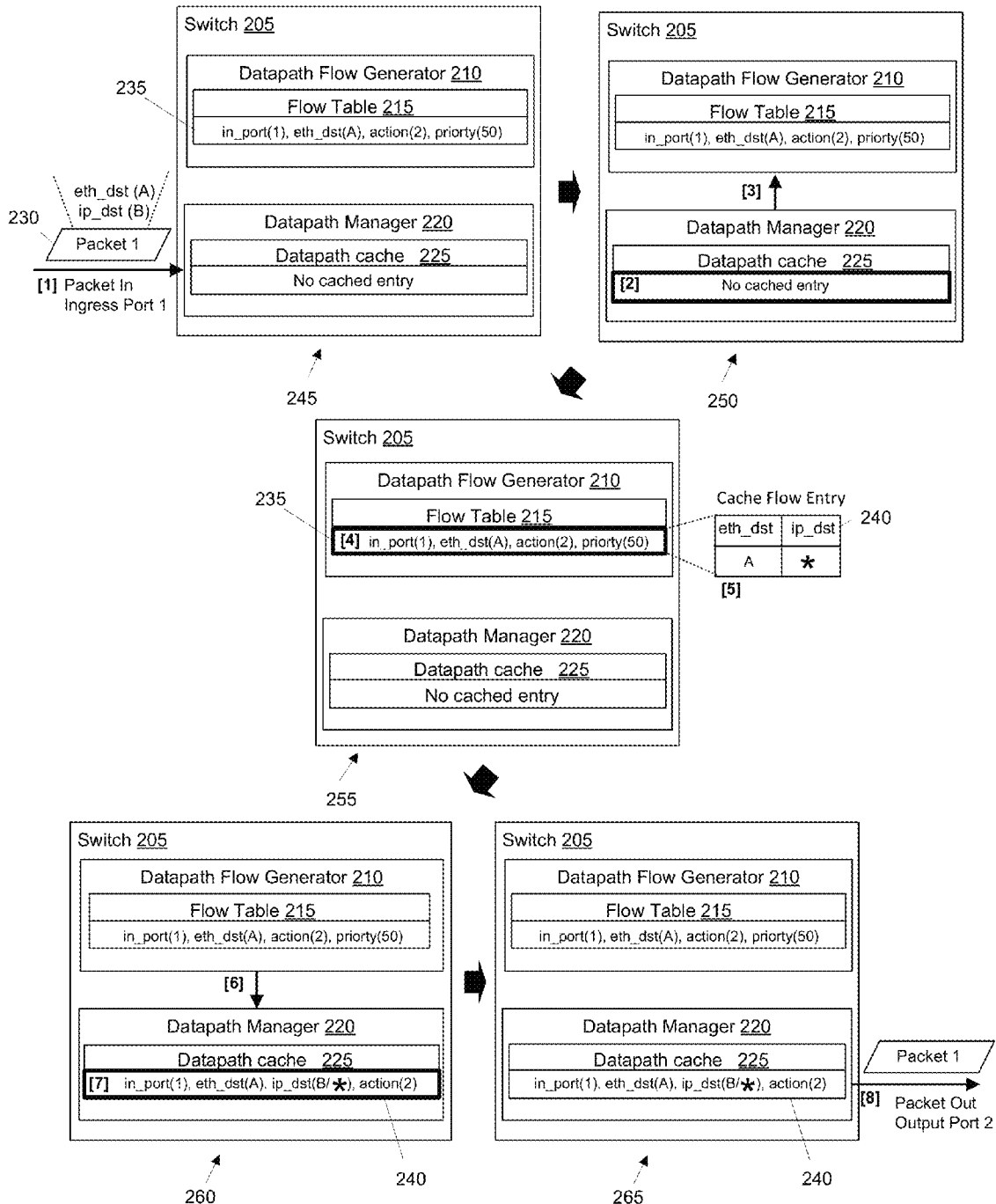
FIG. 2 illustrates an example of a switching element that dynamically generates a flow with a wildcard field.

Having described one example process, several additional examples of generating and using wildcard flows will now be described by reference to FIGS. 2 and 3. FIG. 2 illustrates an example of dynamically generating a wildcard flow. Specifically, this figure shows a switching element 205 that examines a flow entry in a flow table and generates a cache flow entry with at least one wildcard field. This example is shown in terms of five stages of operations 245-265 of the switching element. The switching element 205 includes a datapath flow generator 210 and a datapath manager 220.

In many of the examples described below, the term "wildcarded" is used interchangeably with the word "masked", and the term "un-wildcarded" is used interchangeably with the term "unmasked". In some embodiments, the term "wildcarded" means that a set of one or more bits associated with a wildcard mask is set to 0, and the term "un-wildcarded" means that the set of bits is set to 1. Accordingly, the term "masked" is used in a general sense, which means it has hidden or concealed one or more bits (e.g., by setting the bits of the wildcard mask to 0). Likewise, the term "unmasked" is used in a general sense, which means it has un-hidden or revealed one or more bits (e.g., by setting the bits of the wildcard mask to 1). In other words, the term "masked" as used herein does not mean a set of bits is "un-wildcarded", and term "un-masked" as used herein does not mean the set of bits is "wildcarded".

The switching element 205 forwards data (e.g., data frames, packets, etc.) from one network node (e.g., machine) to one or more other network nodes. The switching element 205 can receive packets and can process those packets according to a set of flow entries in one or more flow tables (e.g., the flow table 215). The switching element 205 of some embodiments is a software or virtual switch. In some embodiments, a software is formed by storing its flow table(s) and logic in the memory of a standalone device (e.g., a standalone computer), while in other embodiments, it is formed by storing its flow table(s) and logic in the memory of a device (e.g., a computer) that also executes a hypervisor and one or more virtual machines on top of that hypervisor.

The datapath flow generator 210 is a component of the switching element 205 that makes switching decisions. The datapath manager 220 receives the switching decisions, caches them, and uses them to process packets. For instance, when a packet comes in, the datapath manager 220 first checks the datapath cache 225 to find a matching flow entry. If no matching entry is found, the control is shifted to the datapath flow generator 210. The datapath flow generator 210 then examines a flow table (e.g., the flow table 215) to generate a flow to push down to the datapath cache 225. In this manner, when any subsequent packet is received, the datapath manager 220 can quickly process the packet using the cached flow entry. The datapath manager 220 provides a fast path to process each packet. However, the switching decisions are ultimately made through the datapath flow generator 210, in some embodiments.

The process of determining what to do when there is a missed in the cache can be an expensive operation. The process must be performed each time there is a miss in the cache. The switching element 205 must perform a number of different tasks to generate a flow entry to store in the datapath cache 225. As an example, the datapath flow generator 210 must iterate through one or more flow tables to find a matching flow entry. This can entail dynamically generating a flow based on a default rule if no matching table entry is found. For instance, the switching element can be configured to do normal L2 and/or L3 processing for any packet without a matching flow entry. The generation of a flow entry to store in the cache can also entail performing a number of resubmits, and deriving or learning output ports, etc.

To speed up processing, the switching element 205 of some embodiments supports flows with wildcards instead of only exact match flows. In particular, it generates a flow with one or more wildcards and caches that flow. This flow is also referred to as a megaflow because it allows packets that have different wildcard values to be quickly processes. In other words, this caching now collapses similar flows into one userspace "megaflow" that makes many flow misses a cache lookup instead of a full translation (e.g., through the datapath flow generator 210).

Having described several component of the switching element 205, an example of dynamically generating a wildcard flow will now be described by reference to the five operational stages 245-265 that are illustrated in FIG. 2. The first stage 245 illustrates the switching element 205 receiving a packet 230. The switching element 205 is associated with the flow table 215. To simplify the description, the flow table 215 includes only one flow 235. However, one of ordinary skill in the art would understand that the table could include many more flows.

The flow 235 in some embodiments is a table entry that is used to match and process packets. It includes a set of match fields to match packets and one or more actions to perform on matching packets. In the example of FIG. 2, the match fields are ingress port and Ethernet destination address (e.g., destination MAC addresses). The action is shown as a number two. This number represents an output port. Accordingly, the flow 235 provides a rule that states that all packets received through ingress port one and that have the matching Ethernet destination address should be output to port two.

Aside from the match fields and the action, the flow entry 235 can include other variables, such priority and timeout values. The priority value identifies the matching precedence of a flow. For example, the flow table 215 can include multiple entries that can handle a same packet. In some embodiments, the switching element iterates through flow entries base on the priority value. The switching element might examine a flow entry with a higher priority value before a lower one. In this way, a flow entry with a higher value will match before a lower one. The first match can then be used to generate a cache flow entry. So, typically, the matching flow with the highest priority is used process a packet, but this may not be true in all cases. As mentioned above, the switch element might re-search the same flow table to find one or more other flows. In such cases, the switching element might consolidate the flows into one cache flow entry. The switching element might perform multiple sets of action or just one set of action (e.g., the matching flow with the highest priority value). Different from the priority value, the timeout value represents how long the flow stays in the flow table 215 before it expires. This can be an idle timeout (e.g., if it is inactive) or even a hard timeout (e.g., regardless of its activity).

The first stage 245 also illustrates the packet 230 that is sent to the switching element. The term "packet" is used here as well as throughout this application to refer to a collection of bits in a particular format sent across a network. One of ordinary skill in the art will recognize that the term "packet" may be used herein to refer to various formatted collections of bits that may be sent across a network, such as Ethernet frames, TCP segments, UDP datagrams, IP packets, etc.

In some embodiments, the packet is a unit of data that comprises header and user data. The header of a packet includes control information that is necessary for the delivery network to deliver the packets from the node that transmits the data packets to the node to which the packets are to be delivered. The user data of the packet is data that is to be delivered from one node to another. The user data is also called a payload. A data packet may include headers of one or more communication protocols. When a data packet includes more than one header, the outer-most header is followed by other headers. The innermost header is usually the last header of the headers before the payload of the packet. For the network that implements the protocol of the outer-most header of a packet, the network considers only the outer-most header of the packet as the header and the other headers and the user data of the packet are together considered as the payload of the packet. To simply the discussion, the packet 230 is shown with only two header values, namely Ethernet and IP destination addresses. However, a typical packet contains more header values.

In the first stage 245, the switching element 205 receives the packet 230. The second stage 250 shows that datapath manager 220 looks for a matching flow that is stored in the datapath cache 225. The datapath cache 225 provides a fast path to process incoming packet because it does not involve any translation by the datapath flow generator 210. In the second stage 250, there are no flow entries stored in the datapath cache 225. Accordingly, the packet processing is transferred to the datapath flow generator 210. In some embodiments, the transferring entails sending the packet 230 to the datapath flow generator 210.

The third stage 255 illustrates the datapath flow generator 210 dynamically generating a flow entry 240 with at least one wildcard field. In wildcarding, the datapath flow generator of some embodiments initially wildcards some or all match fields. When a packet is received, the datapath flow generator 210 selects a flow from the flow table and un-wildcards each match field that it consults or examines. This can include comparing match field and header values, and deriving or learning output ports.

In the example of the third stage 255, the datapath flow generator 210 has specified some or all of the match fields to be wildcard fields. That is, some or all of the match fields has been initialized to be wildcard fields, including destination Ethernet address field and IP destination address field. The datapath flow generator 210 has also selected the flow entry 235 from the flow table 215 to determine if it is a match for the packet 230. In making this determination, the datapath flow generator 210 has compared the ingress port of the flow entry 235 with the ingress port at which the packet 230 was received. The datapath flow generator 210 has also compared the destination Ethernet addresses match field against the corresponding header field. As the destination Ethernet address match field was consulted, the datapath flow generator has also specified the destination Ethernet address as a non-wildcard field. However, the destination IP match field remains a wildcard field. This is conceptually shown by the asterisk symbol in the cache flow entry 240.

In the third stage 255, the datapath flow generator 210 has generated the cache entry 240 based on the matching flow 235. The fourth stage 260 illustrates that the flow entry 240 has been pushed down and stored in the datapath cache 225. The cached entry 240 includes an ingress port value, Ethernet destination address value, IP destination address value, and an action value. Although the IP address is shown, that field has been specified as a wildcard field. Here, the slash mark followed by the asterisk symbol indicates that the entire field has completely been wildcarded. This field has been wildcarded because it was not consulted when generating the flow entry 240.

As shown in the fourth stage 260, the cached flow entry 240 is also different from the flow 235 from the flow table 215. Aside from the wildcard, in some embodiments, the cache flow entry does not have a priority value. This is because the datapath cache 240 does not store multiple flows that can match a same packet. In other words, the datapath cache stores only one flow that can match a given packet, instead of multiple entries. Therefore, there are no resubmit operations with the datapath cache, in some such embodiments. Alternatively, the flow entry 240 of some embodiments is associated with a priority value. In addition, the datapath manager 220 may perform one or more resubmit operations operation to find any other matching flows from the datapath cache.

The fifth stage 260 illustrates the switching element 205 processing the packet 230. The cache entry 240 specifies that any packet that is received at ingress port one and has an Ethernet destination address "A" should be output to port two. The IP destination address match field has been wildcarded so that field can have any different value. Following this rule, the datapath manager 220 outputs the packet 230 through port two.

In the preceding example, the switching element 205 dynamically generates a flow 240 with at least one wild card field. As mentioned above, this flow is also referred to as a "megaflow" because it allows packets that have different wildcard values to be quickly processed. This caching technique collapses similar into flows into one userspace megaflow that makes many flow misses a cache lookup instead of a full translation.

Figure 3:
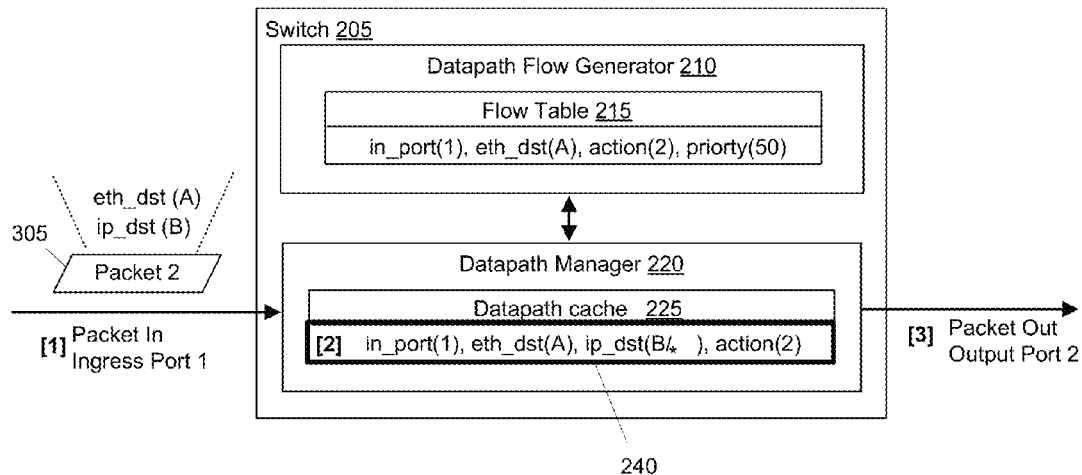
FIG. 3 shows an example how the switching element uses the flow with the wildcard field to process subsequent packets.
Figure 3:
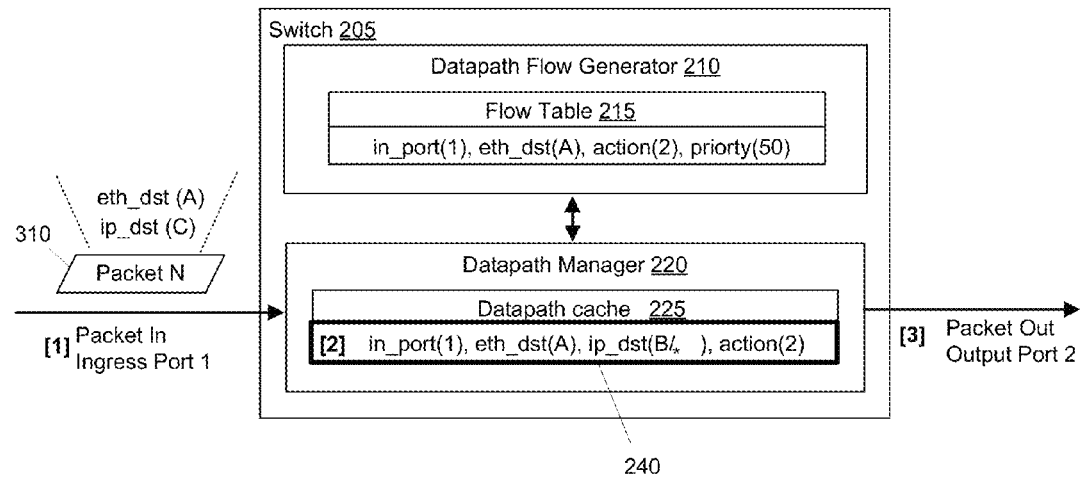

FIG. 3 shows an example how the switching element 205 uses the flow entry 240 to process subsequent packets 305 and 310. Specifically, this figure illustrates the switching element 205 at time one when it receives one subsequent packet 305 and at time two when it receives another subsequent packet 310. At time one, the switching element 205 receives the packet 305. The datapath manager 220 receives the packet and parses it to extract or strip its header values. The datapath manager 220 also identifies the ingress port through which the packet 305 was received. The datapath manger 220 selects the flow entry 240 from the datapath cache 225 and compares the identified ingress port value with the value from the flow entry. As the port values match, the datapath manager compares the non-wildcard match field value (i.e., destination Ethernet address field) to the corresponding header field value. As those two values match, the datapath manager performs the associated action, which is to output the packet to port two. The datapath manager 220 ignores the IP destination match field from the flow entry 240 because it has been wildcarded. In this case, even if the IP destination address match field has not been wildcarded, the packet would have been output to port two. This is because the IP destination address values from the flow entry and the packet header match one another.

At time two, the switching element 205 receives another subsequent packet 310. Similar to time one, the datapath manager 220 receives the packet and parses it to extract or strip its header values. The datapath manager also identifies the ingress port through which the packet was received. The datapath manger selects the cache entry 240 and compares the ingress port and the non-wildcard match field (i.e., destination Ethernet address field) to the header fields. As those two values match, the datapath manager performs the associated action, which is to output the packet to port two.

At time two, the destination IP address fields of the flow entry 240 and the packet's header do not match. Therefore, there would have been a miss in the datapath cache 225, and the packet processing would have to be shifted to the datapath flow generator 210. As stated above, the process of determining what to do with a flow when it is missed in the cache can be an expensive operation. The datapath flow generator 205 must perform a number of different tasks to generate a cache flow entry, such as iterating through flows in the flow table 215 to find a matching flow and/or deriving match field values. At time two, those tasks do not have to be performed. This is because the destination IP address match field has been wildcarded and the packet 310 is processed regardless of the mismatch in the field values. Accordingly, by caching the flow with the wildcard field, the switching element avoids having to do another translation to cache another flow. Such generation of wildcard flows can provide significant flow setup performance, especially when the switching element is able to wildcard many flows.

Several more detailed examples of dynamically generating and using wildcard flows. Specifically, Section I describes several an example software-switching element that implements some embodiments of the invention. Section II then describes a more detailed example of how the switching element processes packets. This is followed by Section III that describes various examples of generating flows with zero or more wildcard fields. Section IV then describes an ideal flow cache. Section V describes several example classification algorithms. Section VI describes several prefix tracking algorithm of some embodiments. Section VII then describes several different common match algorithms. Section VIII then describes several example datapath flows. Lastly, Section IX describes an electronic system for implementing some embodiments of the invention.

I. Example Switching Element

As method above, the switching element of some embodiments receives a packet and processes the packet by dynamically generating a flow entry with a set of wildcard fields. The switching element then stores that flow entry in a cache and processes any subsequent packets that have header values that match the flow entry's non-wildcard match fields. In some embodiments, the switching element is a software or virtual switch. An example of such a software switch will not be described by reference to FIG. 4.

Figure 4:
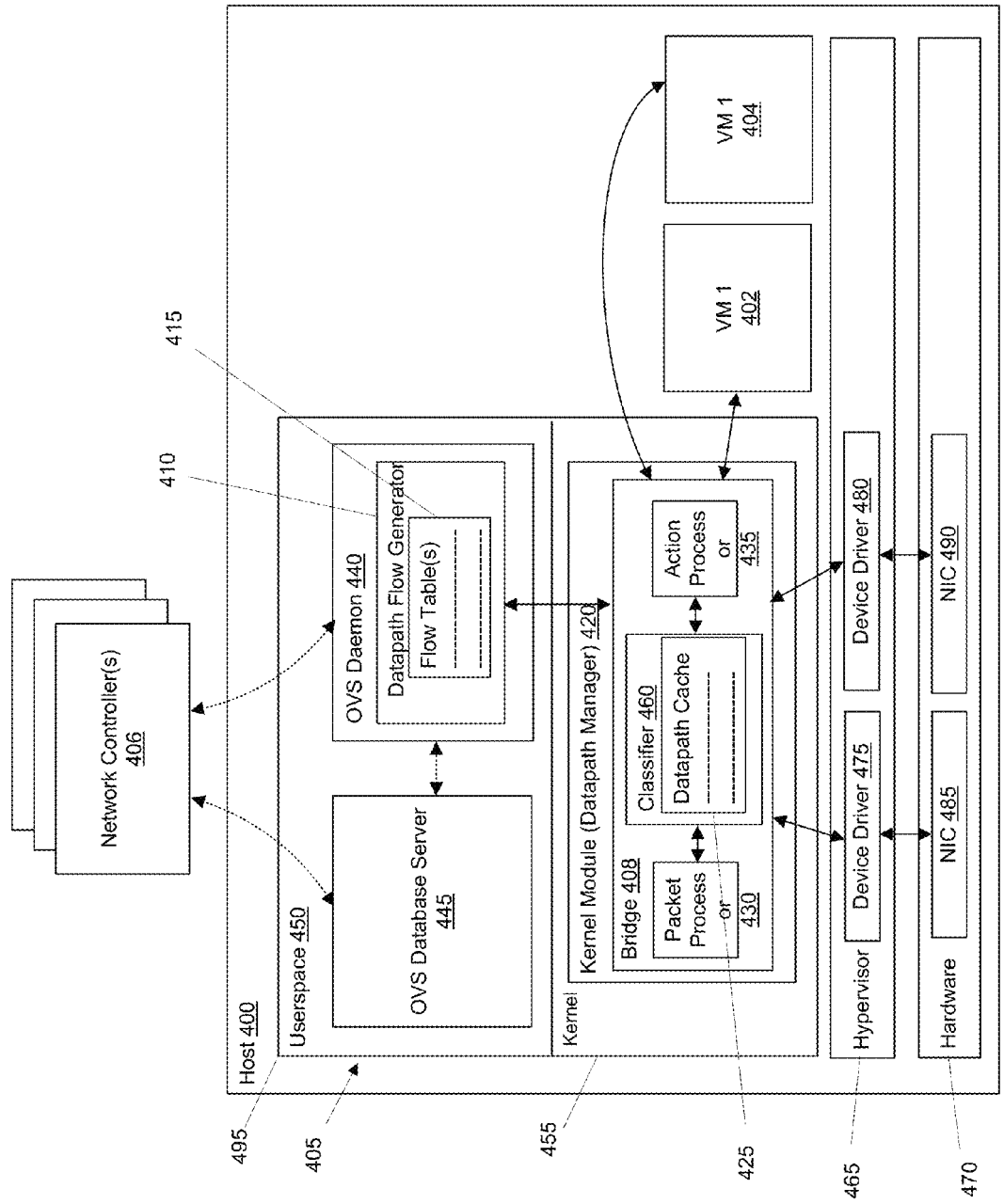
FIG. 4 conceptually illustrates an architectural diagram of a software-switching element of some embodiments.

FIG. 4 conceptually illustrates an architectural diagram of a software-switching element 405 of some embodiments that is implemented in a host 400. In this example, the software-switching element 405 operates on a virtual machine (VM) 495 and includes several components. These components includes an Open vSwitch (OVS) kernel module 420, which runs in the kernel of the VM 455, and an OVS daemon 440 and an OVS database server 445, which run in the userspace 450 of the VM 495.

As shown in FIG. 4, the host 400 includes hardware 470, hypervisor 465, and VMs 402 and 404. The hardware 470 may include typical computer hardware, such as processing units, volatile memory (e.g., random access memory (RAM)), nonvolatile memory (e.g., hard disc drives, optical discs, etc.), network adapters, video adapters, or any other type of computer hardware. As shown, the hardware 470 includes NICs 485 and 490, which are typical network interface controllers for connecting a computing device to a network.

The hypervisor 465 is a software abstraction layer that runs on top of the hardware 470 and runs below any operation system. The hypervisor 465 handles various management tasks, such as memory management, processor scheduling, or any other operations for controlling the execution of the VMs 402 and 404. Moreover, the hypervisor 465 communicates with the VM 495 to achieve various operations (e.g., setting priorities). In some embodiments, the hypervisor 465 is one type of hypervisor (Xen, ESX, or KVM hypervisor) while, in other embodiments, the hypervisor 465 may be any other type of hypervisor for providing hardware virtualization of the hardware 470 on the host 400.

As shown, the hypervisor 465 includes device drivers 475 and 480 for the NICs 485 and 490, respectively. The device drivers 475 and 480 allow an operating system to interact with the hardware of the host 400. VMs 402 and 404 are virtual machines running on the hypervisor 465. As such, the VMs 402 and 404 run any number of different operating systems. Examples of such operations systems include Linux, Solaris, FreeBSD, or any other type of UNIX based operating system. Other examples include Windows based operating systems as well.

In some embodiments, the VM 495 is a unique virtual machine, which includes a modified Linux kernel, running on the hypervisor 465. In such cases, the VM 495 may be referred to as domain 0 or dom0 in some embodiments. The VM 495 of such embodiments is responsible for managing and controlling other VMs running on the hypervisor 465 (e.g., VMs 490 and 495). For instance, the VM 495 may have special rights to access the hardware 470 of the host 400. In such embodiments, other VMs running on the hypervisor 465 interact with the VM 495 in order to access the hardware 470. In addition, the VM 495 may be responsible for starting and stopping VMs on the hypervisor 465. The VM 495 may perform other functions for managing and controlling the VMs running on the hypervisor 465. Some embodiments of the VM 495 may include several daemons (e.g., Linux daemons) for supporting the management and control of other VMs running on the hypervisor 465. Since the VM 495 of some embodiments is manages and controls other VMs running on the hypervisor 465, the VM 495 may be required to run on the hypervisor 465 before any other VM is run on the hypervisor 465.

As shown in FIG. 4, the VM 495 includes a kernel 455 and a userspace 450. In some embodiments, the kernel is the most basic component of an operating system that runs on a separate memory space and is responsible for managing system resources (e.g., communication between hardware and software resources). In contrast, the userspace is a memory space where all user mode applications may run.

As shown, the userspace 450 of the VM 495 includes the OVS daemon 440 and the OVS database server 445. Other applications (not shown) may be included in the userspace of the VM 495 as well. The OVS daemon 440 is an application that runs in the background of the userspace of the VM 495. The OVS daemon 440 of some embodiments receives switch configuration from the network controller 406 (in a network controller cluster) and the OVS database server 445. The management information includes bridge information, and the switch configuration includes various flows. These flows are stored in the flow table 415. Accordingly, the software-switching element 405 may be referred to as a managed forwarding element.

In some embodiments, the OVS daemon 440 communicates with the network controller using OpenFlow Protocol. In some embodiments, the OVS database server 445 communicates with the network controller 406 and the OVS daemon 440 through a database communication protocol (e.g., OVS database protocol). The database protocol of some embodiments is a JavaScript Object Notation (JSON) remote procedure call (RPC) based protocol.

The OVS database server 445 is also an application that runs in the background of the userspace of the VM 495. The OVS database server 445 of some embodiments communicates with the network controller 406 in order to configure the OVS switching element (e.g., the OVS daemon 440 and/or the OVS kernel module 420). For instance, the OVS database server 445 receives management information from the network controller 406 for configuring bridges, ingress ports, egress ports, QoS configurations for ports, etc., and stores the information in a set of databases.

As illustrated in FIG. 4, the kernel 455 includes the OVS kernel module 420. This module processes and routes network data (e.g., packets) between VMs running on the host 400 and network hosts external to the host (i.e., network data received through the NICs 485 and 490). For example, the OVS kernel module 420 of some embodiments routes packets between VMs running on the host 400 and network hosts external to the host 400 couple the OVS kernel module 420 through a bridge 408.

In some embodiments, the bridge 408 manages a set of rules (e.g., flow entries) that specify operations for processing and forwarding packets. The bridge 408 communicates with the OVS daemon 440 in order to process and forward packets that the bridge 408 receives. For instance, the bridge 408 receives commands, from the network controller 406 via the OVS daemon 445, related to processing and forwarding of packets.

In the example of FIG. 4, the bridge 408 includes a packet processor 430, a classifier 460, and an action processor 435. The packet processor 430 receives a packet and parses the packet to strip header values. The packet processor 430 can perform a number of different operations. For instance, in some embodiments, the packet processor 430 is a network stack that is associated with various network layers to differently process different types of data that it receives. Irrespective of all the different operations that it can perform, the packet processor 430 passes the header values to the classifier 460.

The classifier 460 or kernel module accesses the datapath cache 425 to find matching flows for different packets. The datapath cache 425 contains any recently used flows. The flows may be fully specified, or may contain one or more match fields that are wildcarded. When the classifier 460 receives the header values, it tries to find a flow or rule installed in the datapath cache 425. If it does not find one, then the control is shifted to the OVS Daemon 440. One main distinction between the fast path cache 425 and the set of flow tables 415 is that there is at most only one matching flow entry in the fast path cache 425.

If the classifier 460 finds a matching flow, the action processor 435 receives the packet and performs a set of action that is associated with the matching flow. The action processor 435 of some embodiment also receives, from the OVS daemon 440, a packet and a set of instructions to perform on the packet. For instance, when there is no matching flow in the datapath cache 425, the packet is sent to the OVS daemon 440. The OVS daemon 440 may generate a flow and install that flow in the datapath cache 425. The OVS daemon 440 might also send the packet to the action processor 435 with the set of actions to perform on that packet.

The OVS daemon 440 of some embodiments includes a datapath flow generator. The datapath flow generator 440 is a component of the software switching element 405 that makes switching decisions. Each time there is a miss in the datapath cache 425, the datapath flow generator 440 generates a new flow to install in the cache. In some embodiments, the datapath flow generator works in conjunction with its own separate classifier (not shown) to find one or more matching flows from a set of one or more flow table 415. However, different from the classifier 460, the OVS daemon's classifier can perform one or more resubmits. That is, a packet can go through the daemon's classifier multiple times to find several matching flows from one or more flow table 415. When multiple matching flows are found, the datapath flow generator 410 of some embodiments generates one consolidated flow entry to store in the datapath cache 425. In some embodiments, the switching element allows flows with wildcards to be specified in the flow table 415. However, different from the datapath flows, these flows are not dynamically generated on the fly (e.g., in response to a miss in the datapath).

When a flow is generated, the userspace or OVS daemon of some embodiments sends the generated flow to the kernel module (e.g., the classifier 460) along with the wildcard mask. The wildcard mask informs the kernel module which bits of a set of match field values in the flow are significant when matching. This means that the remaining bits (i.e., the wildcarded bits) should be ignored. When hashing, the kernel module of some embodiments hashes bits that are significant. For instance, the kernel module might take the match field values of a flow entry or rule, and zero out all the insignificant bits using the wildcard mask and store it in a hash table. In some embodiments, when the packet comes in, the kernel module uses the wildcard mask to zero out all the insignificant bits of the packet. Then, it computes the hash from the packet. Thereafter, the kernel module compares that hash to hashes that were computed from different flows. The kernel module might hash the same packet multiple times based on different match patterns of different hash tables. Hence, the kernel module uses the wildcard mask (e.g., which was generated in the userspace) to specify which bits need to be zeroed before it computes the hash.

In the example described above, the forwarding element generates and pushes flows from the userspace to the datapath cache. In some embodiments, the forwarding element processes packets using a cache hierarchy. In some embodiments, the cache hierarchy includes an exact match cache and a non-exact match cache. The exact match cache stores flows or rules with match fields that are fully specified, while the non-exact match cache stores other flows that includes one or more match fields that are wildcarded and/or a portion of one or more match fields that is wildcarded.

In some embodiments, when a forwarding element receives a packet, the forwarding element first consults the exact-match cache to find a matching microflow. If a match is found, the forwarding processes the packet using a matching flow. If there is a miss in the exact match cache, the forwarding element may consult the megaflow cache. If there is a miss in the megaflow cache, the forwarding element may examine one or more flow tables to generate a new flow to store in the cache and process the packets.

In some embodiments, the megaflow cache is populated on demand from consulting one or more of the flow tables. In some embodiments, the exact match cache is populated on demand from the consulting megaflow cache. For instance, assuming most packets are part of an existing flow, the forwarding element benefits from the performance advantage of a single flow table lookup. If it misses, as the packet is still covered by the megaflow cache, the forwarding element still benefits from megaflow's performance advantage by not requiring full translation One of ordinary skill in the art would understand that the architecture is an example architecture and that different embodiments can include different sets of components. The naming of the various components is arbitrary and can change from one implementation to another. Also, the architecture shows two different layers (e.g., the kernel layer and the userspace layer) performing various operations. In some embodiments, these operations occur at just one layer (e.g., at the userspace layer) or are further split into other layers.

II. Packet Processing Operations

Figure 5:
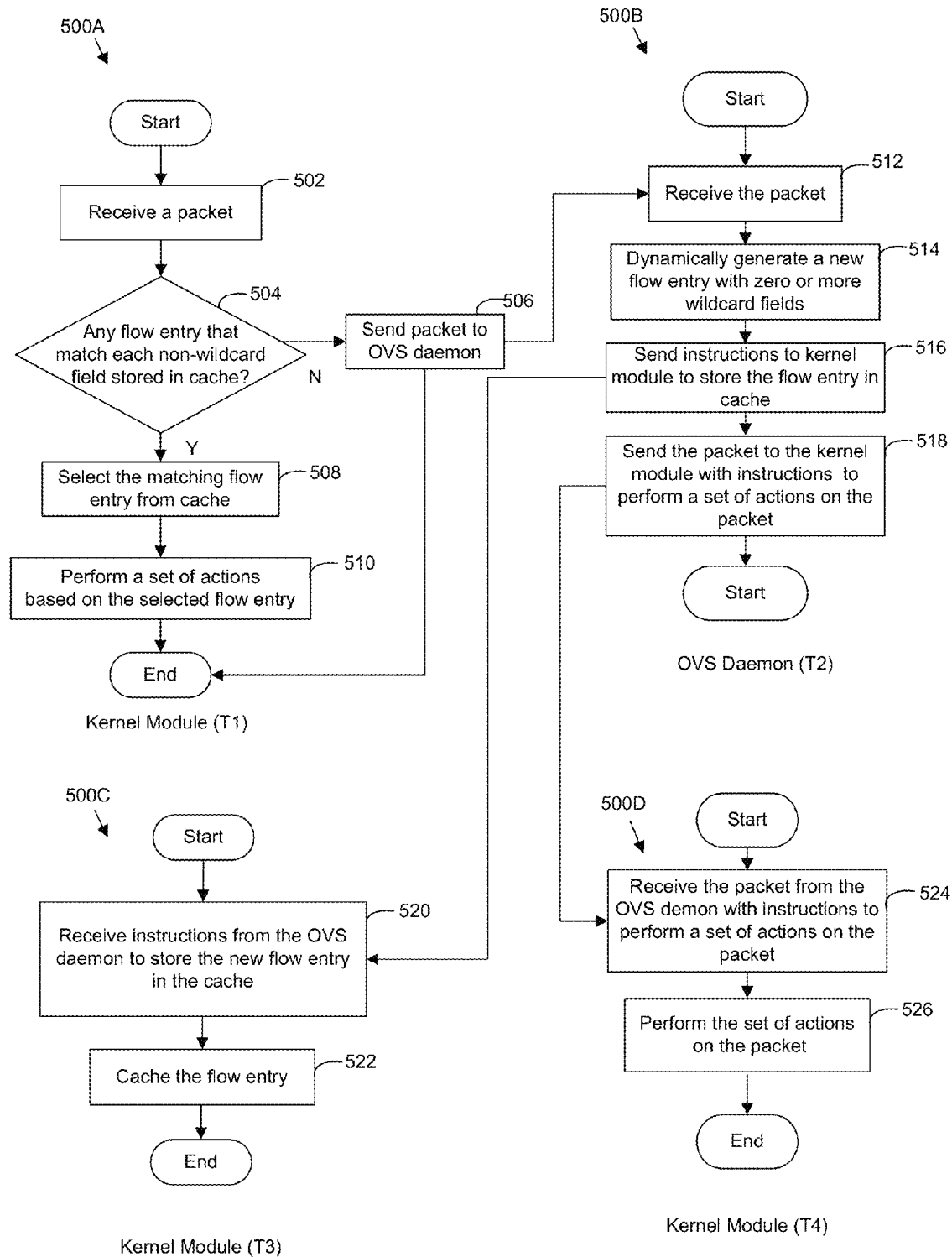
FIG. 5 conceptually illustrates several processes, which show the interactions between several switch components when generate and cache flow with zero or more wildcard fields.

The previous section described an example architecture of a switching element that generates flows with zero or more wildcard fields. The architecture showed various components, including a kernel module and an OVS daemon. FIG. 5 conceptually illustrates several processes 500A-D, which show the interactions between such components to generate and cache a flow with zero or more wildcard fields. The processes 500A-D will be described by reference to FIGS. 6-9.

The process 500A shows example operations performed by a kernel module when it receives a packet. The process 500A begins when it receives (at 502) a packet. The process 500A then performs a lookup operation on the cache to identify a matching flow entry for the packet. Specifically, the process 500A iteratively selects (at 504) a flow entry that is cached to find one flow entry that matches each of the entry's non-wildcard fields. If a matching entry is found, the process 500A selects (at 508) the flow entry. The process 500A then performs (at 510) a set of actions that is specified by that flow entry. If no matching entry is found, the process 500A proceeds to 506, which is described below. In some embodiments, the packet may be sent the OVS daemon (e.g., the userspace) even if there is a match in the kernel. This is because some packets are too complicated for the kernel to handle. Thus, in some embodiments, a "userspace" action is installed in the datapath cache (e.g., the kernel flow table), which specifies pushing all packets to the OVS daemon.

Figure 6:
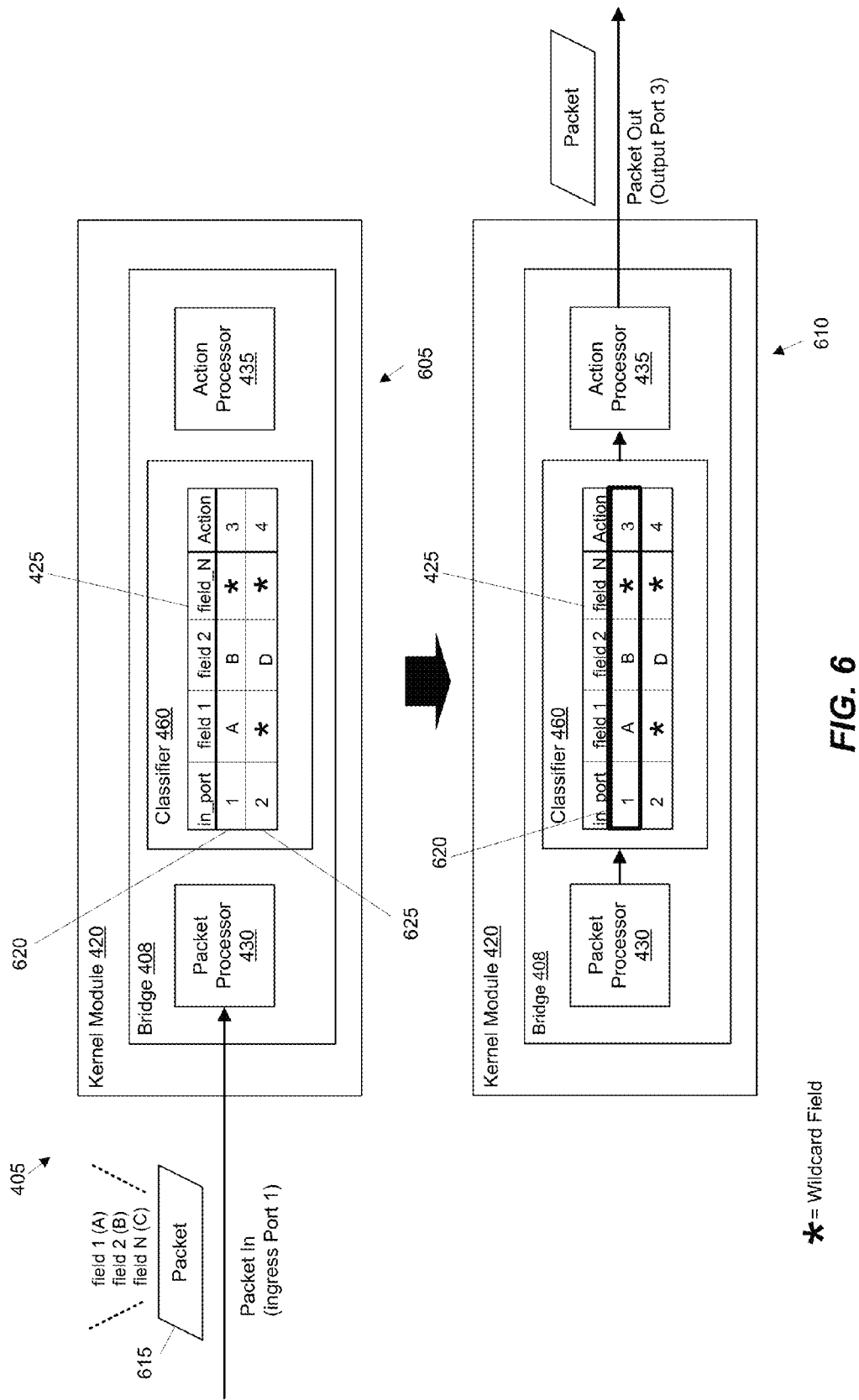
FIG. 6 illustrates an example of a switching element that finds a matching flow that is stored in a cache.

FIG. 6 illustrates an example of a switching element 405 that finds a match in a datapath cache 425. Two operational stages 605 and 610 of the switching element's kernel module 420 are shown in this figure. The bridge 408 has been configured, and two flow entries 620 and 625 are stored in the datapath cache 425. In this example, each of the flow entries 620 and 625 has at least one wildcard match field. These entries might have been pushed down earlier by the OVS daemon (not shown) based on two previously received packets.

The first stage 605 illustrates the kernel module 420 receiving a packet 615. In particular, the packet 615 is received by the packet processor 430 through the bridge 408. The packet includes a number of header fields. To simply the discussion, the header fields are specified as field 1 through field N. The header field 1 has a value of "A", field 2 has a value of "B", and field N has a value of "C".

The second stage 610 illustrates an example of processing the packet after finding a matching flow in the datapath cache 425. In processing the packet, the packet processor 430 first strips the headers off the packet 615. The classifier 460 then selects the first flow entry 620 and compares its non-wildcard match field values against the corresponding header values. Here, the first flow entry 620 is a match for the packet 615. Accordingly, the action processor 435 performs the flow entry's associated set of actions on the packet 615, which is to output the packet to output port three.

Figure 7:
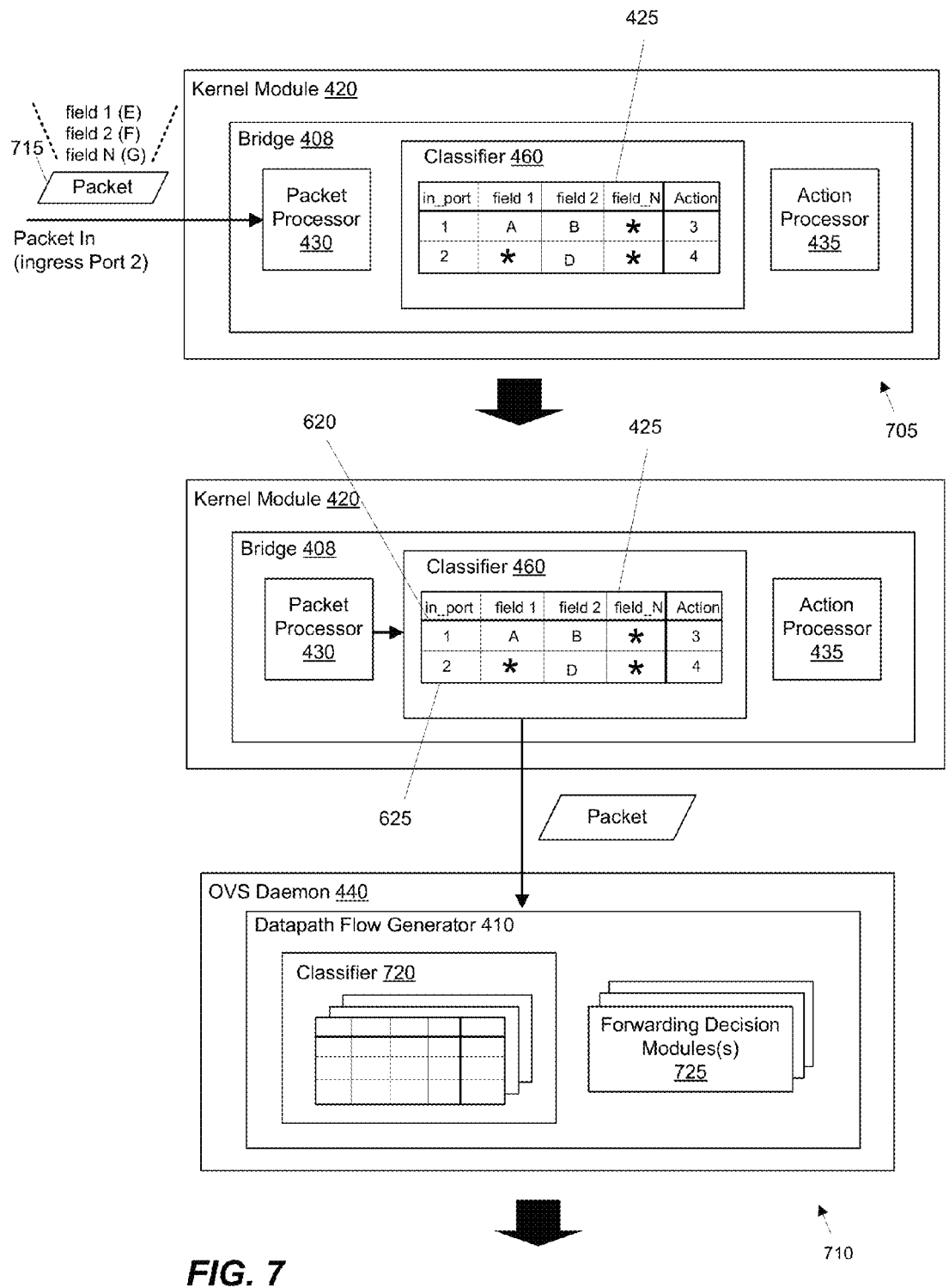
FIG. 7 illustrates an example of transferring control to a switch daemon when there is no matching flow stored in the cache.

Referring to FIG. 5, when there is no matching flow, the process 500A sends (at 506) the packet (e.g., the header values) to the OVS daemon for processing. FIG. 7 illustrates an example of transferring control to the OVS daemon 440 when there is a miss in the datapath cache 425. Two operational stages 705 and 710 are illustrated in this figure. The first stage 705 illustrates the kernel module 420 receiving a packet 715. In particular, the packet 715 is received by the packet processor 430 through the bridge 408. The packet includes a number of header fields. The header field 1 has a value of "E", field 2 has a value of "F", and field N has a value of "G".

The second stage 710 illustrates an example of how control is shifted to the OVS daemon when there is a miss in the datapath cache 425. In particular, the packet processor 430 first parses the packet to strip the headers from the packet 715. The classifier 460 then selects the first flow entry 620 and compares its non-wildcard match field values against the corresponding header values. The non-wildcard fields of the first flow entry 620 do not match the corresponding header values. Accordingly, the classifier 460 selects the second flow entry 625 and compares its non-wildcard match field values against the corresponding header values. The second flow entry 625 is also not a match for the packet 715. As there is no matching entry, the classifier 460 sends the packet to the OVS daemon 440.

Referring to FIG. 5, Process 500B shows several example operations that can occur at the OVS daemon when it receives a packet from the kernel module. As shown, the process 500B begins when it receives (at 512) the packet from the kernel module. The process then dynamically generates (at 514) a new flow entry with zero or more wildcard fields.

Figure 8:
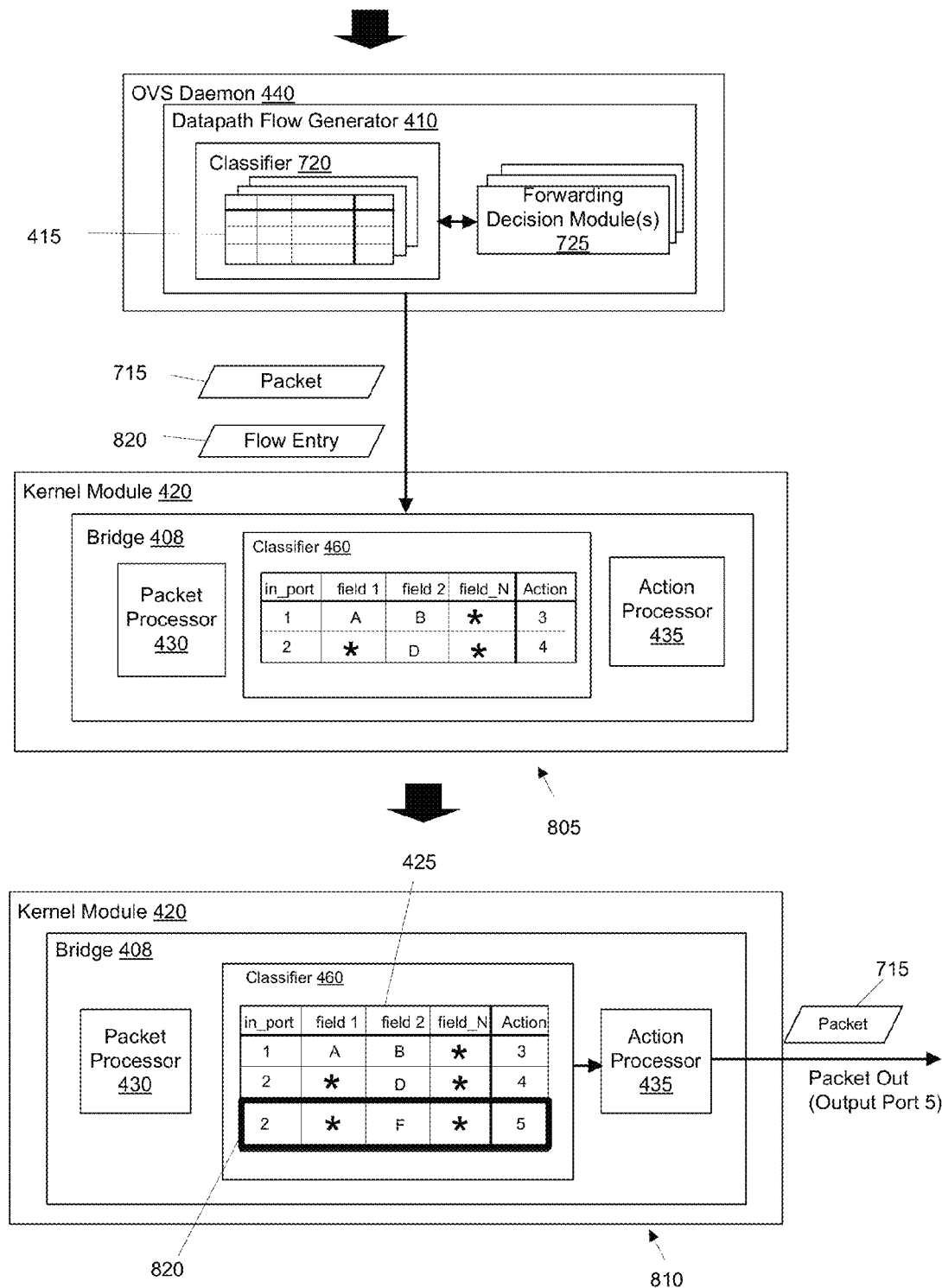
FIG. 8 illustrates an example of the switch daemon generating a flow to store in the cache.

FIG. 8 illustrates an example of the OVS daemon 440 generating a flow and sending it to the kernel module 420. Two operational stages 805 and 810 are illustrated in this figure. These stages 0805 and 810 are a continuation of the stages 705 and 710 shown in FIG. 7. As shown, the OVS daemon 440 includes a datapath flow generator 410 to dynamically generate a new flow to store in the datapath cache 425. Similar to the kernel module 420, the datapath flow generator 410 is associated with a classifier 720. This classifier 720 is used to find a matching flow from one or more flow tables 415. Different from the classifier 460, the OVS daemon's classifier 415 can perform one or more resubmits. That is, a packet can go through the daemon's classifier multiple times to find several matching flows from one or more flow tables (e.g., the flow table 415). For instance, even if a matching flow is found, the flow's associated action may specify a resubmit operation. The resubmit operation re-searches the same flow table (or another specified flow table) and creates a flow entry that specifies additional actions found, if any, in addition to any other actions in the original matching flow. In some embodiments, the datapath flow generator specifies performing only a set of actions associated with the flow from the flow table with the highest priority value.

The first stage 805 illustrates the OVS daemon 440 after it has received the packet 715 from the kernel module 420. This stage also shows the OVS daemon 440 sending a new flow 820 to the kernel module 420. The datapath flow generator 410 has generated the new flow 820. In generating the flow, the datapath flow generator 410 of some embodiments initially wildcards some or all match fields. Upon the datapath flow generator 410 receiving the packet, it calls the classifier 410 to iterate through flows in the flow table 415. The classifier 410 selects a flow entry from the flow table and un-wildcards each match field that was compared against the packet's header field.

Alternatively, or conjunctively with such matching, the data flow generator 440 of some embodiments generates a flow entry by deriving or learning output ports. In deriving, the data flow generator 440 may consult one or more match field values, un-wildcard the match fields, and specify those match field values as non-wildcard field values in the flow entry. The data flow generator 440 of some embodiments generates a flow entry by communicating with one or more different forwarding decision modules 725, such as a MAC learning module. This MAC learning module may learn MAC addresses in a typical manner that layer 2 switches learn MAC addresses. For instance, when a MAC address (i.e., a destination MAC address of a packet is not included in a set of tables of learned MAC addresses), the MAC learning module may flood all of the ports of the bridge 408 and record the MAC address of the packet that responds to the flood.

Referring to FIG. 5, after generating the flow entry, the process 500B sends (at 516) instructions to the kernel module to cache the flow entry. The process then sends (at 518) the packet to the kernel module with instructions to perform a set of actions on the packet. The process 500B then ends.

The process 500C shows operations performed by the kernel module after the OVS daemon has generated a new flow entry and sent instructions to install the new flow entry in the cache. As shown, the process 500C begins when it receives (at 520) the instructions from the OVS daemon to cache the new flow entry. The process 500C then caches (at 522) the flow entry. The process 500C then ends.

The process 500D shows operations performed by the kernel module after the OVS daemon has generated a new flow entry and sent the packet to the kernel module with instructions to perform a set of actions on the packet. As shown, the process 500D begins when it receives (at 524) the packet with instructions to perform a set of actions on the packet. The process 500D then performs (at 526) the set of action on the packet. The process 500D then ends.

The second stage 810 of FIG. 8 illustrates the kernel module 420 after receiving the flow entry 820. The classifier 460 has received the flow entry 820 through the bridge 408. The classifier 460 has installed the flow entry 820 in the datapath cache 425. To quickly process similar packets without causing a miss in the datapath cache 425, the third stages 815 illustrates that the flow entry 820 includes a number of wildcard match fields. The packet is then received at the action processor from the OVS daemon. The packet is received with instructions to perform a set of actions. The set of actions may be the same as the one associated with the cached flow entry 820. In the example of the second stage 805, the action processor 435 performs the flow entry's associated action on the packet 715, which is to output the packet to output port five.

III. Dynamically Generating Flows with Wildcards

As mentioned above, the switching element of some embodiments dynamically generates flows with wildcards. In generating, the switching element initially wildcards some of all of match fields and generates a new flow entry by un-wildcarding each match field that was consulted to generate the flow entry. The switching element of some embodiments generates a flow by un-wildcarding each match field that was compared against a header value. Several such examples will now be described below by reference to FIGS. 9-16.

A. Examples of Generating Flows

Figure 9:
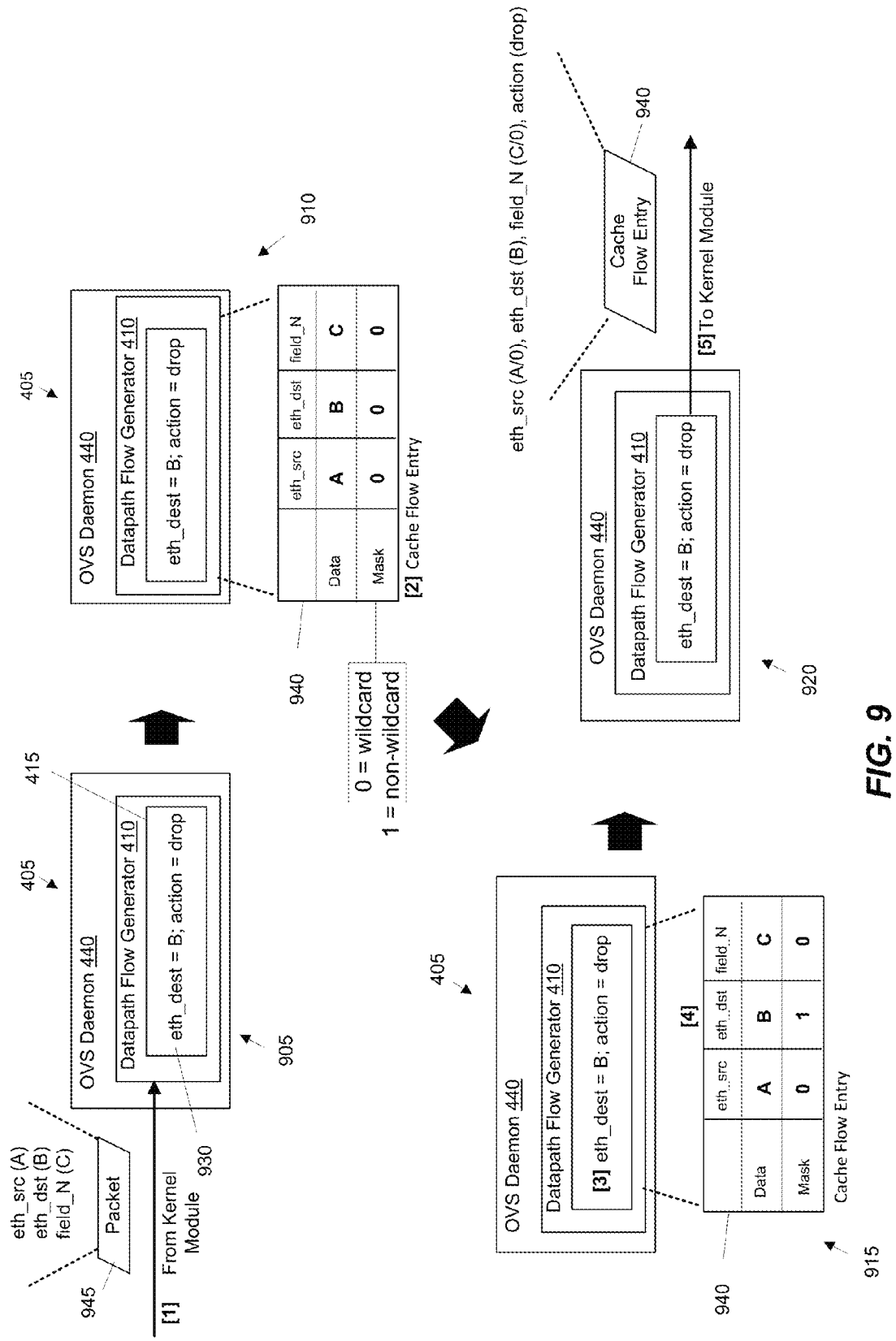
FIG. 9 shows an example of un-wildcarding a match field because it was compared against a header value.

FIG. 9 shows an example of un-wildcarding a match field because it was compared against a header value. Four operational stages 905-920 of the switching element 405 are shown in the figure. The switching element 405 includes the datapath flow generator 410, which was described above by reference to FIG. 4.

Stage 905 begins when there is a miss in the datapath cache. The packet processing is shifted from the kernel module to the OVS daemon 440. In particular, the kernel module sends the packet 945 to the OVS daemon 440. The daemon's datapath flow generator 410 receives the packet 410 and generates a new flow entry to store in the datapath cache.

The first stage 905 illustrates the datapath flow generator 410 receiving the packet 945. The packet 945 has the following header field values: Ethernet source value of "A", Ethernet destination value of "B", and field N value of "C". To find a matching flow, the datapath flow generator 410 selects a first flow or rule 930 from the flow table 415. If there are multiple flows, the flow may be sorted by priority values (e.g., from highest to lowest).

The second stage 910 illustrates that the datapath flow generator 410 initializing a group of match field values as wildcards. The datapath flow generator 410 of some embodiments generates a flow entry 940 by keeping track of the data value of each match field, and a mask associated with that field. If a field is masked, that match field value was not consulted (e.g., compared against a corresponding header filed value) to generate the flow entry.

As such, a masked field represents a wildcard field. In some embodiments, the entire match field may be masked or wildcarded. Alternatively or conjunctively, the switching element 405 of some embodiments allows masking or wildcarding at the sub-value level. In other words, the switching element supports masking portion of the match field (e.g., a portion of the IP address field) rather than the entire match field value. In the example of FIG. 9, a mask value of zero indicates that the match field has been completely wildcarded, and a mask value of one indicates that the match field was consulted.

The third stage 915 illustrates the datapath flow generator 410 generating the cache flow entry 940 based on the selected flow 930 and the packet header values. Specifically, the datapath flow generator 410 has selected the flow 930 and compared the flow's Ethernet destination value with the corresponding header value. As the Ethernet destination match field was compared against a header field value, the datapath flow generator 410 has unmasked the match field. This is shown in the third stage 915 with the zero value being replaced by the one value in the cache flow entry 940, namely from the mask of the Ethernet destination address match field.

The third stage 915 also illustrates that the datapath flow generator 410 has found a matching flow for the packet. This is because the flow's only match field matches the corresponding header value. The fourth stage 920 shows the OVS daemon 440 sending the cache flow entry 940 to the kernel module. Specifically, the datapath flow generator 410 has associated the action from the flow 930 with the cache flow entry 940. The cache flow entry 940 reads that Ethernet source address has a value of "A", Ethernet destination address has a value of "B", and field N has a value of "C". Although the Ethernet source address and Field N are associated with values, the zero value after the slash mark indicates that each of these match fields is completely masked or wildcarded. In addition, the cache flow entry 940 is associated with an action, which is to drop any packet that has an Ethernet destination address value of "B".

Figure 10:
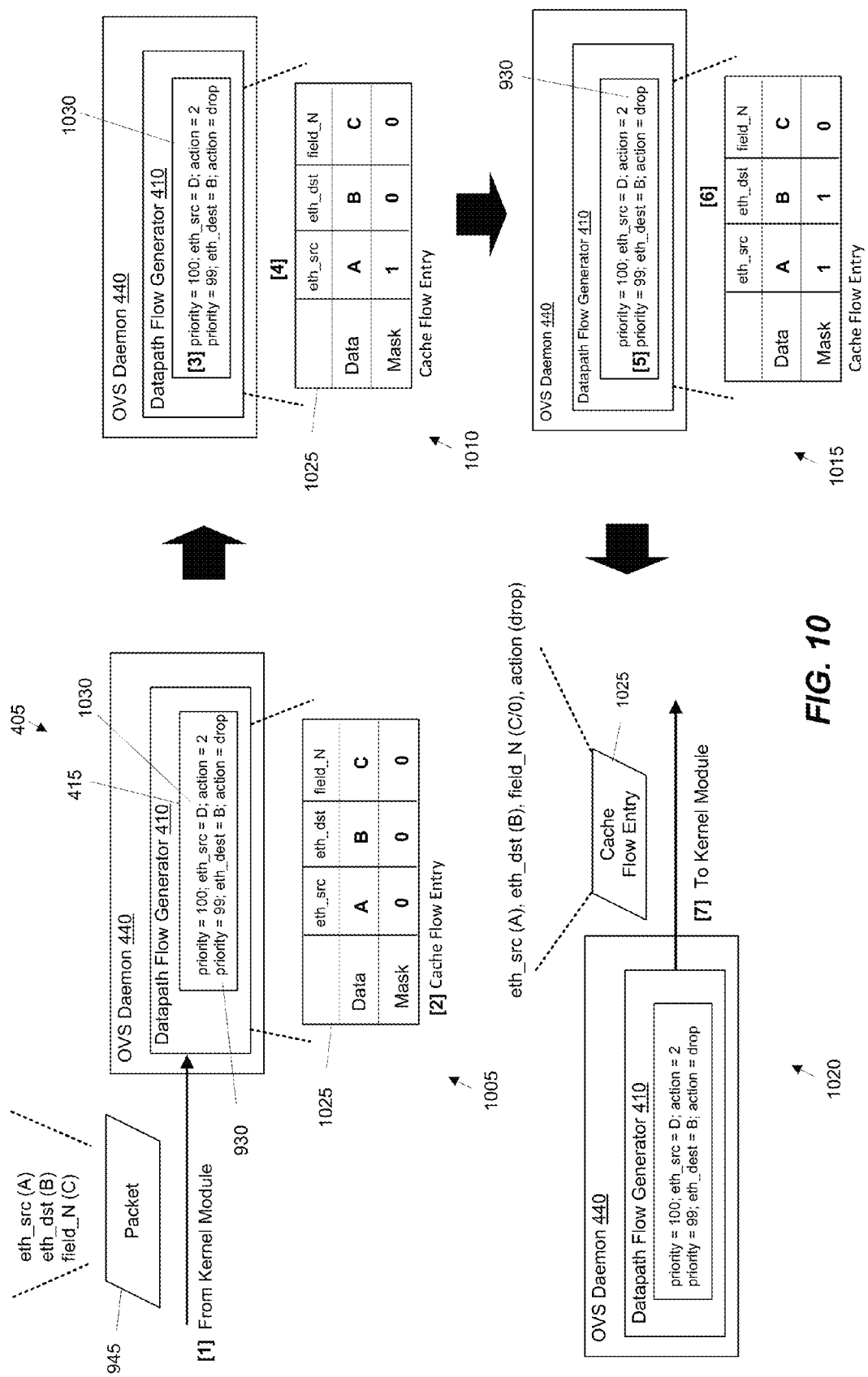
FIG. 10 illustrates an example of iterating through multiple flows and un-wildcarding multiple match fields.

The previous example illustrated the OVS daemon 440 finding a match with a first flow 930 from the flow table 415. FIG. 10 illustrates an example of iterating through multiple flows to find a match. Specifically, this figure illustrates that a wildcard match field is specified to be a non-wildcard field when it is compared against a corresponding header value, regardless of whether there was a match or a mismatch. This figure is similar to the previous figure, except that the flow 930 is the second flow in the flow table 415.

Four operational stages 1005-1020 of the switching element 405 are shown in FIG. 10. The first stage 1005 illustrates the datapath flow generator 410 receiving the packet 945. The packet has the following header field values, Ethernet source value of "A", Ethernet destination value of "B", and field N value of "C". To find a matching flow, the datapath flow generator 410 selects a first flow or rule 1030 from the flow table 415. The flow 1030 has instructions to output every packet with an Ethernet source value of "D" to output port two.

The second stage 1010 illustrates the datapath flow generator 410 building the cache flow entry 1025 based on the selected flow 1030 and the packet header values. The field values are extracted from the packet header and each value is associated with a mask that identifies whether the value is associated with a wildcard match field.

In the example of the second stage 1010, the datapath flow generator has selected the flow 1030 with the highest priority value and compared the flow's Ethernet source value with the corresponding header value. As the Ethernet source match field was compared against a header field value, the datapath flow generator 410 has unmasked the match field. This is shown in the second stage 1010 with the zero value being replaced with the one value in the cache flow entry 1025, namely from the mask of the Ethernet source address match field.

In the second stage 1010, the flow 1030 was not match for the packet 945 because their Ethernet sources address values did not match. Accordingly, in the third stage 1015, the datapath flow generator has selected the flow 930 with the next highest priority value. Specifically, the datapath flow generator 410 has selected the flow 930 and compared the flow's Ethernet destination value with the corresponding header value. As the Ethernet destination match field was compared against a header field value, the datapath flow generator 410 has unmasked the match field. This is shown in the third stage 1015 with the zero value being replaced with the one value in the cache flow entry 1025, namely from the mask of the Ethernet destination address match field.

The third stage 1015 also illustrates that the datapath flow generator 410 has found a matching flow for the packet. This is because the second flow's only match field matches the corresponding header value. The fourth stage 1020 shows the OVS daemon 440 sending the cache flow entry 1025 to the kernel module. Specifically, the datapath flow generator 410 has associated the action from the flow 930 with the cache flow entry 1025. The cache flow entry 1025 reads that Ethernet source address has a value of "A", Ethernet destination address has a value of "B", field N has a value of "C". Although Field N is associated with a value, the zero value after the slash mark indicates that the match field is completely masked or wildcarded. In addition, the cache flow entry 1025 is associated with an action, which is to drop any packet that has an Ethernet destination address value of "B".

Figure 11:
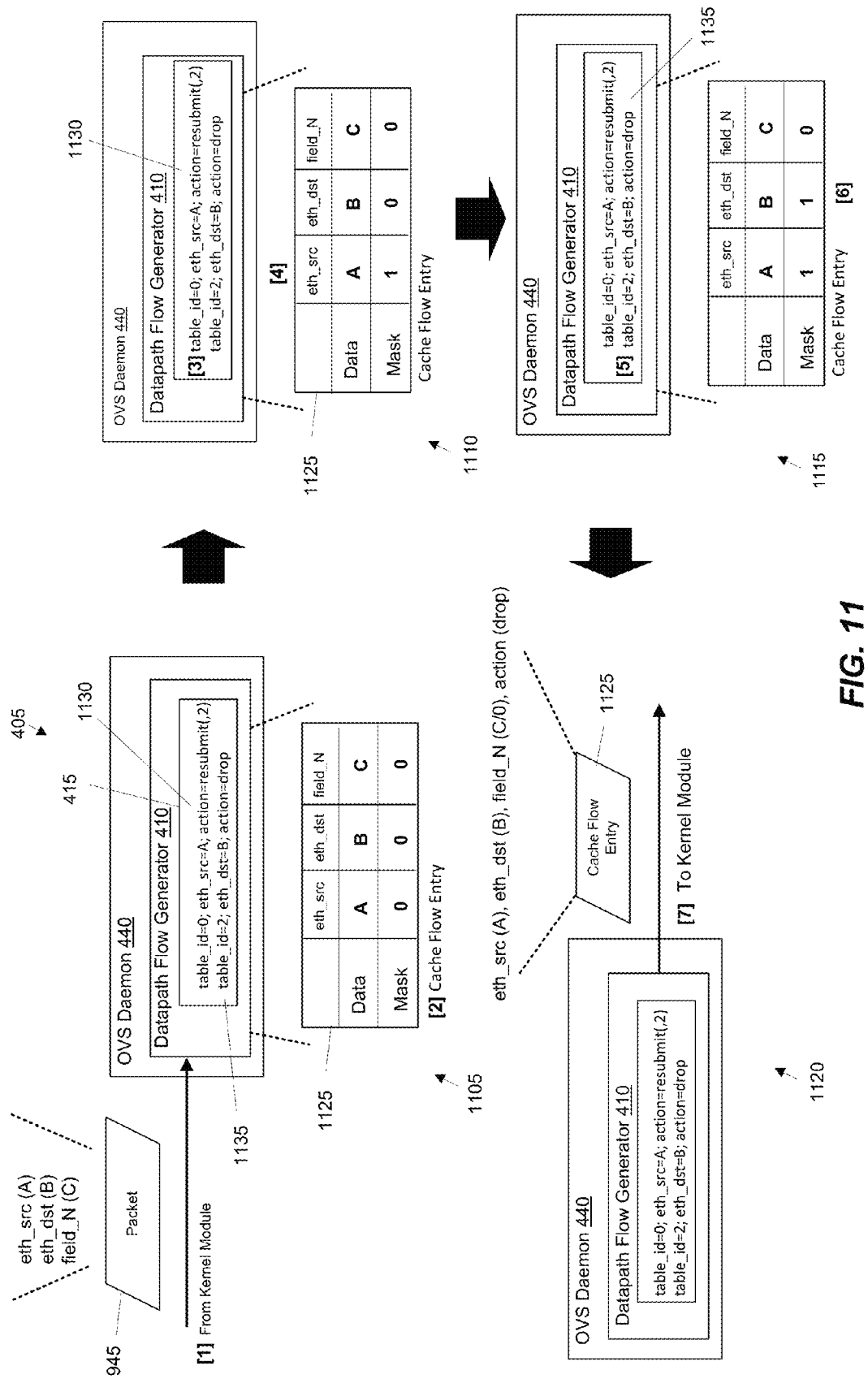
FIG. 11 provides an illustrative example of a resubmit operation.

As mentioned above, even if a matching flow is found in a flow table, one of the flow's associated actions may specify a resubmit operation to find another flow from the flow table. FIG. 11 provides an illustrative example of generating a flow entry based on multiple matching flows from a flow table. Four operational stages 1105-1120 are illustrated in this figure. These stages 1105-1120 are similar to the previous figure, except that the first flow from the flow table is a match for packet. The first flow is associated with a resubmit action.

The first stage 1105 illustrates the datapath flow generator 410 receiving the packet 945. The second stage 1110 illustrates the datapath flow generator 410 building the cache flow entry 1125 based on the selected flow 1030 and the packet header values. Specifically, the datapath flow generator has selected the flow 1130 (e.g., with the highest priority value) from table zero and compared the flow's Ethernet source value with the corresponding header value. As the Ethernet source match field was compared against a header field value, the datapath flow generator 410 has unmasked the match field. This is shown in the second stage 1110 with the zero value being replaced with the one value in the cache flow entry 1125, namely from the mask of the Ethernet source address match field.

In the second stage 1110, the flow 1030 was a match for the packet 945 because their Ethernet sources address values matches one another. However, the flow 1130 is associated with a resubmit operation (e.g., to concatenate multiple flows into one datapath flow). The resubmit operation specifies resubmitting into another flow table (i.e., flow table two). Accordingly, in the third stage 1115, the datapath flow generator 410 has selected the flow 1135 (e.g., with the highest priority value) from flow table two. Specifically, the datapath flow generator 410 has selected the flow 1135 and compared the flow's Ethernet destination value with the corresponding header value. As the Ethernet destination match field was compared against a header field value, the datapath flow generator 410 has unmasked the match field. This is shown in the third stage 1115 with the zero value being replaced with the one value in the cache flow entry 1125, namely from the mask of the Ethernet destination address match field.

The third stage 1115 also illustrates that the datapath flow generator 410 has found a matching flow for the packet. This is because the only match field of the flow 1135 matches the corresponding header value. In this example, all match fields that were specified as wildcards or non-wildcards carries over when there is a resubmit operation. That is, the OVS daemon does not reinitialize all the match fields as wildcards when there is a resubmit. However, the OVS daemon might reinitialize them as wildcards, in some other embodiments.

The fourth stage 1120 shows the OVS daemon 440 sending the cache flow entry 1125 to the kernel module. Specifically, the datapath flow generator 410 has associated the action from the flow 1135 with the cache flow entry 1125. The cache flow entry 1125 reads that Ethernet source address has a value of "A", Ethernet destination address has a value of "B", and field N has a value of "C". Although Field N is associated with a value, the zero value after the slash mark indicates that the match field is completely masked or wildcarded. In addition, the cache flow entry 1125 is associated with an action, which is to drop any packet that has an Ethernet destination address value of "B".

In the example described above, the OVS daemon finds a matching flow that has a resubmit action. The resubmit action specifies performing a resubmit to another flow table. In some embodiments, the resubmit action can specify a resubmit operation on the same flow table. One example way of resubmitting the packet to the same flow table is to modify the packet in some way before the resubmission. For instance, the action of the initial matching flow could specify changing a matching header value (e.g., the Ethernet source value). This is because if the matching header value remains the same, the same initial flow will once again match the packet.

In some cases, a flow in a flow table may have a value for a match field value that requires the datapath flow generator 410 to examine one or more other match fields. For example, when a match field relates to an IP address or an Ethernet address, the datapath flow generator 410 might first consult the Ethertype match field and determine if the corresponding header value matches the match field value. The datapath flow generator may then un-wildcard the Ethertype match field.

Figure 12:
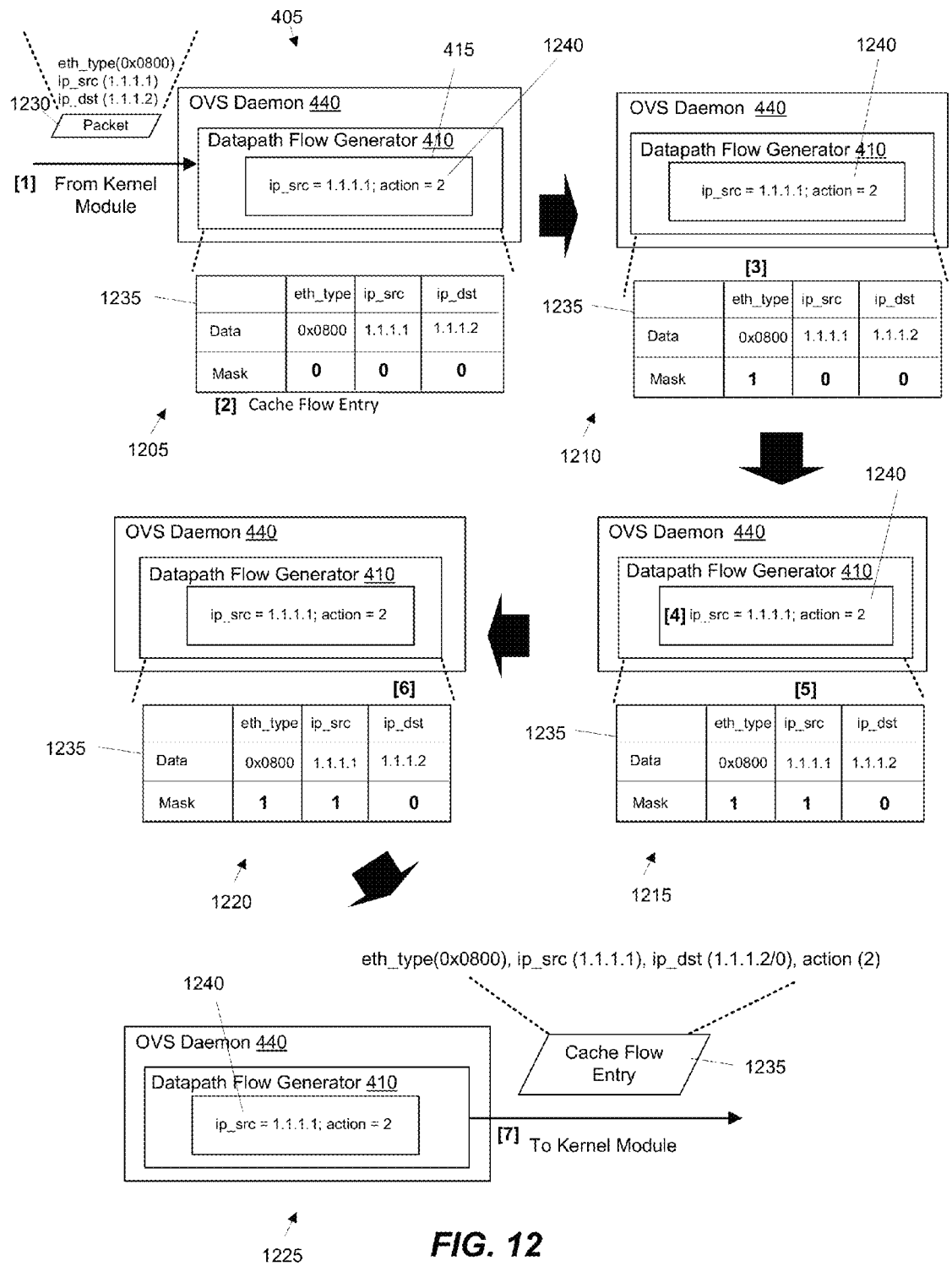
FIG. 12 illustrates an example of the switching element un-wildcarding a match field that is not explicitly specified in a flow from a flow table.

FIG. 12 illustrates an example of the switching element 405 un-wildcarding a match field that is not explicitly specified in a flow 1240. Five operational stages 1205-1225 of the switching element 405 are shown in this figure. The first stage 1205 illustrates the datapath flow generator 410 receiving a packet 1235. The packet has the following header field values, Ethertype of "0x0800", IP sources address value of "1.1.1.1", and IP destination address value of "1.1.1.2". To find a matching flow, the datapath flow generator 410 selects a first flow or rule 1240 from the flow table 415. The flow 1230 has a rule that states that any packet with an IP sources address of "1.1.1.1" should be output to port two.

The second stage 1210 illustrates the first comparison was made for a match field that is not explicitly specified in the flow 1240. The first comparison was made to a related field that indicates which protocol is encapsulated in the payload of the packet or frame. The header value "0x0800" indicates that the Ethertype is for Internet Protocol version 4 (IPv4). The comparison of the Ethertype match field provides the datapath flow generator 410 with a quick feedback on whether to compare the match field of the flow 1240 to the corresponding header value. In this case, as the Ethertype value relates to the IP source or destination address, the datapath flow generator 410 unmasks the Ethertype match field and proceeds to stage three 1215. In cases where the Ethertype values does not relate to IP source or destination address, the datapath flow generator 410 may unmask the Ethertype match field and select another flow to perform the matching.

The third stage 1215 illustrates comparing a match field associated with the flow 1240 to the corresponding header value. Specifically, the datapath flow generator 410 has selected the flow 1240 and compared the flow's IP source address value with the corresponding header value. As the IP source address match field was compared against a header field value, the datapath flow generator 410 has unmasked the match field. This is shown in the third stage 1215 with the zero being replaced by a one in the cache flow entry 1235, namely from the mask of the IP source address match field.

The third stage 1215 also illustrates that the datapath flow generator 410 has found a matching flow for the packet 1230. This is because the flow's only match field matches the corresponding header value. The fifth stage 1225 shows the OVS daemon 440 sending the cache flow entry 1235 to the kernel module. Specifically, the datapath flow generator 410 has associated the action from the flow 1240 with the cache flow entry 1235. The cache flow entry 1235 reads that any packet having the EtherType value of ""0x0800" and IP source address value of "1.1.1.1" should be output to port two. The cache flow entry 1235 includes a value for the IP destination address match field. However, the zero value after the slash mark indicates that the IP destination address match field is completely masked or wildcarded.

In several of the examples described above, the switching element un-wildcards each match field that was compared against a header value to find a matching flow. Alternatively, or conjunctively with such comparison, the switching element of some embodiments un-wildcards match fields after it finds the matching flow. For example, an action associated with the flow may specify consulting one or more header field values. When those field values are consulted, the switching element of some embodiments un-wildcards the corresponding match fields.

Figure 13:
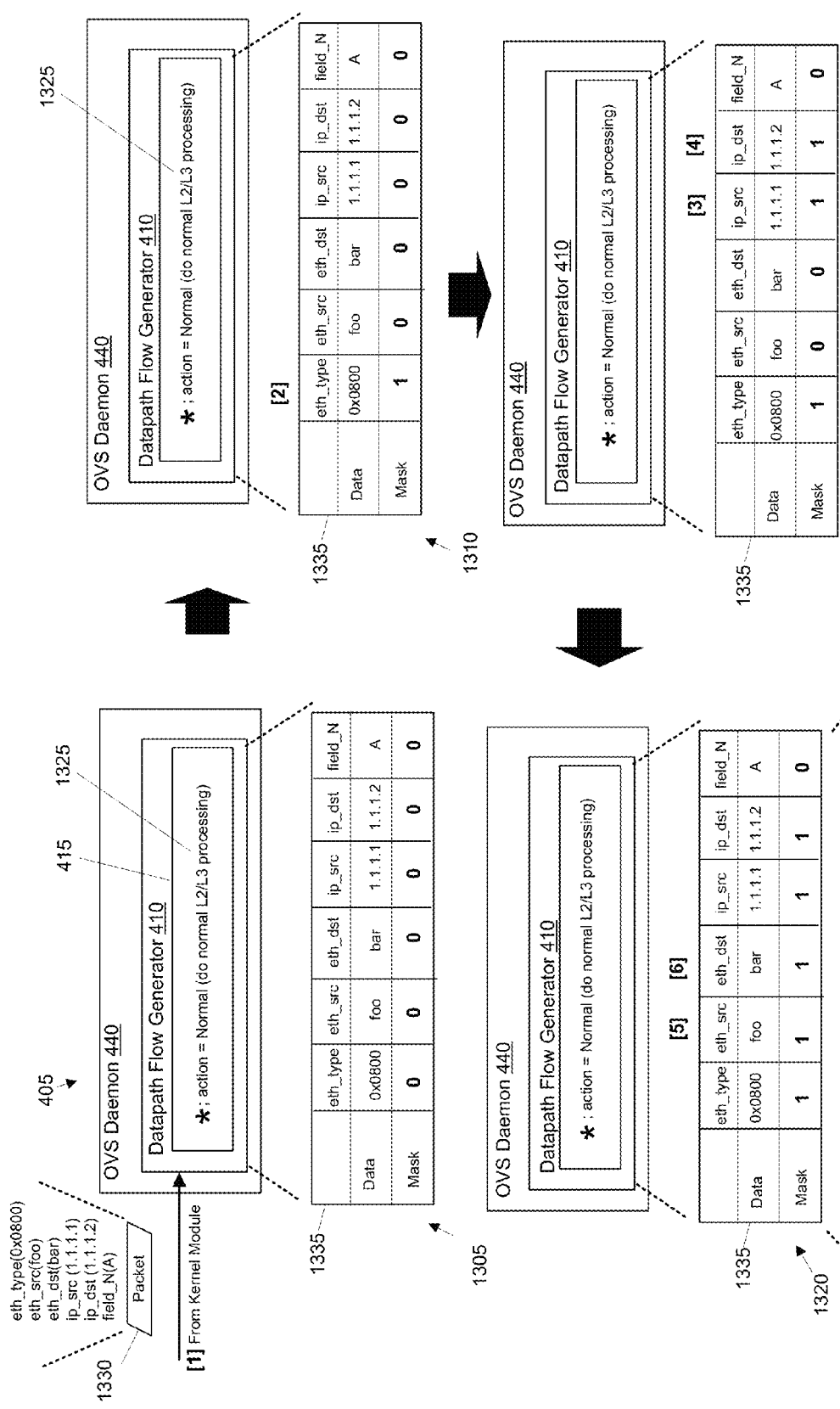
FIG. 13 illustrates an example of the switching element un-wildcards the corresponding MAC address fields based on an action associated with a flow.

FIG. 13 illustrates an example of the switching element 405 that examines one or more match fields based on an action of a match rule. In this example, the flow table includes a rule 1325 that specifies doing normal L2/L3 processing for all packets. Four operational stages 1305-1320 of the switching element 405 are shown in this figure. This example assumes that the switching element 405 is performing a bonding operation that allows more than one interfaces for a port.

The first stage 1305 illustrates the datapath flow generator 410 receiving a packet 1330. The packet has the following header field values, Ethernet type of "0x0800", Ethernet source of "Foo", Ethernet destination of "Bar", IP sources address value of "1.1.1.1", IP destination address value of "1.1.1.2", and a field N value of "A". To find a matching flow, the datapath flow generator 410 selects a first flow or rule 1325 from the flow table 415.

The second stage 1315 illustrates EtherType value being consulted for the cache flow entry 1335. Here, the datapath flow generator 410 has examined the EtherType value and unmasked the same field. The third stage 1315 illustrates IP source address and destination address values being consulted for the cache flow entry 1335. Here, the IP address values are derived from the corresponding packet header values. The third stage 1315 also shows that that two IP source and destination match fields are specified to be non-wildcard fields. This is because the switching element has been configured to do normal L2/L3 processing by matching at least these two field values against incoming packets.

The fourth stage 1320 illustrates Ethernet source address and destination address being consulted to the cache flow entry 1335. Here, the Ethernet address values are derived from the corresponding packet header values. The fourth stage 1320 also shows that that the two match fields are specified to be non-wildcard fields as the corresponding masks are removed from the cache flow entry 1335. This is because the switching element has been configured to do normal L2/L3 processing by matching at least these two additional field values against incoming packets.

In the fourth stage 1320, the switching element 405 has associated an action to the cache flow entry 1335. In some embodiments, the switching element 405 assigns the action based on results of a learning algorithm. As an example, the datapath flow generator might have chosen an output port based on the results of the MAC learning algorithm. In some embodiments, the OVS daemon includes a MAC learning module. The MAC learning module of some embodiments identifies, for a given packet, one or more ports to output the packet based on the packet's header field values.

Figure 14:
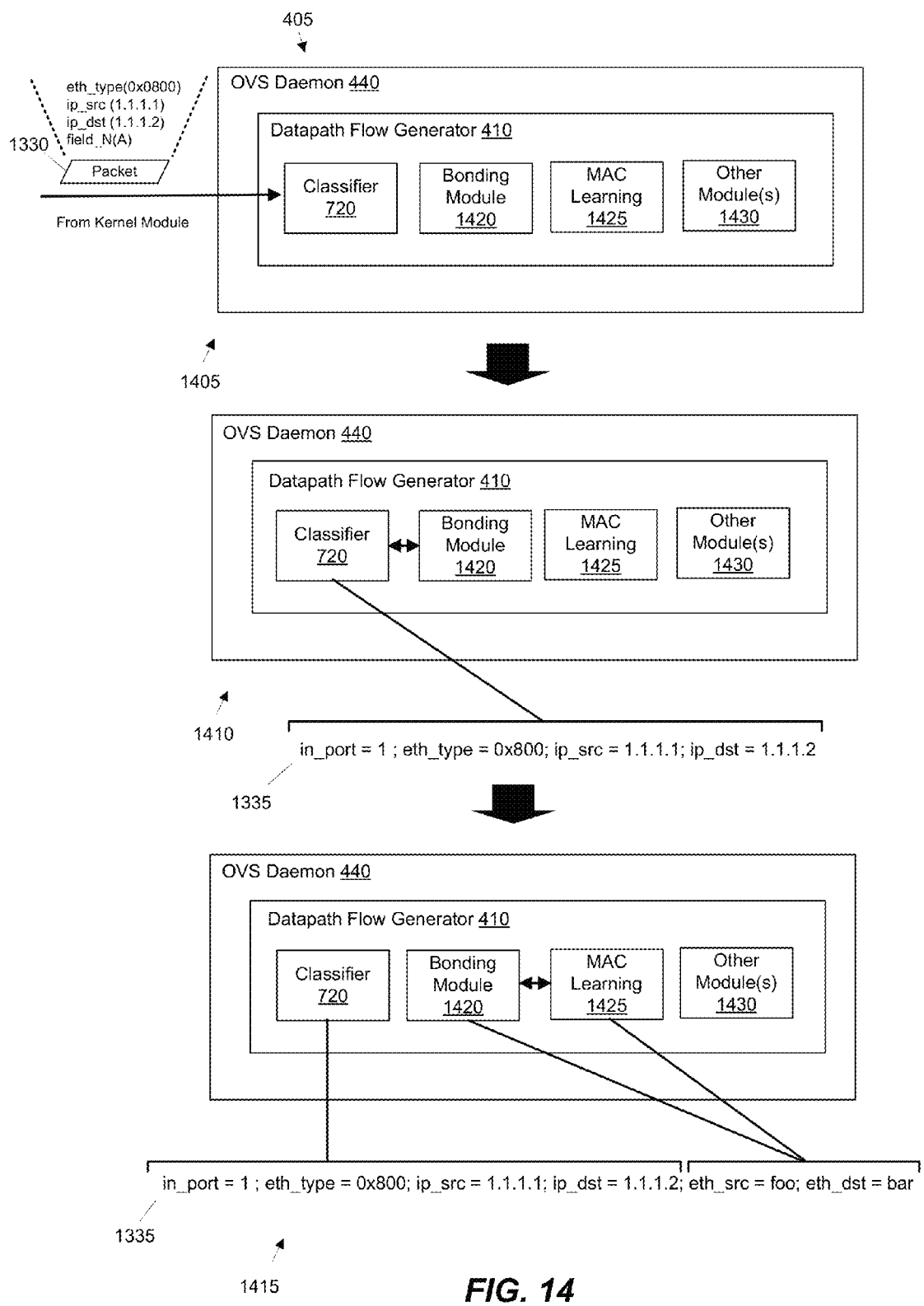
FIG. 14 provides an illustrative example of how the switching element utilizes a number of different components to generate the flow entry.

FIG. 14 provides an illustrative example of how the switching element 405 utilizes a number of different components to generate the flow entry 1335. Three operational stages 1405-1415 of the switching element 405 are shown in this figure. As shown, the datapath flow generator 410 operates in conjunction with a number of modules to dynamically generate a flow entry to cache in a datapath cache. These modules include the classifier 720, a bonding module 1420, and a MAC learning module 1425. The cache flow generator may operate in conjunction with a set of other modules 1430 to match and/or derive field values.

The first stage 1305 illustrates the OVS daemon 440 receiving the packet 1330. The packet is passed to the classifier 720 through the datapath flow generator 410. As shown in the second stage 1310, the classifier 720 derives various field values relating to the packet. This includes (1) the ingress port through which the packet was receives, (2) the EtherType value, (3) the source IP address, and (4) the destination IP address. The second stage 1410 also shows that the packet processing operation is then shifted to the bonding module 1420.

The third stage 1415 illustrates the bonding module 1420 calling the MAC learning module to associate the cache flow entry with MAC address values. In some embodiments, the MAC learning module 1430 of some embodiments identifies, for a given packet, one or more ports to output the packet based on the packet's header field values. As shown in the third stage 1415, the bonding module 1420 adds the Ethernet source and destination addresses returned by the MAC learning module 1430 to the cache flow entry.

Figure 15:
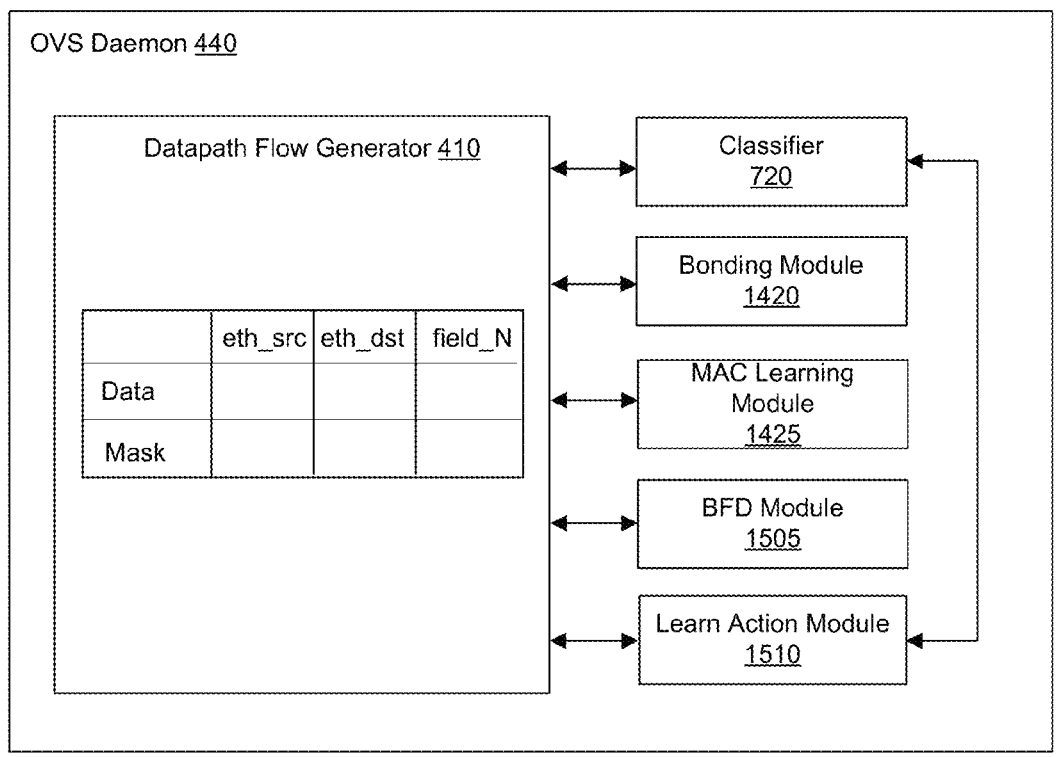
FIG. 15 illustrates an example of how the datapath flow generator generates a flow by interfacing with different components.

FIG. 15 illustrates an example of how the datapath flow generator 410 generates a flow by interfacing with different components. Here, the components include the classifier 720, the bonding module 1420, the MAC learning module 1425, Bidirectional Forwarding Detection (BFD) module 1505, and learning action module 1510. As mentioned above, the MAC learning module 1425 identifies, for a given packet, one or more ports to output the packet based on the packet's header field values (e.g., the destination Ethernet field value).

The classifier 720 of some embodiments is called to match certain match fields. The bonding module 1420 is called to perform bonding operation that allows more than one interfaces for a port. The BFD module 1505 is used to detect whether a packet is a BFD packet. For example, if a packet comes in, the BFD module 1505 may be called to determine whether the packet is a BFD packet or not. This may cause a change in the masking or wildcarding of match fields relating to BFD. If the packet is a BFD, the BFD module 1505 may consume the packet and generation of the cache flow will terminate at that point. Different from the BFD module 1505, the learn action module 1510 installs a rule in the classifier, which can affect traffic. The learn action module 1510 can be used to more abstractly learn MAC addresses. For example, if a packet with a particular Ethernet source address comes in through port 1, the learn action module 1510 can be used to install a rule that specifies that any packet whose destination MAC address field has the same address should be output to port 1.

The datapath flow generator 410 may call any one or more of these modules. One or more of these modules may call another module. Each one of the different modules may be called an arbitrary number of times when generating the flow to store in the cache. As an example, the data flow generator may call the classifier and receive a result; however, depending on the flow, it can call other modules such as the MAC learning module. One of ordinary skilled in the art would understand that the modules shown in FIG. 15 are example modules. For example, different embodiments can include even more modules, fewer modules, or different combination of modules.

B. Example Flow

Figure 16:
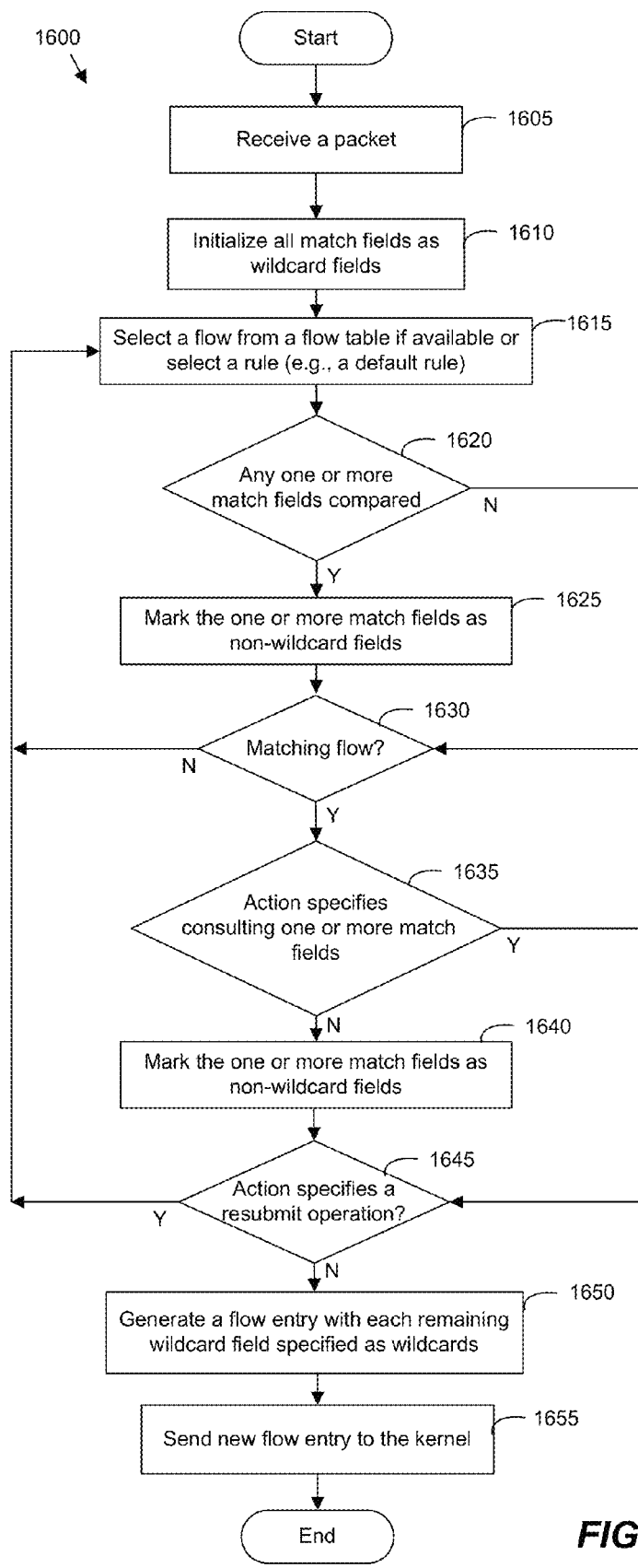
FIG. 16 conceptually illustrates a process that some embodiments perform to dynamically generate a new flow with zero or more wildcard fields FIG. 17 conceptually illustrates a process that some embodiments implement to proactively cross-product tables in the slow path packet processing pipeline.

Having described various examples of generating cache flow entries, an example process will now be described. FIG. 16 conceptually illustrates a process 1600 that some embodiments perform to dynamically generate a new flow with zero or more wildcard fields. In some embodiments, the process is performed by the switching element's OVS daemon.

The process 1600 begins when it receives (at 1605) a packet (e.g., from the kernel module). The process 1600 then initializes or sets (at 1610) all match fields as wildcard match fields. Alternatively, the process 1600 might initialize some but not all match fields as wildcard fields. In addition, the process 1600 might initialize an ingress port field as a wildcard field. The ingress port is the port through which the switching element has received the packet. The ingress port may be a logical port. In some embodiments, the process never wildcards the ingress port field.

At 1615, the process 1600 determines if there any available flows (e.g., in a flow table). At 1610, the process selects a flow from a flow table. If there are no flows, the process might select a rule (e.g., a default rule). The switching element can have such one or more rules that specify performing normal L2 processing, dropping packet, and/or sending the packet to the network controller. In some embodiments, the process 1600 selects a flow according to its associated priority value. For example, the process 1600 might iteratively select flows, starting from the one with the highest priority value to the lowest priority value. This is because there might be two flows in a flow table that match a packet but only one matching flow is cached in a datapath cache.

After selecting a flow, the process 1600 determines (at 1620) whether any one or more match fields have been compared with header values. If so, the process 1600 marks (at 1625) each of the one or more match fields as non-wildcard fields. Otherwise, the process determines (at 1630) whether the flow is a match for the packet. If the flow is not a match, the process returns to 1615, which is described above. Otherwise, the process 1600 determines (at 1635) whether the action of the matching flow specifies consulting one or more match fields. For example, based on the action, a switching element might consult a destination Ethernet address value of a packet to compare against a MAC address of a virtual machine that is connected to its port. As another example, the process 1600 might check if the packet is a BFD packet. If the process performs such consultation, the process 1600 marks (at 1640) the one or more match fields as non-wildcard fields.

If the action does not specify examining other match fields, the process 1600 then determines (at 1645) whether the matching flow is associated with a resubmit operation. In some embodiments, the resubmit operation is used to concatenate multiple flows into one datapath flow. For example, the process might be set up as multiple pipelines the packet goes through (e.g., to do a look-up in the L2 pipeline, then do a resubmit, and do a look-up in the L3 pipeline, etc.). Also, each wildcard and non-wildcard fields caries over from one hop to the next.

If the action specifies a resubmit operation, the process 1600 returns to 1615, which is described above. If the flow is not associated with such resubmit action, the process 1600 generates (at 1650) a new flow entry. The process 1600 of some embodiments generates the new flow entry by taking into account each remaining wildcard match fields. That is, the generated flow may include zero or more wildcard fields based on whether any of the wildcarded fields were marked as non-wildcard files (e.g., at operation 1625 and 1640). Upon generating the flow entry, the process 1600 sends (at 1655) the flow entry to the kernel. The process 1600 then ends.

Some embodiments perform variations on the process 1600. The specific operations of the process 1600 may not be performed in the exact order shown and described. For example, some embodiments optimize the process through a series of hash table look-ups when matching flows. Accordingly, the specific operations may not be performed in one continuous series of operations, and different specific operations may be performed in different embodiments.

IV. Ideal Flow Cache

The following sections describe several different approaches to compute flow cache entries. First, the first part of this section describes the ideal flow cache of some embodiments. In the ideal case, the forwarding element of some embodiments computes the cache contents proactively by taking the cross product of flow tables that packets traverse within the slow path. For small forwarding tables, computing the cross-producted flow table is manageable. However, for a large number of flows, the cross product can grow non-polynomially.

The second part of this section then describes an on-demand, reactive algorithms. In this case, the forwarding element of some embodiments dynamically computes an entry in the cache based on the packet received. To compute a flow cache entry, for each flow table traversed in the slow path, the forwarding element of some embodiments subtracts the header space matching higher priority flows from lower priority flows. Using header space analysis, the complement of the group of higher priority flows can be resolved to a union. This union may be intersected with the packet to determine a packet header field bits that can be wildcarded in the cached entry. However, the full minimization of the union reduces to a non-polynomial set cover problem.

Additionally, this application presents several other heuristic algorithms for computing the flow cache entries. The algorithms include (1) several methods that use a longest prefix match and (2) and several other method that use common match techniques. These algorithms will be described in Sections VI and VII, respectively. However, before describing these algorithms, several classification algorithms of some embodiments will be described in Section V.

A. Cache Population

The computing the ideal fast path, a pre-populated cache table that never results in a miss, can be complex. Here, it is assumed that the slow path is a pipeline of flow tables (supporting wildcards and priorities) whereas the fast path implements the flow cache with a single flow table (supporting wildcards but not priorities, as in OVS). To completely avoid cache misses, the slow path of some embodiments must translate the slow path table pipeline into a single flow table with equal forwarding semantics and push that into cache. Note that some embodiments do not distinguish between packet field types but consider the general problem.

Figure 17:
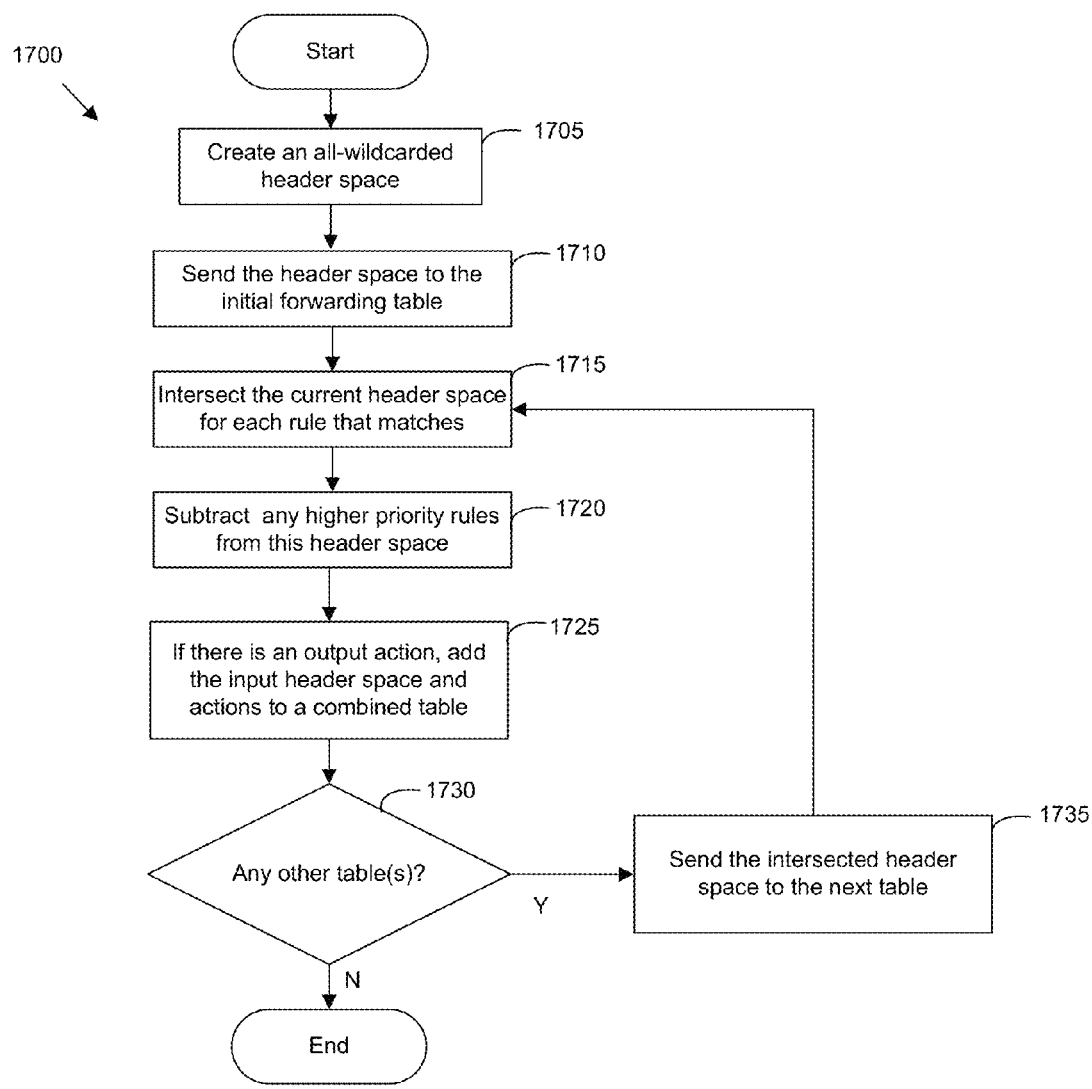

To arrive at this single classification table, the forwarding element of some embodiments proactively cross product the tables in the slow path packet processing pipeline. FIG. 17 conceptually illustrates a process 1700 that some embodiments implement to proactively cross product the tables in the slow path packet-processing pipeline. In some embodiments, this expanded table can be derived through the following algorithm shown in the figure.

As shown, the process 1700 creates (at 1705) an all-wildcards header space. The process then and sends (at 1710) the header space to the initial forwarding table. The process 1700 intersects (at 1715) the current header space for each rule that matches. In some embodiments, the process 1700 performs the intersection by creating a new header space and applying the rule's action. The process 1700 then subtracts (at 1720) any higher priority rules from this header space. If there is an output action, the process 1700 adds (at 1725) the input header space and actions to the combined table. Otherwise, the process determines (at 1730) if there is another table. If so, the process 1700 sends (at 1735) the intersected header space to the next table.

FIG. 18 provides an illustrative example how some embodiments cross product several tables in the slow path packet processing pipeline. FIG. 18 shows two tables, a simple access control list (ACL) table 1805 with priorities and a flow table 1810 to send packets out after ACL processing. The first table 1805 has a few ACLs while the second table holds nothing but a single output rule after the ACL processing. Thus, the header space input to Rule 3 is all-wildcards intersected by its rule, minus the header space of transport destination ports 80 and 443:

$$\{\text{all-wildcards}\} \cap \{dl\_src==01{:}xx{:}xx\} - \{tp\_dst==80 \cup tp\_dst==443\}$$

Here, the actions for Flow 3 are applied to this header space. At each step, there is both (1) an input header space, which is the set of all packets that can arrive at a given rule, and (2) an output header space, which is the header space after the rule's actions are applied to the input header space. In some embodiments, the output header space must take into account wildcards that could be shifted through registers, such as REG5 into REG1 in Table 1805. Essentially, the header space of lower priority rules becomes the union of higher priority flows subtracted from the initial all-wildcards header space.

FIG. 18 also illustrates an example of the resulting cross-producted flow table. As shown, after cross producting these forwarding tables, there is one full forwarding table 1815, which are strictly defined by header spaces and actions. To use the resulting forwarding table 1815 with a fast path classifier, the resulting header spaces have to be further translated to unions of header spaces (each corresponding a single rule) through header space arithmetic.

While the proactive, cross-producting algorithm is useful in understanding the ideal cache table, it may be impractical due to flow table expansion. The table size can grow in polynomial time with the number of rules.

B. Incremental Population

Figure 19:
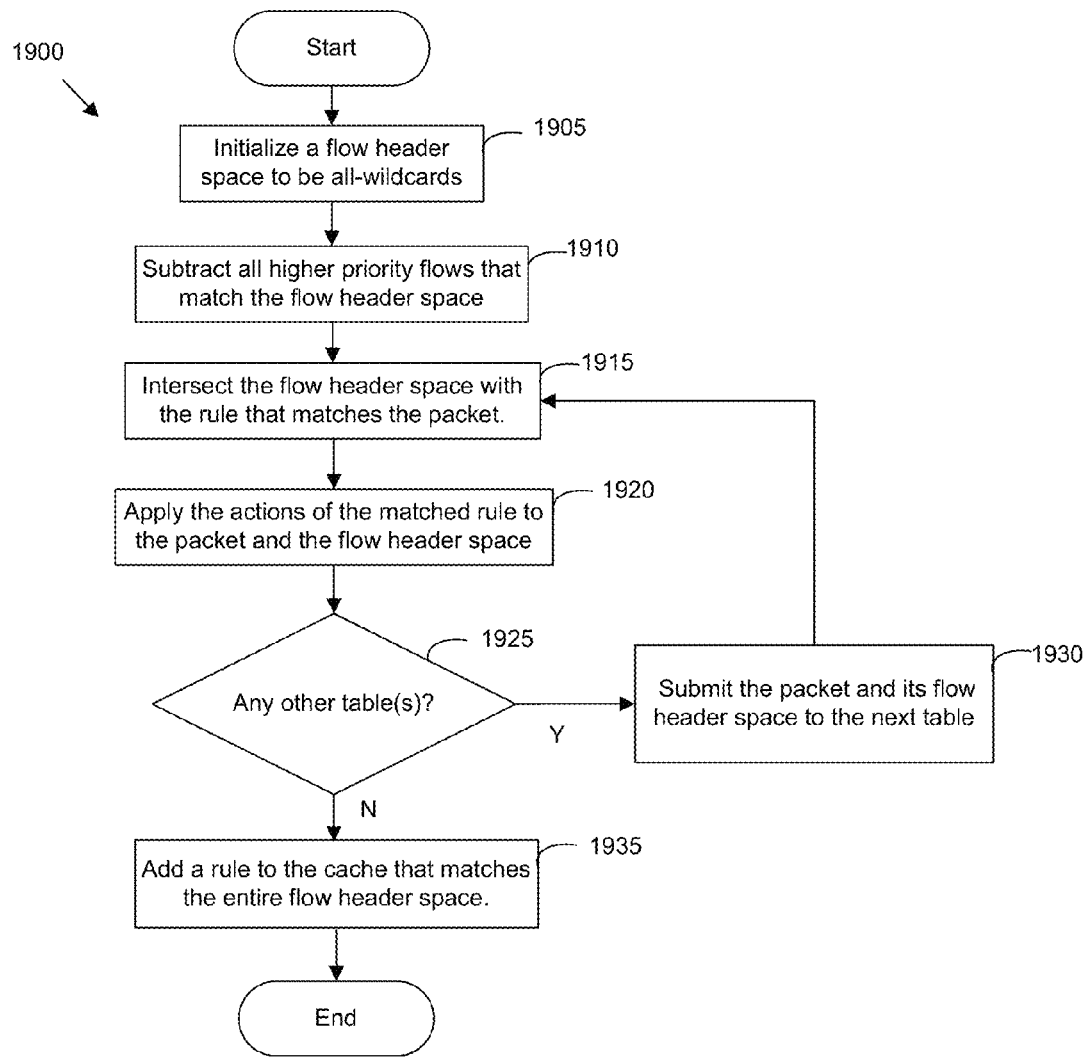
FIG. 19 illustrates a process that some embodiments implement to incrementally computing the cross-producted table.

Given the cost of the proactive approach, an example of incrementally computing the cross producted table based on packets received will be described. FIG. 19 illustrates a process that some embodiments implement to incrementally computing the cross-producted table. In some embodiments, the intuition is similar to the general algorithm described above, but on a per-flow basis in how a packet traverses the pipeline of tables:

1. When the packet arrives in the first table, the process 1900 initializes (at 1905) a flow header space to be all-wildcards.

2. The process subtracts (at 1910) all higher priority flows that match the flow header space (at first all higher priority rules). The process 1900 intersects (at 1915) the flow header space with the rule that matches the packet. The process 1900 applies (at 1920) the actions of the matched rule to the packet and the flow header space.

3. If forwarding, the process 1900 submits (at 1930) the packet and its flow header space to the next table. In some embodiments, the process repeat step 2 described above, by further subtracting higher priority flows and applying matched rules, until the process either drops the packet or has a final output action.

4. The process adds a rule to the cache that matches the entire flow header space. Logically, the processed packet is an element of this flow header space.

For example, suppose there is a forwarding table with ACLs, A=0101 and B=0110 (without specifying which fields bits correspond), that drop all packets, and a lower priority general rule C=xxxx that matches all packets and forwards on Port 2.

Assuming the incoming packet matches C, the system may want to compute the general rule to install. As discussed above, this corresponds to the header space hc=C−A−B. If the system wished to determine a general rule for a given packet that is the most general subset of hc, the general rule can be derived by using header space algebra by evaluating the intersection of the complement of higher priority flows, B and C, and distributing the union over the intersection:

$$h_c = C - A - B$$
$$= C \cap A' \cap B'$$

$$A' \cap B' = (0101)' \cap (0110)'$$
$$= (1xxx \cup x0xx \cup xx1x \cup xxx0)$$
$$\cap (1xxx \cup x0xx \cup xx0x \cup xxx1) = 1xxx \cup x0xx$$
$$[(xx1x \cup xxx0) \cap (xx0x \cup xxx1)] = 1xxx \cup x0xx$$
$$\cup [xx1x \cap (xx0x \cup xxx1)]$$
$$\cup [xxx0 \cap (xx0x \cup xxx1)] = 1xxx \cup x0xx \cup xx11 \cup xx00$$

For a packet of p=1011 to match $h_c$ above, the system intersects the packet, $P_s$, with the above sets for A'–B', which results in 1xxx, x0xx, or xx11:

$$P_s(p) - A - B = P_s(p) \cap A' \cap B'$$
$$= P_s(1011) \cap (1xxx \cup x0xx \cup xx11 \cup xx00)$$
$$= 1xxx \cup x0xx \cup xx11$$

While it is easy to express this header space with logic, minimizing the set of a non-polynomial number unions is a NP-hard problem. Furthermore, the system of some embodiments only wishes to install one rule per packet for simplicity, and the one with the fewest number of un-wildcarded bits. In the general case, for each packet of size L, there are $2^L -1$ possible wildcard expressions that match the packet, based on which k bits are un-wildcarded. For packet p=1011, the system can have (4/1)+(4/2)+(4/3)+(4/1) possible cache entries it could install, depending on the subtracted higher priority flows:

$$P_s(1011) = \{1xxx, x0xx, xxx1, xxx0, 10xx, x01x, x01x, xx11 \ldots\}$$

The total number of possible flows that include the packet are:

$$|P_s(p)| = \sum_{k=1}^{L} \binom{L}{k} = 2^L - 1$$

Accordingly, the system of some embodiments turns to one or more heuristics in the following sections to find the most general rule to install. In some embodiments, the heuristic includes methods that find common matches amongst a union of rules and that differ from the packet and methods that use a longest prefix match.

V. Example Classification Algorithms

In several of the examples described above, the datapath flow generator utilizes a "linear search" algorithm to find a matching flow. The "linear search" algorithm does not require much memory, but it may not be very fast. The switching element of some embodiments can utilize at least one of a number of different algorithms when un-wildcarding match fields. Several examples such classification algorithms will now be described in this section by reference to FIGS. 20-25.

A. Example Tuple Space Search Algorithm

In some embodiments, the switching element uses a tuple search algorithm to find a matching flow. The tuple space search algorithm is a hashed-based search algorithm. It is similar to the "linear search" algorithm. However, instead of linearly traversing through every rule, the tuple space algorithm linearly traverses through different groups of rules that are organized by match fields. In some cases, the tuple space search can be much faster than a "linear search" because it can perform a lookup within a group of rules that have the same wildcard pattern using a hash table.

An example of a tuple space search will now be described. Suppose that a switching element maintains a flow table with the following three rules:

priority 5, in_port=1, eth_src=2→Action 1;
priority 4, in_port=2, eth_src=3→Action 2; and
priority 3, in_port=5→Action 3.

In some embodiments, at flow table creation time, the switching element organizes these rules into different groups based on what fields (or partial fields) the rules match on. In this case, there are two groups:

group 1 (in_port, eth_src); and
group 2 (in_port).

Here, each rule is placed in a hash table that belongs to a particular group (e.g., group 1 or group 2). The hash table can have very fast (e.g., nearly instant) lookup. Thus, instead of a linearly traversing through all of the rules, the switching element can traverse through each hash table, doing a hash table lookup on each one, and un-wildcarding the fields that the switching element looks at or consults. In some embodiments, each hash table carries with it the priority of the highest priority rule it contains. Hence, if there is a match in the first hash table, the switching element is programmed to know that the rule has a higher priority value than every other rule in a subsequent table. The switching element can therefore skip the lookup and un-wildcarding in the subsequent hash table.

Figure 20:
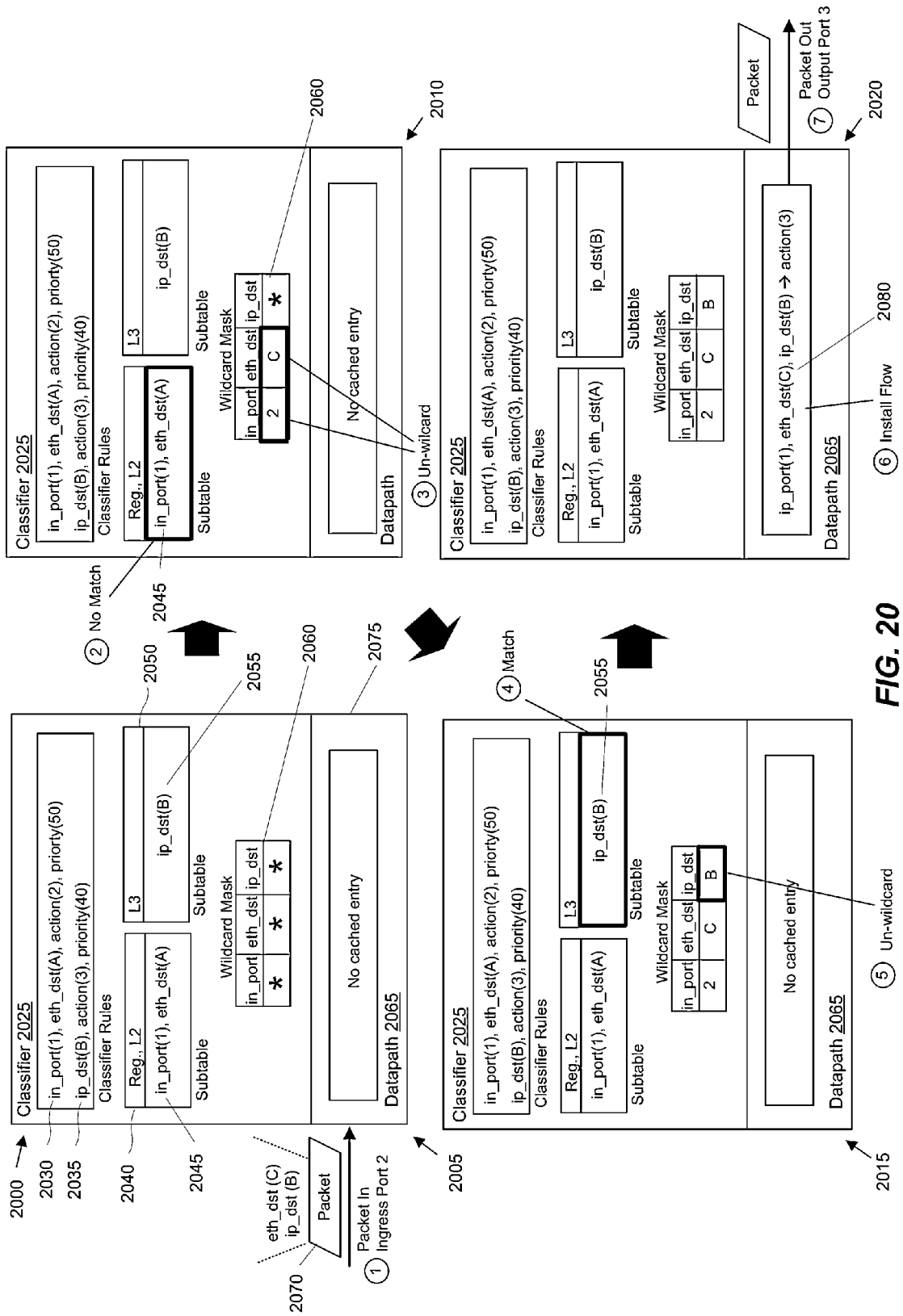
FIG. 20 provides an illustrative example of performing a tuple space search to find a matching rule for a packet and generate a wildcard mask.

FIG. 20 provides an illustrative example of performing a tuple space search to find a matching rule for a packet and generate a wildcard mask. Four operational stages 2005-2020 of a forwarding element 2000 are shown in the figure. The forwarding element 2000 is similar to one described above by reference to FIG. 4.

As shown, the forwarding element 2000 includes a classifier 2025 to perform packet classification. The figure also conceptually shows several classifier rules 2030 and 2035, which are also referred to herein as flows or flow entries. The forwarding element stores such rules in one or more hash tables. In the example of FIG. 20, the forwarding element has generated a hash from the rule 2030 and stored the hash in a subtable 2040. The forwarding element has also hashed the rule 2035 and stored its hash in a subtable 2050.

In some embodiments, each subtable 2040 or 2050 represents a set of rules that is organized by match fields. More specifically, the tuple or subtable of some embodiments has one kind of match pattern relating to a set of one or more match fields. Note that a match field can have different match patterns. For instance, an IP address match field (e.g., source or destination) may match on the first eight bits and another IP address match field may match on the first sixteen bits. In such cases, the two IP addresses would be in different tuples or subtables even though they match on the same match field. The reason being that when the forwarding element hashes it needs to hash specific number of bits. As will be described below, in the staged implementation, each tuple or subtable may be associated with multiple different match patterns, one for each lookup stage.

In the example of the FIG. 20, the subtable 2040 can store one or more hash values relating to the register (e.g., metadata such as ingress port, egress port, etc.) and Layer 2 (L2) match fields. The subtable 2050 stores one or more hash values relating to the same set of Layer 3 (L3) match fields.

The rule 2030 has a higher priority value than the rule 2040. Accordingly, the classifier 2025 might first search the subtable 2040 to find a match for a packet. If the search fails, the classifier 2025 might then search the subtable 2050. In some embodiments, when the forwarding element receives a classifier rule (e.g., from a network controller), it hashes one or more of its match field values and stores the hash in a subtable along with the rule's action. The subtable may also track the priority value of the rule.

The first stage 2005 shows the forwarding element 2000 receiving a packet 2070. In particular, a kernel module 2075 receives the packet and performs packet classification to find a matching flow in the datapath 2065. As the datapath does not have a matching flow, the control is shifted from the kernel space to the userspace, as illustrated in the second stage 2010.

In the second stage 2010, the classifier 2000 has received the packet. The classifier 2025 performs packet classification to find a matching rule for the packet in one of the two subtables 2040 and 2050. Specifically, the classifier 2025 uses a hash function to generate a hash value of the ingress port value and the Ethernet destination address header value. To find the matching hash value, the classifier 2025 then performs a lookup of the subtable 2040. The classifier 2025 also un-wildcards (i.e., unmasks) bits of the wildcard mask 2060 in accordance with the wildcard pattern of the subtable 2040. For instance, as the subtable 2040 is associated with bits relating to ingress port and Ethernet destination fields, the classifier un-wildcards the bits from the wildcard mask that relate to those fields. The second stage 2010 shows that there was no matching rule for the packet in the subtable 2040.

The third stage 2015 shows the classifier 2015 performing a hash lookup on the other subtable 2050. Similar to the previous stage, the classifier 2025 uses a hash function to generate a hash from the destination IP address header value. The classifier 2025 then searches the subtable 2050 to find the matching hash value. The classifier 2025 also un-wildcards bits of the wildcard mask 2060 in accordance with the wildcard pattern of the subtable 2050, which in this case relates to the destination IP address field. In the third stage 2015, the classifier 2025 has found the matching hash in the subtable 2050.

The fourth stage 2020 shows several example operations performed by the forwarding element 200 after finding a matching rule 2040 and generating the wildcard mask. Specifically, the kernel module 2075 receives the packet from a userspace daemon with a set of instructions on how to process the packet. Following the set of instructions, the kernel module outputs the packet through one of the ports. The kernel module also receives a flow entry 2080 that was generated based on the matching rule. The kernel module 2075 then installs the flow entry in the datapath 2065.

In the example described above, the tuple space search resulted in the wildcard mask being completed unmasked. This in turn resulted in the flow entry 2080 having no wildcard match fields. Therefore, the flow entry 2080 is essentially a microflow that processes only each packet that matches all of the flow's match field values. Different from a microflow, a megaflow can potentially process a diverse collection of packets as long as each of those packets match on only each match field value or a portion thereof that is un-wildcarded.

B. Example Staged Lookup Algorithm

As described above, tuple space search searches each tuple with a hash table lookup. In the example algorithm to construct the megaflow matching condition, this hash table lookup means that the megaflow must match all the fields included in the tuple, even if the tuple search fails, because every one of those fields may have been significant for the lookup result so far. This is shown in FIG. 20 with the classifier un-wildcarding the match fields associated with the subtable, even though the search failed.

When the tuple matches on a field that varies often from flow to flow, e.g. the TCP source port, the generated megaflow is not much more useful than installing a microflow would be because it will only match a single TCP stream. This points to an opportunity for improvement. If one could search a tuple on a subset of its fields, and determine with this search that the tuple could not possibly match, then the generated megaflow would only need to match on the subset of fields, rather than all the fields in the tuple. The tuple implementation as a hash table over all its fields made such an optimization difficult. One cannot search a hash table on a subset of its key.

In some embodiments, the switching element uses a staged lookup algorithm to search for one or more matching flows. The staged lookup algorithm is similar to the tuple space algorithm; however, it takes into account the fact that some header fields may change more frequently than others. Based on this fact, it performs a multi-staged search starting with infrequently changing fields, and progressing to frequently changing ones. The ordering of the different stages is important because the staged algorithm of some embodiments is essentially holding off on searching the frequently changing fields (e.g., L3 and L4 fields) until it is necessary to do so. One of the motivations for the staged lookup algorithm, and other algorithms described herein, such as the common match algorithms and prefix tracking algorithms, is to avoid unnecessarily un-wildcarding more bits than necessary; and thereby, optimizing the datapath lookup or cache lookup by matching on fewer bits.

In utilizing the staged lookup algorithm, the switching element of some embodiments does not look at all the fields (e.g., in a hash table) at once but first looks at those fields that do not change frequently. If none of those fields matches, the switching element terminates the lookup operation without having to lookup fields that change frequently. For instance, suppose that there is a particular hash table, which looks at the fields, in_port, eth_src, ip_src, and tcp_src.

With standard tuple space search, the software switching element looks at all those fields irrespective of whether the fields changes frequently or infrequently. With the staged lookup algorithm, the lookup is broken into different stages. For instance, in the first stage, the algorithm can look up the in_port in a hash table and get a simple "yes" or "no" as to whether there is a match on the in_port. If the answers "no", the algorithm can terminate knowing that no further stages match. If the answer is "yes", the algorithm can proceed to the next stage, which looks up the in_port and eth_src in a separate hash table. If successful, the algorithm may move onto in_port, eth_src, and ip_src. Thereafter, if successful again, the algorithm may look up the full in_port, eth_src, ip_src, and tp_src. One of the main ideas here is that, at each stage, if there is a miss, the algorithm can terminate without looking at the higher layer headers. This is important because the higher layer headers are the ones that are most likely to change from packet to packet and therefore the most problematic when trying to improve performance (e.g., megaflow performance). In other words, the higher layer headers tend to take longer to search than the metadata and the lower layer header because they vary from packet to packet.

Figure 21:
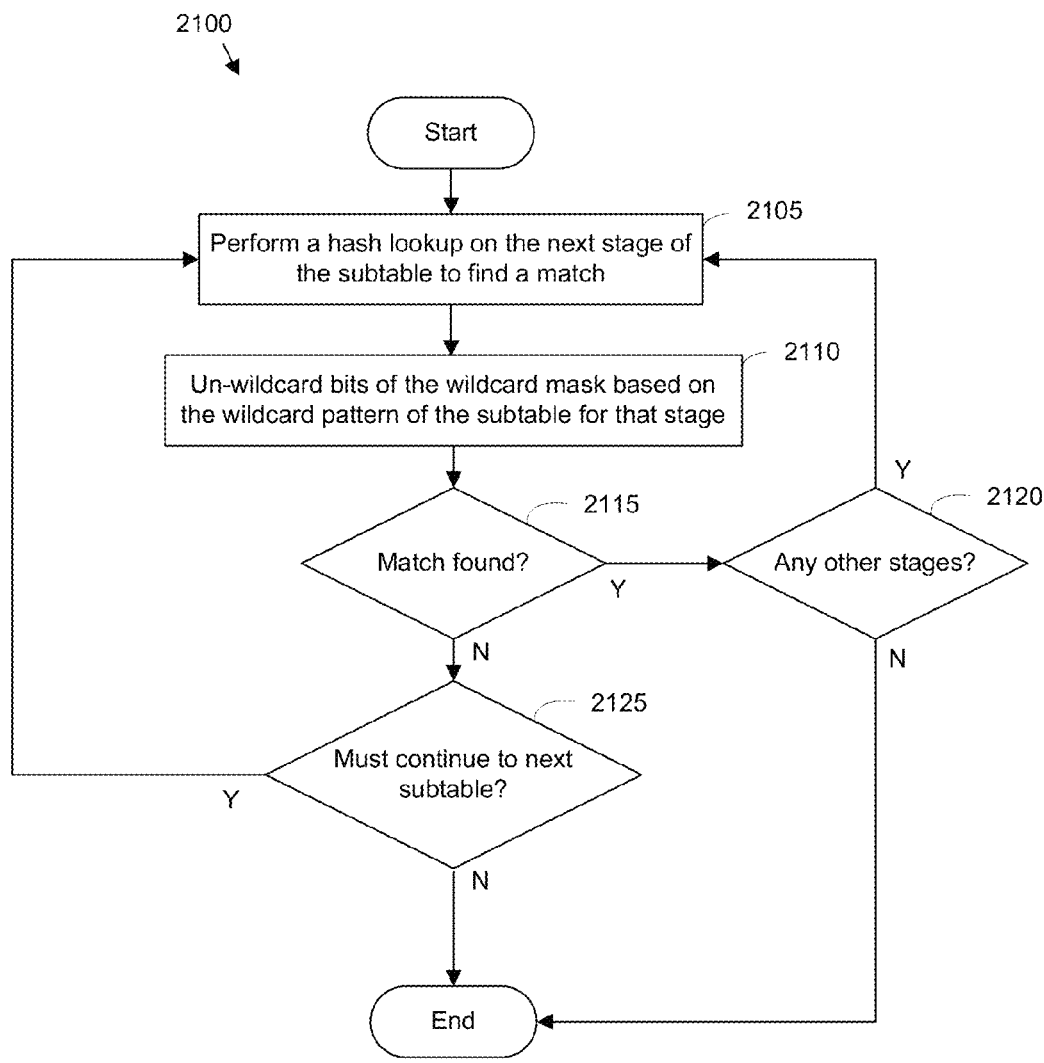
FIG. 21 conceptually illustrates a process that some embodiments implement to perform a staged lookup up and un-wildcard bits associated with a wildcard mask.

FIG. 21 conceptually illustrates a process 2100 that some embodiments implement to perform a staged lookup up and un-wildcard bits associated with a wildcard mask. In some embodiments, the process 2100 is performed by a forwarding element. The process 2100 begins when it performs (at 2105) a hash lookup on the next stage of a subtable to find a match. The process 2100 then un-wildcards (at 2110) bits of the wildcard mask based on the wildcard pattern of the subtable for that stage. The wildcard pattern can be any number of different bits associated with a set of one or more match fields.

In some embodiments, each bit of the wildcard mask indicates whether the corresponding bit of a match field value is wildcarded or un-wildcarded. For instance, when set to zero, the bit of the wildcard mask can indicate that the bit of the match field value is wildcarded. Conversely, when set to one, the bit of the wildcard mask can indicate that the bit of the match field value is un-wildcarded.

At 2115, the process 210 determines whether a matching hash value is found in the current stage of the subtable. If no matching hash is found, the process 2100 terminates the lookup operation at the current stage and proceeds to 2125, which is described below. By terminating the lookup operation at a particular stage, the process 2100 can avoid un-wildcarding additional bits of the wildcard mask that is associated with each next stage processing.

As shown in FIG. 21, if the matching hash is found, the process 2100 determines (at 2120) whether there are any other stages. If there is another stage, the process returns to 2105, which is described above. Otherwise, the process 2100 proceeds to 2125, which is described below.

At 2125, the process 2100 determines whether it must continue to the next subtable. Here, instead of simply proceeding to the next subtable, the process 2100 of some embodiments initially decides whether to proceed to the next subtable. In some embodiments, the process 2100 makes this decision based on a priority value (e.g., a maximum priority value) associated with a subtable. For instance, it is possible that there are additional subtables. However, depending on the priority value of each subtable, the process 2100 may not search another subtable. If the process 2100 decides to perform a lookup on the next subtable, the process 2100 returns to 2105, which is described above. Otherwise, the process 2100 ends.

Some embodiments perform variations on the process 2100. The specific operations of the process 2100 may not be performed in the exact order shown and described. The specific operations may not be performed in one continuous series of operations, and different specific operations may be performed in different embodiments.

Figure 22:
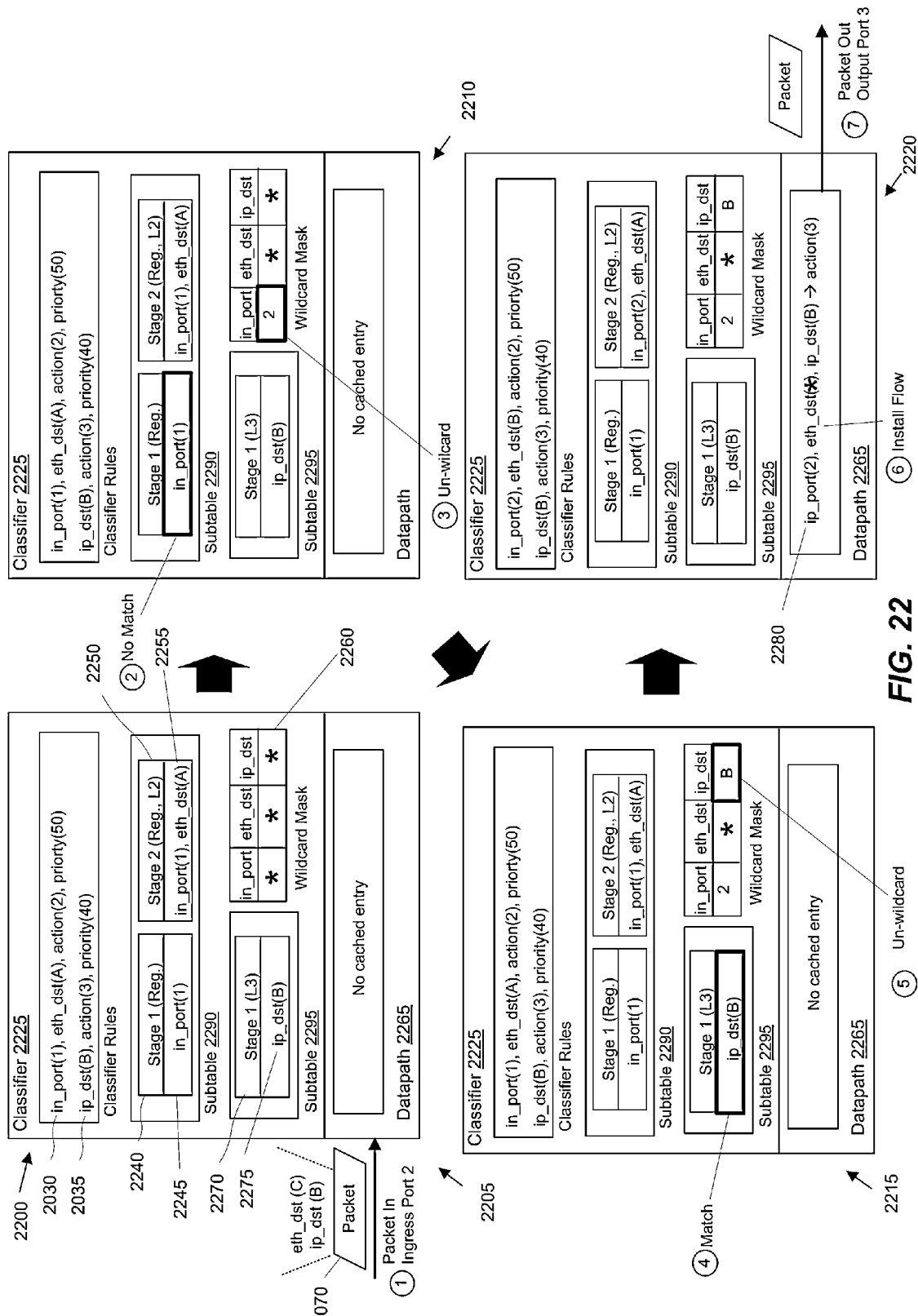
FIG. 22 provides an illustrative example of a forwarding element that performs a staged version of the tuple space search.

FIG. 22 provides an illustrative example of a forwarding element 2200 that performs a staged version of the tuple space search. Four operational stages 2205-2220 of the forwarding element are shown in the figure. These stages 2205-2220 are similar to ones described above by reference to FIG. 20. The rules 2030 and 2035 are the same, and the packet 2070 is the same. However, the staged lookup algorithm results in a different wildcard mask 2260. In the example of FIG. 20, the tuple space search led to all of the bits of the wildcard mask being un-wildcarded. Different from FIG. 20, FIG. 22 shows that, if any search in a stage turns up no match, then the overall search of the subtable has also fails, and only one or more fields included in each search stage must be added to the megaflow match.

In this example of FIG. 22, the subtable 2290 stores the first rule 2030 in two stages 2240 and 2250. Stage one 2040 includes a hash 2245 relating to an ingress port field. Stage two 2250 includes a hash 2255 relating to the ingress port and Ethernet destination fields. Different from the first subtable 2290, the second subtable 2295 has only one stage 2270. This one stage includes a hash 2275 relating to the IP destination address field that is associated with the second rule 2035.

The first stage 2205 shows the forwarding element 2200 receiving a packet 2070. The second stage 2210 shows the classifier 2225 performing a lookup of the first stage 2240 of the first subtable 2290. Specifically, the classifier 2225 has unmasked (e.g., set to one) the bits of the wildcard mask associated with the ingress port field. The classifier 2225 has also failed to find a matching hash in the first stage 2240 of the first subtable 2290. Accordingly, the third stage 2215 shows that the classifier 2225 did not search the remaining stage 2250 of the first subtable 2290 but moved onto the next subtable 2295. The classifier also did not un-mask the bits associated with the Ethernet destination address match field because it did not get past stage one 2240 of the first subtable 2290.

In the third stage 2215, the classifier 2225 searches the subtable 2290 and finds a matching hash for the destination IP address header field. The classifier also un-masks the bits of the wildcard mask associated with the destination IP address field. The fourth stage 2220 shows that the forwarding element 2200 has installed a new flow entry 2280 in the datapath 2265 based on the rule of the matching hash and the wildcard mask. Here, the flow entry includes a wildcard match field for the Ethernet destination address value.

Figure 23:
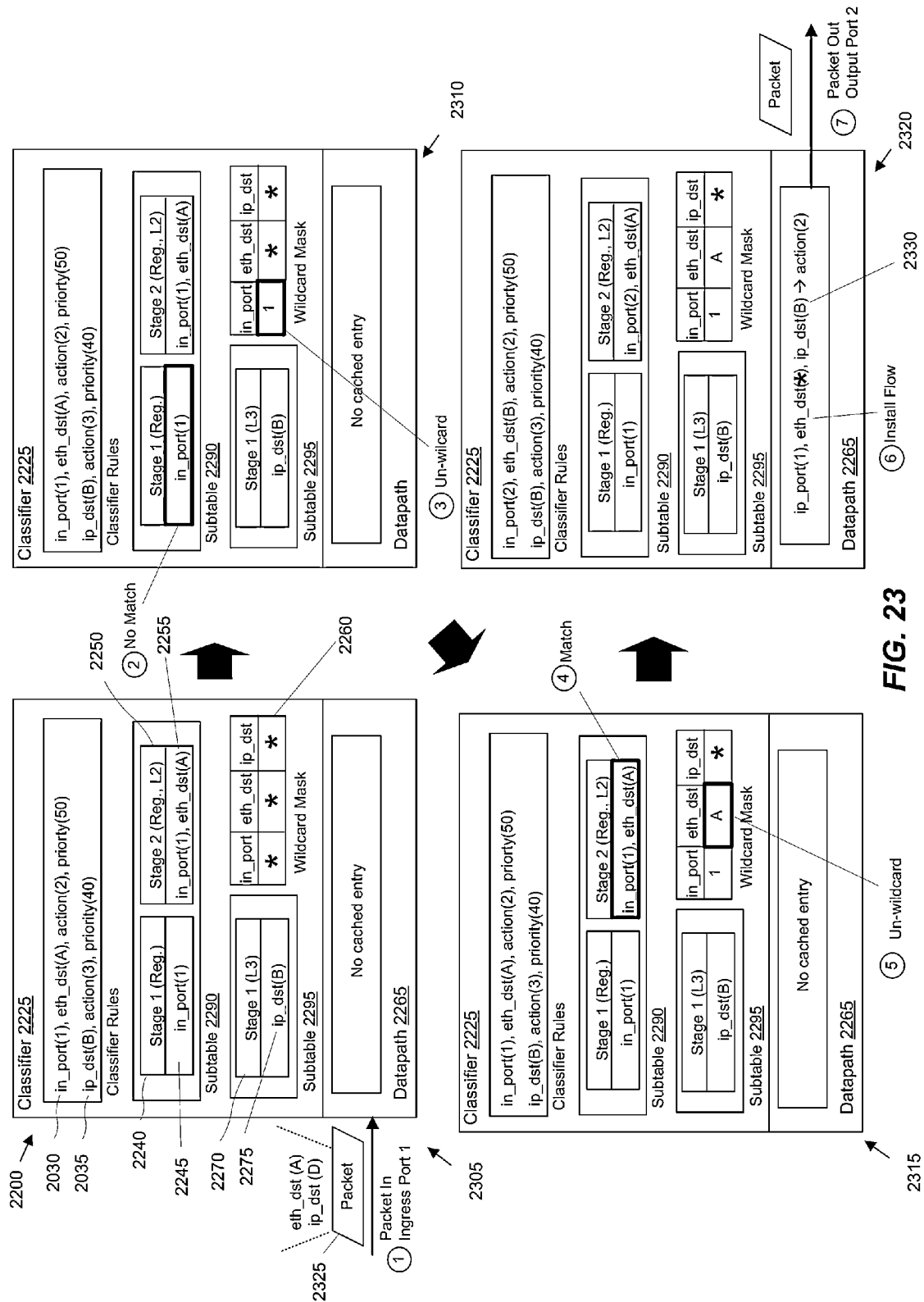
FIG. 23 illustrates the forwarding element performing another staged lookup operation.

FIG. 23 illustrates the forwarding element 2200 performing another staged lookup operation. Different from the previous figure, this figure shows the classifier 2225 finding a match rule for a packet in the first subtable 2290. As a match has been found, the classifier 2225 skips the second subtable 2295, which results in the bits of the wildcard mask relating to the IP destination address field remaining masked.

The first stage 2305 shows the forwarding element 2200 receiving a packet 2325. The second stage 2310 shows that the classifier 2225 has searched the first stage 2240 of the first subtable 2290 and found a matching hash 2245. The classifier 2225 has also unmasked (e.g., set to one) the bits of the wildcard mask 2260 associated with the ingress port field.

As stage one resulted in a match, the third stage 2315 shows that the classifier 2225 has searched the second stage 2250 of the first subtable 2290. Here, the classifier 0325 has also found another matching hash 2255. The classifier 2225 has also unmasked (e.g., set to one) the bits of the wildcard mask 2260 associated with the destination Ethernet address match field. The fourth stage 2320 shows that the forwarding element 2200 has installed a new flow entry 2330 in the datapath 2265 based on the rule of the matching hash and the wildcard mask. Here, the flow entry includes a wildcard match field for the Ethernet destination address value.

As mentioned above, the stage lookup algorithm of some embodiments takes into account the fact that some header fields may change more frequently than others. Based on this fact, the algorithm performs a multi-staged search starting with infrequently changing fields, and progressing to frequently changing ones. FIG. 24 illustrates an example subtable that shows the organization of different fields in different stages.

As shown in FIG. 24, the subtable 2400 statically divides fields into a number of different groups. In some embodiments, there are four groups. In some embodiments, the ordering of the four groups are as follows: (1) register or metadata fields (e.g. the switch ingress port); (2) metadata and L2 fields; (3) metadata, L2, and L3 fields; and (4) all fields. Not all fields need to be included in a group. For instance, the second group of the subtable 2400 might not encompass all the different L2 header fields, such as source MAC address, destination MAC address, Ethernet type, etc. It might include only one of the L2 fields or a few of the L2 fields. In addition, not all groups need to be included in one subtable. For instance, the subtable 2400 may only include one section (e.g., hash table section) for one group or an array of multiple sections for multiple groups.

In some embodiments, the forwarding searches each of the stage of the subtable (e.g., tuple) in order. If any search turns up no match, then the overall search of the subtable also fails, and only the fields included in the stage last searched must be added to the megaflow match. For instance, the classifier might find a matching hash value in the first stage relating to a set of one or more register fields, and move to the second stage to find another matching hash value relating to the set of register fields and a set of L2 fields.

In some embodiments, this optimization technique applies to any subsets of the supported fields, not just the layer-based subsets shown in FIG. 24. In some embodiments, the fields are divided by protocol layer because, as a rule of thumb, inner layer headers tend to be more diverse than outer layer headers. At L4, for example, the TCP source and destination ports change on a per-connection basis, but in the metadata layer only a relatively small and static number of ingress ports exist. With the four stages, one might expect the time to search a tuple to quadruple. However, as compared to the tuple space search, the classification speed may actually improve. This is because when a search terminates at any early stage, the classifier does not have to compute the full hash of all the fields covered by the subtable.

In some embodiments, the optimization of the subtable also improves performance when dealing with Access Control Lists (ACLs). For instance, suppose that some logical networks are configured with Access Control Lists (ACLs) that allow or deny traffic based on L4 (e.g. TCP or UDP) port numbers. Each logical network may be defined by a logical forwarding elements, which is turn defined by a number of physical forwarding elements (e.g., software forwarding elements, hardware forwarding elements). In such logical networks, megaflows for traffic on these logical networks must match on the L4 port to enforce the ACLs. Megaflows for traffic on other logical networks need not and, for performance, should not match on L4 port. Before this optimization, however, all generated megaflows matched on L4 port because a classifier search had to pass through a tuple or subtable that matched on L4 port. The optimization allowed megaflows for traffic on logical networks without L4 ACLs to avoid matching on L4 port, because the first three (or fewer) stages were enough to determine that there was no match.

Figure 25:
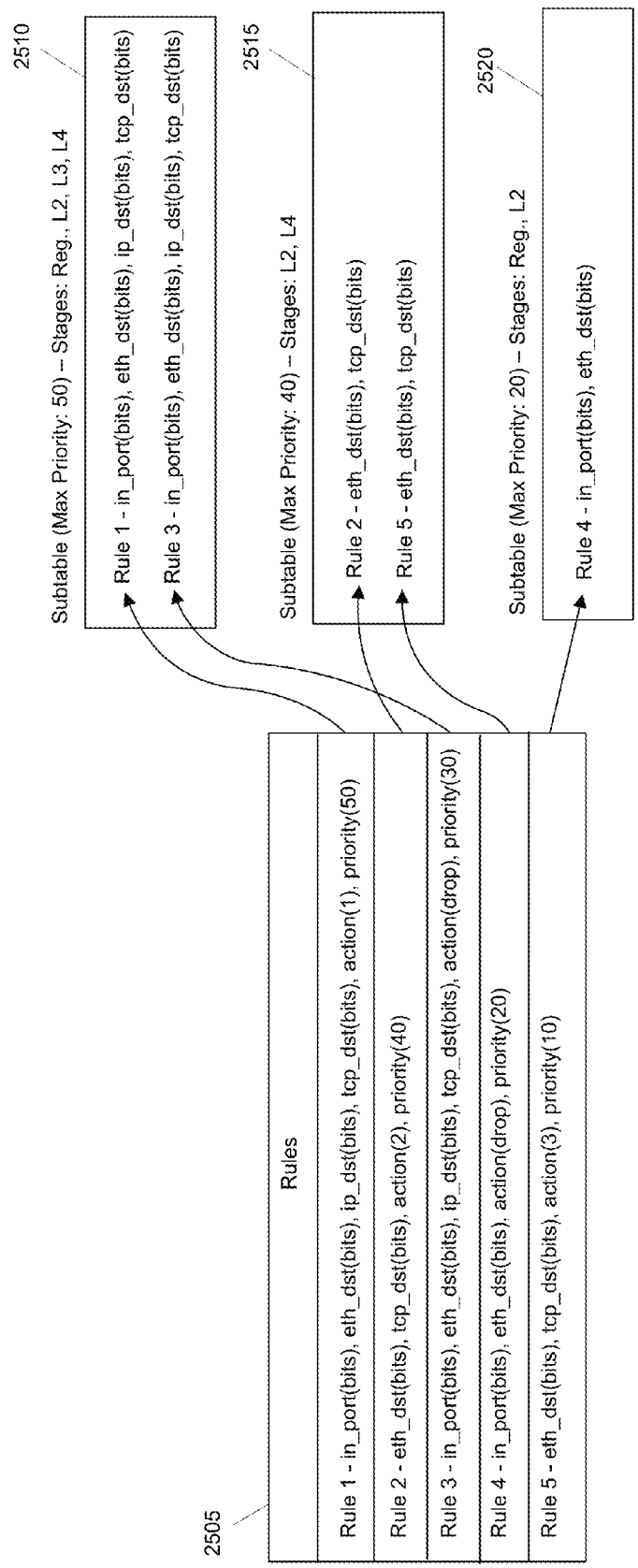
FIG. 25 illustrates an example of how several rules are populated in different subtables.

Lookup in a tuple space search classifier ordinarily requires searching every tuple. Even if a search of an early tuple finds a match, the search must still look in the other tuples because one of them might contain a matching flow with a higher priority. Some embodiments improve on this by tracking, in each subtable or tuple T, the maximum priority of any flow in T. FIG. 25 illustrates an example of how several rules are populated in different subtables. In particular, the figure shows five classifier rules that are grouped into different subtables in accordance with the bits of the fields that they match on. Each subtable is associated with a variable called a max priority value. The max priority value is set using the highest priority value of one of the rules in the subtable.

In the example of FIG. 25, the first and third classifier rules have bits relating to reg., L2, L3, and L4 fields. As such, the rules are hashed and stored in the subtable 2510. The subtable is associated with a max priority value 50, which is the priority value of the first rule. The max priority value is set using the priority value of the first rule because the value is greater than that of the third rule in the same subtable. Further, the second and fourth rules have bits relating to the L2 and L4 fields. So, the rules are hashed and stored in the subtable 2515. The subtable is also associated with a max priority value 40, which is the priority value of the second rule. Lastly, the subtable 2520 includes the fifth classifier rule, and the max priority value is set using the priority value of that rule.

In some embodiments, the lookup code is implemented such that it first searches the subtable with the greatest maximum priority and proceeds in order to the subtable with the smallest maximum priority. Then, a search that finds a matching flow with priority P can terminate as soon as it arrives at a subtable whose maximum priority is P or less. At this point, it can be assumed that none of the remaining flows is a better match than the one already found. This does not necessarily mean that the search terminates immediately when the first matching flow is found because that flow's priority P in the subtable might be less than the maximum priority in another subtable. For instance, in the example of FIG. 20, the lookup operation might entail comparing one or more hashes of the second rule in the second subtable 2515 (i.e., with the priority value 40) if the packet matched on all of the hashes of the third rule (i.e., with the priority value 30) in the first subtable 2510.

One of the motivations for such grouping is that most of the subtables may contain flows with just one priority. This makes intuitive sense because flows matching a single subtable format tend to share a purpose and therefore a priority. This is ideal, because a search can always terminate immediately following a successful match in such a subtable.

VI. Prefix Tracking Algorithms

In some embodiments, the forwarding element uses one or more different prefix tracking algorithms to generate a wildcard mask. In some embodiments, the prefix tracking algorithm is looking for a subset of the union. This narrows the search space by only looking at prefixes. The algorithm can also run in constant time, O(k), where k is the number of bits. However, the algorithm does not always identify the broadest header space, as it does not un-wildcard non-contiguous bits, such as x1x1.

A. Prefix Tracking for L4 and Other Fields

In some embodiments, the forwarding element consults a set of one or more trees when generating a mask for a set of one or more match fields. As an example, the forwarding element might build a tree that includes all of the higher priority rules as leaves, segmenting children based on '1' or '0'. When the classifying a new packet, the forwarding element traverse the tree, un-wildcarding bits along the way, starting with the root until it reaches a branch with no leaves. In some embodiments, the set of match fields relates to a set of Layer N header fields. For instance, the tree structure can be built using Layer 3 source or destination IP addresses associated with different classifier rules. As another example, the tree structure can be built using Layer 4 destination and/or source TCP port numbers.

Figure 26:
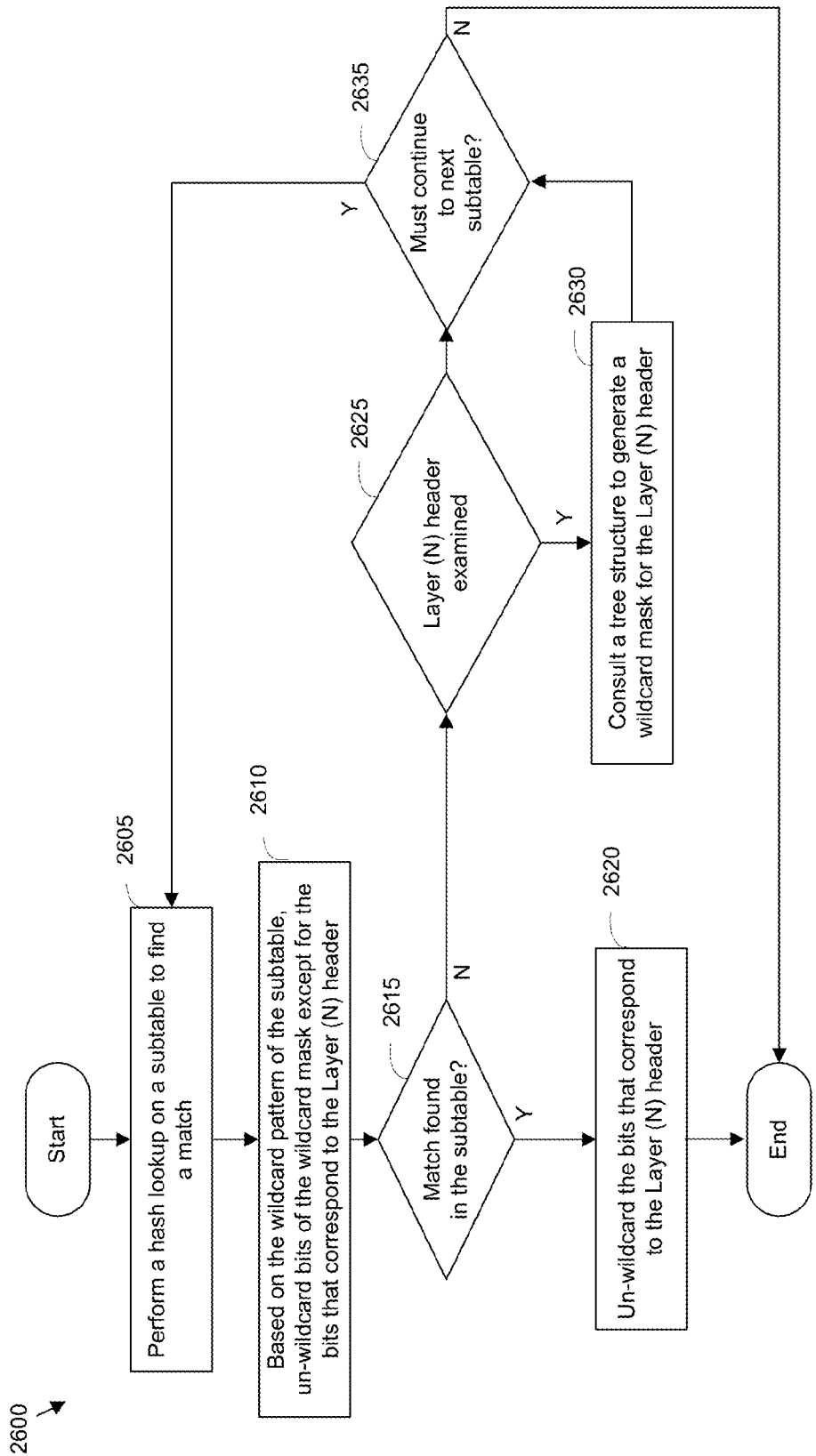
FIG. 26 conceptually illustrates a process that some embodiments implement to generate a wildcard mask for a set of match fields.

FIG. 26 conceptually illustrates a process that some embodiments implement to generate a wildcard mask for a set of match fields. In this example, the set of match fields relates to any one or more Layer N header fields (e.g., Layer 4 header fields). In some embodiments, the process 2600 is performed by a forwarding element. In some embodiments, the process 2600 is performed in conjunction with the staged lookup algorithm that is described above by reference to FIG. 21.

As shown in FIG. 26, the process 2600 begins by performing (at 2605) a hash-based lookup operation on a subtable to find a matching rule for packet. For staged lookup implementations, the lookup operation might entail searching multiple stages. Based on the wildcard pattern of the subtable, the process 2600 then un-wildcards (at 2610) some bits of the wildcard mask except for the bits that corresponds to the Layer N header.

At 2615, the process 2600 determines if a matching rule has been found in the subtable. If a match is found, the process un-wildcards (at 2620) those bits of the mask that corresponds to the Layer N header. If a match is not found, the process 2600 determines (at 2625) whether the Layer N header was examined in the hash-based lookup operation.

The process of some embodiments makes this determination because a multi-stage lookup operation might have terminated the search without reaching the stage with the Layer N header. In some embodiments that use non-staged algorithms, the process might not make such determination but simply proceed to operation 2630, which is described below.

If a set of match fields relating to the Layer N header was examined, the process 2600 consults (at 2630) a tree structure to generate the wildcard mask for the Layer N header. If a set of match fields relating to the Layer N header was not examined, the process 2600 determines (at 2635) whether it must continue to the next subtable. In some embodiments, the process 2600 makes this decision based on a priority value (e.g., a maximum priority value) associated with each other subtable. If it must continue, the process 2600 returns to 2605, which is described above. Otherwise, the process 2600 ends.

Some embodiments perform variations on the process 2600. The specific operations of the process 2600 may not be performed in the exact order shown and described. The specific operations may not be performed in one continuous series of operations, and different specific operations may be performed in different embodiments.

Figure 27:
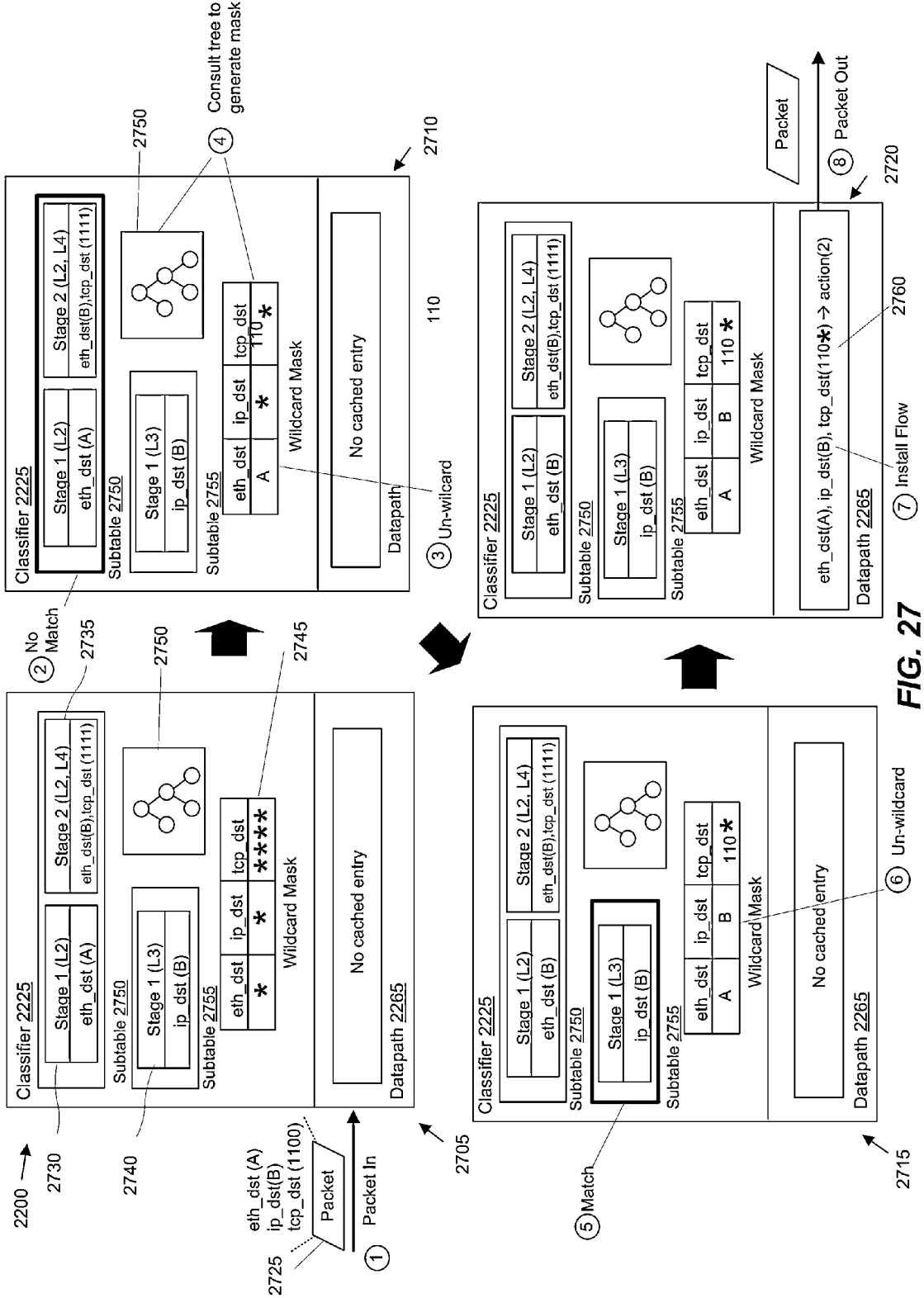
FIG. 27 illustrates an example of a forwarding element that consults a tree when generating a wildcard mask relating to a Layer N header.

Having described a process, an example operation of the process will now be described by reference to FIGS. 27 and 28. FIG. 27 illustrates an example of a forwarding element 2200 that consults a tree 2750 when generating a wildcard mask relating to a Layer N header. In this example, the Layer N header is the Layer 4 destination TCP port number. To perform packet classification, the forwarding element 2200 includes the classifier 2225 that finds a matching classifier rule for a packet and generates a wildcard mask. Four operational stages 2705-2720 of the forwarding element 2200 are shown in the figure.

The first stage 2705 shows the forwarding element 2200 receiving a packet. The second stage 2710 shows the classifier 2225 performing a lookup operation on a first subtable 2750. In particular, the classifier has found a matching hash for the destination Ethernet address field in the first stage lookup of the subtable. The classifier un-masks the corresponding bits from the wildcard mask.

Different from the first stage lookup, the second stage lookup of the same subtable resulted in no match. Without the prefix tracking algorithm of some embodiments, the bits of the wildcard mask, which corresponds to the destination Ethernet address field, are all un-wildcarded. However, in the example of the second stage 2710, instead of un-wildcarding all those bits, the classifier 2225 consults a tree structure 2750. The classifier of some embodiments traces the packet header by traversing the tree while un-wildcarding bits along the way. For instance, the classifier might start with the root node and un-wildcard one bit (e.g., the most significant bit) and attempt to trace the header to a child node until it reaches a leaf node.

In the third stage 2715, the classifier 2225 performs a lookup on the second subtable 2755 and finds a matching hash for the destination IP address header field. The classifier also unmasks bits of the wildcard mask associated with the destination IP address match field. The fourth stage 2720 shows that the forwarding element 2200 has installed a new flow entry 2760 in the datapath. With the prefix tracking algorithm of some embodiments, the new flow entry includes the destination Ethernet address match field in which the first bit (i.e., from the right) remains wildcarded.

In generating a mask, the forwarding element of some embodiments consults multiple trees. The different trees can be for different sets of header fields. For instance, the forwarding element might consult a first tree for a source IP address header and might consult a second different tree for a destination IP address header. Also, the different trees can be for the same set of header fields. FIG. 28 provides an illustrative example of a forwarding element that examines multiple tree structures to generate a wildcard mask for the same Layer N header. In particular, the forwarding element consults different trees for different subtables. For instance, if there is no match for the Layer N header at any one of the subtables, the forwarding element consults a tree associated with that subtable. If there is a match for the Layer N header, the forwarding element of some embodiments simply un-wildcards those bits that corresponds to the Layer N header.

Figure 28:
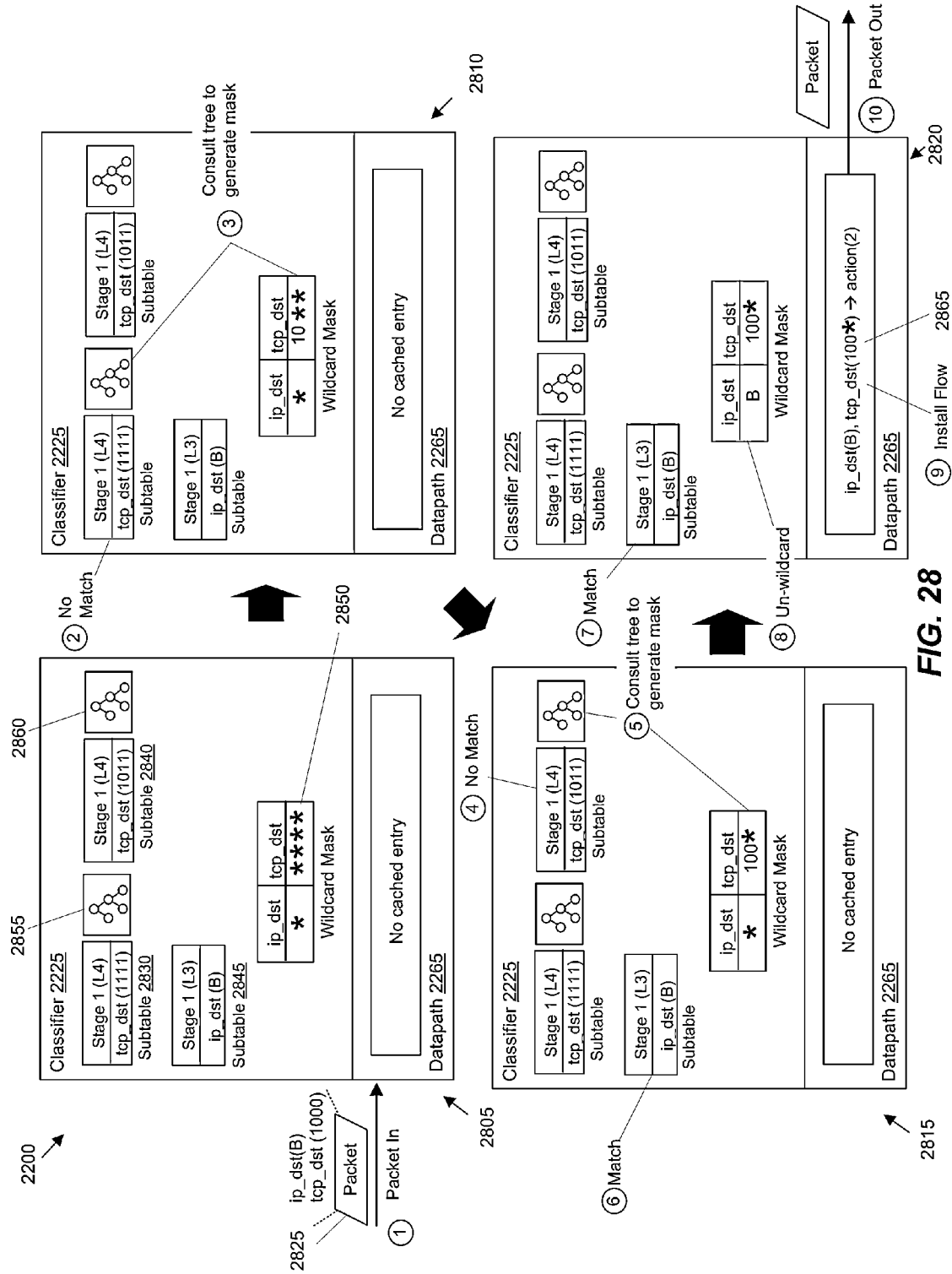
FIG. 28 provides an illustrative example of a forwarding element that examines multiple tree structures to generate a wildcard mask for the same Layer N header.

Four operational stages 2805-2820 of the forwarding element 2200 are shown in FIG. 28. The first stage 2805 shows the forwarding element 2200 receiving a packet 2825. The second stage 2810 shows the classifier 2225 performing a lookup operation on the first subtable 2830. The lookup operation failed to find a match for the packet. The classifier 2225 then consults a first tree 2855 to generate the wildcard mask. The third stage 2815 shows the classifier 2225 performing another lookup operation on a second subtable 2840. The lookup operation also failed to find a match for the packet. Thus, the classifier consults a second tree 2860 to generate the wildcard mask.

In some embodiments, the second tree 2860 is consulted to generate a new mask, and this new mask is combined with the previous generated mask. The new mask and the previously generated mask can be combined using a bitwise operation. For instance, a bitwise OR operation of 1100 and 1110 will result 1110, which is a combination of the two numbers.

Referring to the fourth stage 2820 of FIG. 28, the classifier 2225 performs a lookup on the third subtable 2845 and finds a matching hash for the destination IP address header field. The classifier 2225 also un-masks bits of the wildcard mask 2850 associated with the destination IP address match field. The fourth stage 2820 shows the forwarding element 540 installing a new flow entry 2865 in the datapath 2265 and forwarding the packet.

Figure 29:
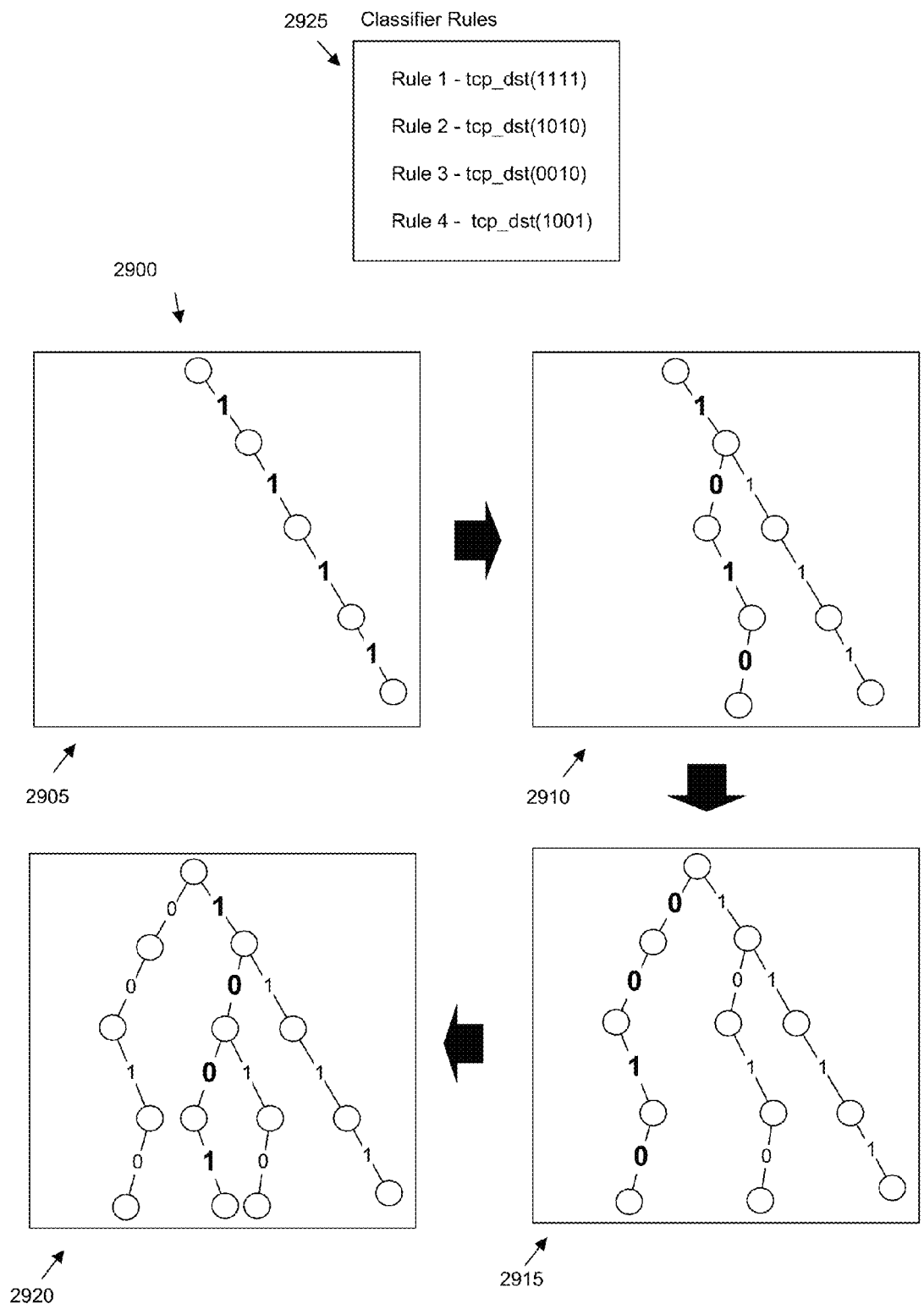
FIG. 29 illustrates several examples of inserting classifier rules into a tree structure.

Having described an overview of prefix tracking, several examples operations will now be described by reference to FIGS. 29-35. FIG. 29 illustrates several examples of inserting classifier rules 2925 into a tree structure. The classifier rules relate to L4 header field, namely TCP destination port number. The TCP destination port number field is a 16-bit field. However, to simplify the description, the port number field is expressed as a 4-bit field in this example as well as many other examples described herein. In some embodiments, the tree structure is a decision tree in which any node with children represents a test (e.g., Boolean test) and each child node represents the outcome or result of the test. In some embodiments, the tree structure is a binary tree in which any node can have at most two child nodes (e.g., representing 0 and 1).

Four stages 2905-2920 of the tree structure 2910 are shown in FIG. 29. In the first stage 2905, the forwarding element (not shown) has created the tree structure 2900 and initialized the tree structure with the first rule. In some embodiments, the forwarding element instantiates the tree structure, receives the first rule, and follow the bits of the rule down the tree, starting from the root node. If a leaf node is reached and there is at least one additional bit in the rule, then the forwarding element creates a new node for each additional bit. For instance, in the first stage 2905, the forwarding elements has started from the root node and added four nodes for the binary number 1111.

In the second stage 2910, the forwarding element attempts to traverse the tree structure 2905 following the bit pattern of the binary number in the second rule. When it reaches a leaf node without reaching the end of the number, the forwarding element adds a new node for each bit that is not represented in the tree structure. For instance, in the second stage 2910, the forwarding elements has received the binary number 1010 of the second rule and traversed the tree structure 2900 to the first child node in accord with the number's most significant bit (i.e., the fourth bit). The forwarding element then takes third bit and attempts to traverse the tree structure. As there is no child node for the 0 bit, the forwarding element creates a new node that represents that bit. The forwarding element then performs similar operations for the remaining bits of the second rule.

The third stage 2915 shows the forwarding element taking the third rule and populating the tree structure using the same technique described above. The fourth stage 2920 shows the forwarding element taking the fourth rule and further populating the tree structure.

Figure 30:
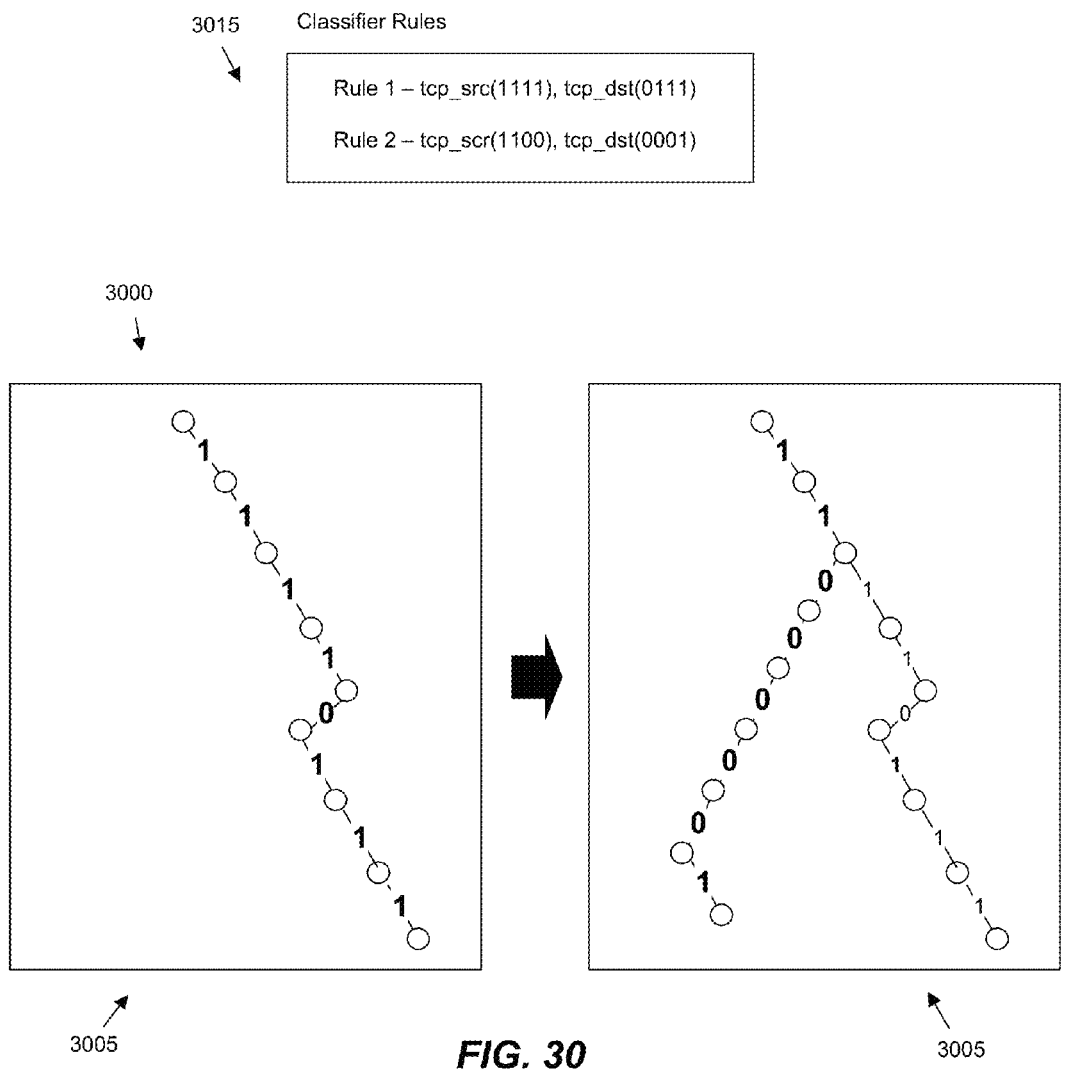
FIG. 30 illustrates a concatenated tree structure that encompasses two fields.

In some embodiments, the tree structure represents multiple header fields. FIG. 30 illustrates a concatenated tree structure 3000 that encompasses two fields. In this example, the two header fields are the TCP source and destination fields. The TCP source port number is also placed as higher order bits than the bits of the TCP destination port number. However, the ordering of different fields can change from implementation to implementation.

Two stages 3005 and 3010 of the tree structure 3000 are shown in FIG. 30. In the first stage 3005, the forwarding element has created the tree structure 3000. The forwarding element has also populated the tree structure with the first of the two classifier rules 3015. The second stage 3005 shows the tree structure 3000 after adding the second classifier rule.

Figure 31:
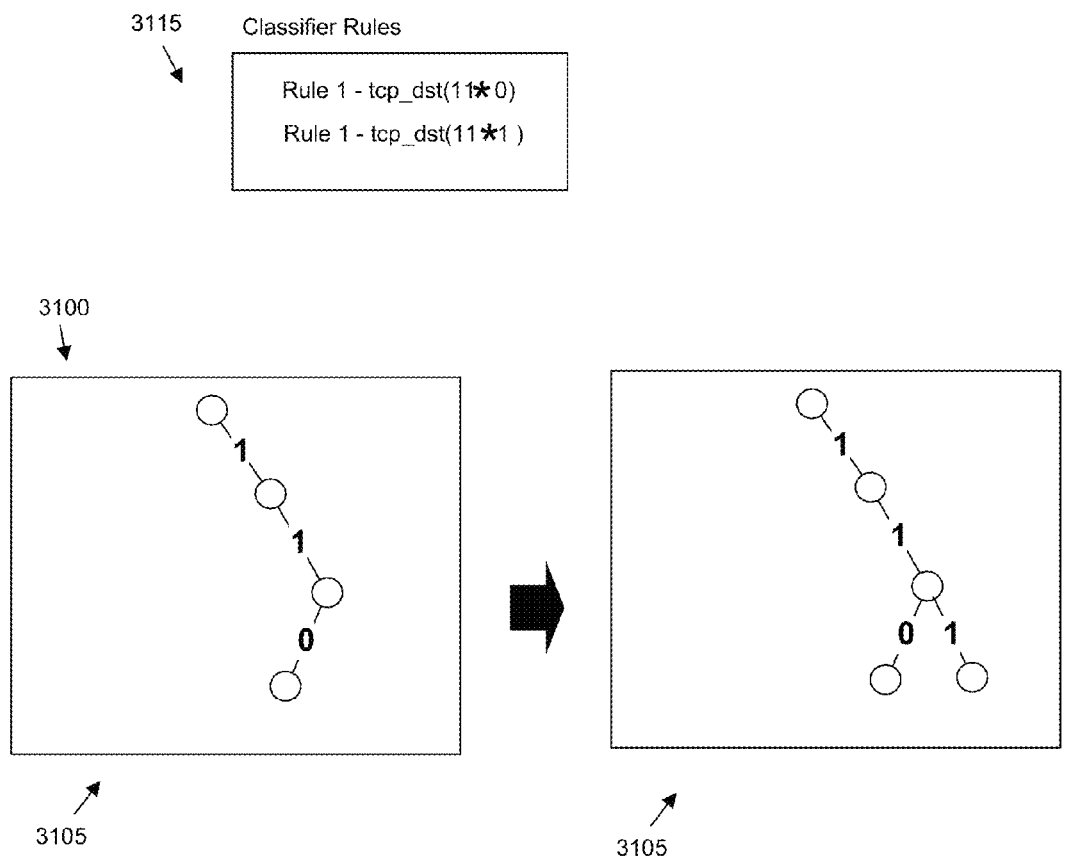
FIG. 31 provides an illustrative example of populating a tree structure with portions of different match fields.

In populating a tree structure, the forwarding element of some embodiments may not use all of the bits of a match field. FIG. 31 provides an illustrative example of populating a tree structure with portions of different match fields. In this example, each of the two classifier rules has one bit that is wildcarded or masked. In some embodiments, the forwarding element can maintain a wildcard mask for each subtable. The wildcard mask of the subtable informs the forwarding element which bits of the classifier rule are significant to the lookup. In some embodiments, the forwarding element traces a tree structure based on the mask associated with the subtable.

Two stages 3105 and 3110 of the tree structure 3100 are shown in FIG. 31. In the first stage 3105, the forwarding element has created the tree structure 2900. The forwarding element has also populated the tree structure by tracing the bits of the first rule. Here, when the masked bit of the rule is reached, the forwarding element skips the masked bit and moves onto the next bit. In the second stage 3110, the forwarding element traces the rule until it reaches the masked bit, skips the mask bit, and creates a new node for the last bit, which is the first bit.

Figure 32:
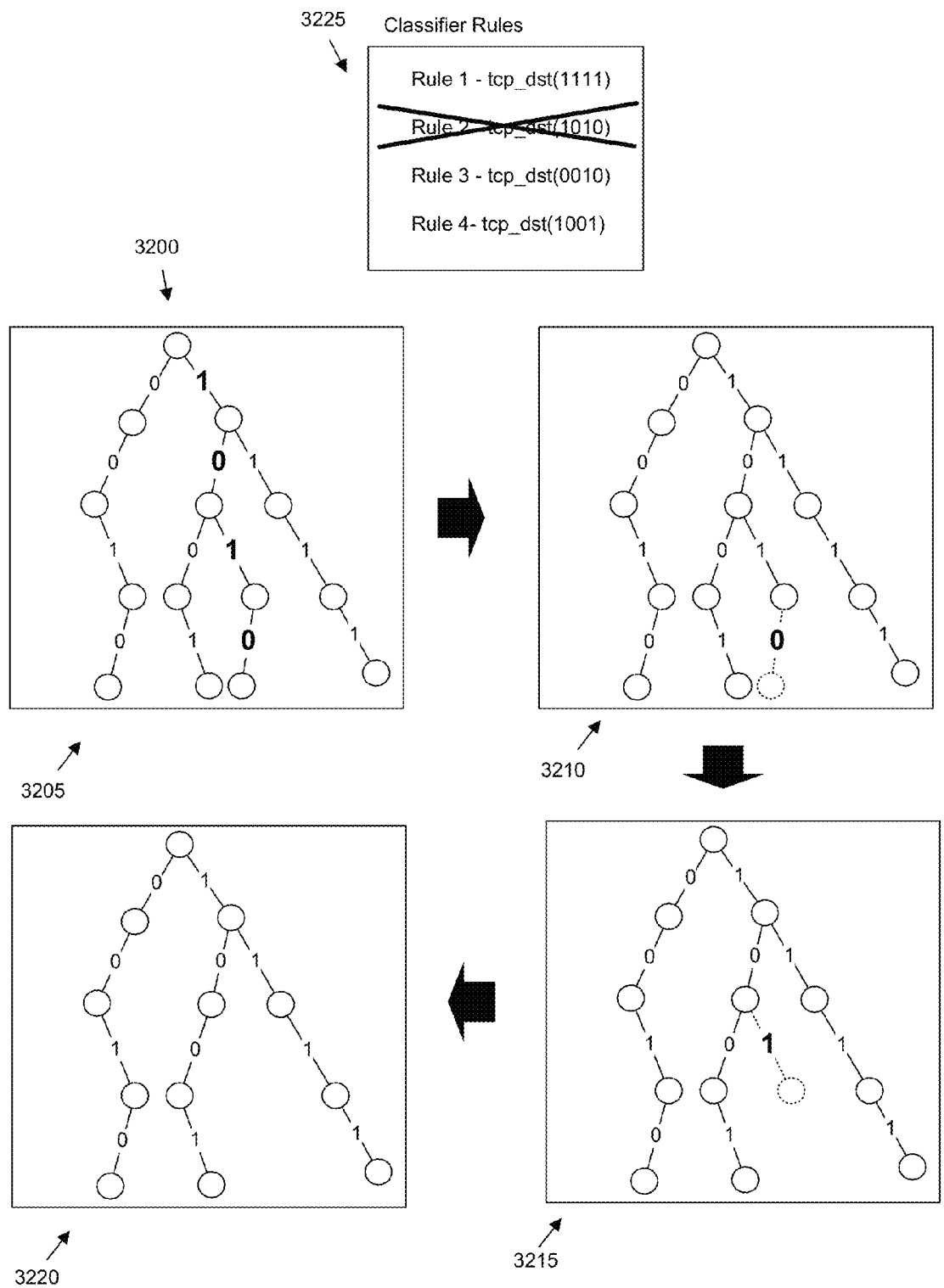
FIG. 32 illustrates an example of removing one of the classifier rules from a tree structure.

FIG. 32 illustrates an example of removing one of the classifier rules 3225 from a tree structure 3200. In some embodiments, the forwarding element removes the rule by finding a leaf node associated with the rule. This can entail traversing down the tree structure following the bit pattern of the rule. Thereafter, the forwarding element attempts to traverses up the tree structure to a parent node. For instance, if it is at the root node, it may not be able to traverse up the tree structure. If it can traverse up the tree structure, the forwarding element removes the current node and traverses up to the parent node. If the parent node has no other child node, the forwarding element removes the parent node. If the current node does not have a child node, the forwarding element does nothing (i.e., retains the parent node).

Four stages 3205-3220 of a tree structure 3200 are illustrated in the FIG. 3200. In the first stage 3205, the forwarding element has found the leaf node for the second rule by tracing the rule down tree structure 3200. The second stage 3205 shows the tree structure 3200 after removing the leaf node and traversing up to a parent. The forwarding element then attempts to remove the current node. As shown in the third stage 3215, as the current node has no other child node, the forwarding element has removed that node and traversed up the tree structure to the parent node. The fourth stage 3220 shows that the forwarding element retains the parent node because the node has another child node.

Figure 33:
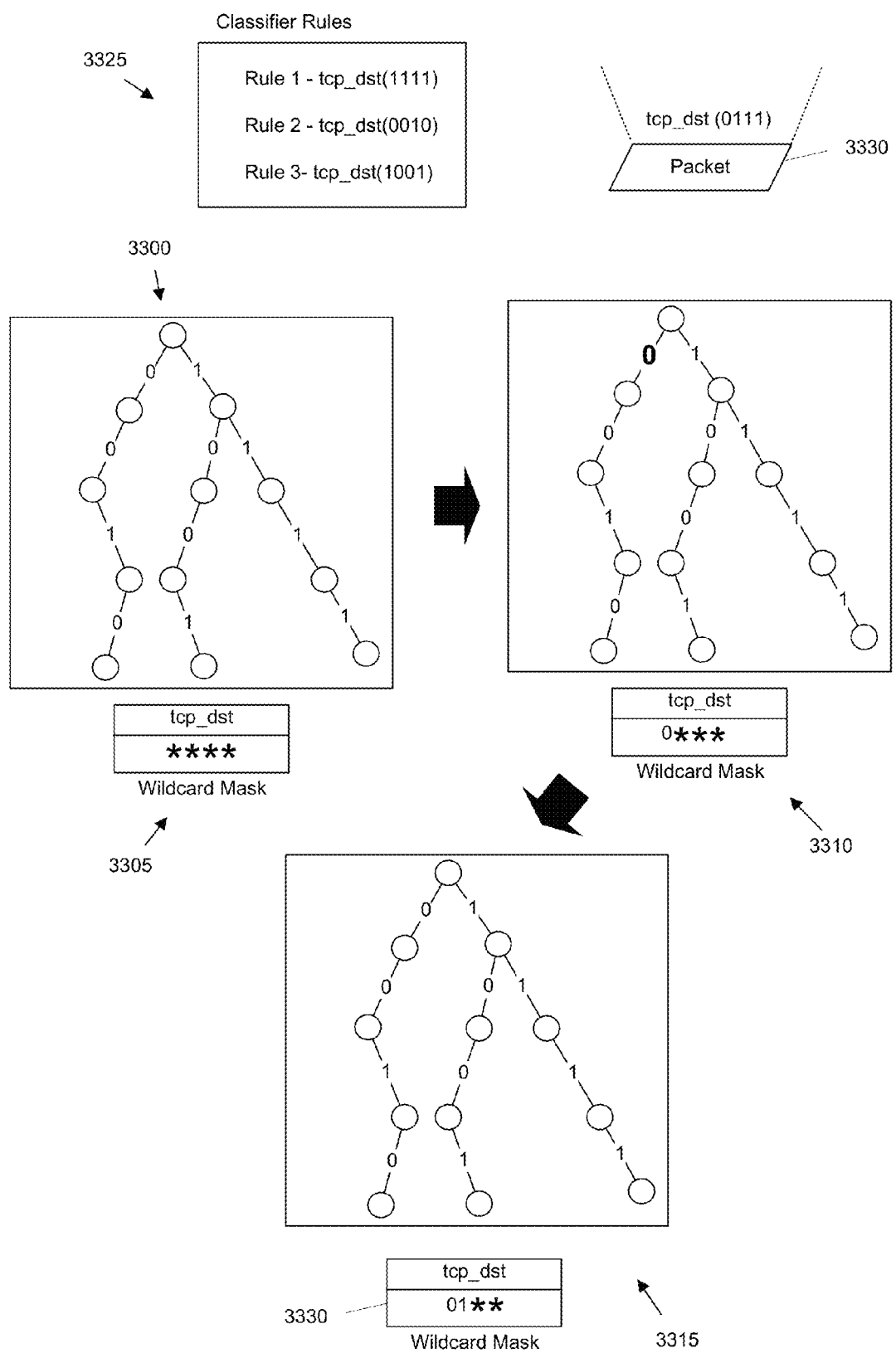
FIG. 33 shows an example of generating a wildcard masking by tracing a packet header field down a tree structure.

As discussed above, when classifying a new packet, the forwarding element of some embodiments generates a wildcard mask by consulting a tree structure. Several such examples will now be described by reference to FIGS. 33-35. FIG. 33 shows an example of generating a wildcard masking by tracing a packet header field down a tree structure. The figure shows a tree structure 3300, which is generated using match field values of three classifier rules 3325. The forwarding element has received a packet 3330, which includes a header value for the match field.

In some embodiments, the prefix tracking algorithm operates by tracing the header value of the packet 3330 down the tree structure, un-wildcarding bits along the way, starting with the root until it reaches a leaf node. The result of the algorithm is a wildcard mask for the header value. The wildcard mask indicates that, to prove that the packet does not match any one of the three classifier rules 3325, the forwarding element has to look at or examine the bit or bits that are unmasked (i.e., un-wildcarded).

Three stages 3305-3315 of the tree structure 3300 are shown in FIG. 33. In the first stage 3305, the wildcard mask is completely wildcarded. In the second stage 3310, the forwarding element initially un-wildcards one bit from the mask. In this example, the one bit is the most significant bit because the root node represents that most significant bit. If the tree was populated starting with the least significant bit, the one bit would be the least significant bit of the mask. The one bit is initially un-wildcarded because it takes at least one bit to prove that the packet matches none of the three rules.

In the second stage 3310, the forwarding element attempts to traverse the tree from the root node to a child node by following the next bit of the header value. The child node is available for the next bit of the header value. As such, the forwarding traverses the tree structure to the child node and un-wildcards that next bit. The third stage 3315 shows that the forwarding element has traced the packet header as far as it can go. As shown, the result of the traversal is the wildcard mask 3330. The wildcard mask indicates that the forwarding element can look at the two most significant bits in order to prove that the packet is none of the three classifier rules 3325.

Figure 34:
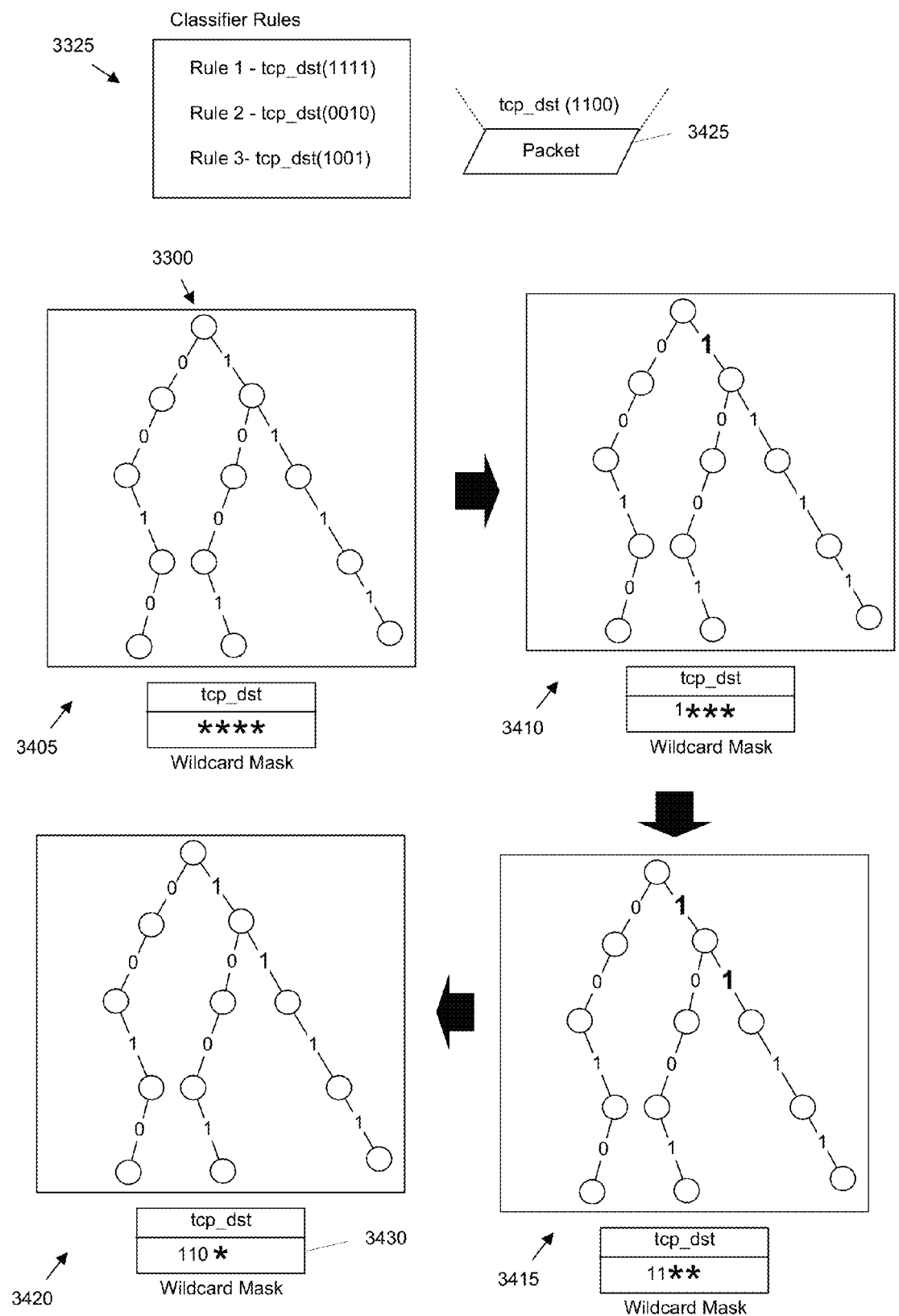
FIG. 34 shows another example of generating a wildcard masking by tracing a packet header field down the tree structure.

FIG. 34 shows another example of generating a wildcard masking by tracing a packet header field down the tree structure 3300. Four stages 3405-3420 of the tree structure 3300 are shown in the figure. In the first stage 3405, the forwarding element initially un-wildcards one bit from the mask. In the second stage 3410, the forwarding element attempts to traverse the tree from the root node to a child node by tracing the next bit of the header value. The child node is available for the next bit of the header value. As such, the forwarding element un-wildcards the next most significant bit from the wildcard mask and traverses the tree structure to the child node.

In the third stage 3415, the forwarding element attempts to traverse the tree from the current node to a child node by tracing the next bit of the header value. The child node is available for the next bit of the header value. As such, the forwarding element un-wildcards the next most significant bit from the wildcard mask and traverses the tree structure to the child node. The fourth stage 3420 shows the resulting the wildcard mask 3430. The wildcard mask indicates that the forwarding element can look at the three most significant bits in order to prove that the packet is none of the three classifier rules 3325.

Figure 35:
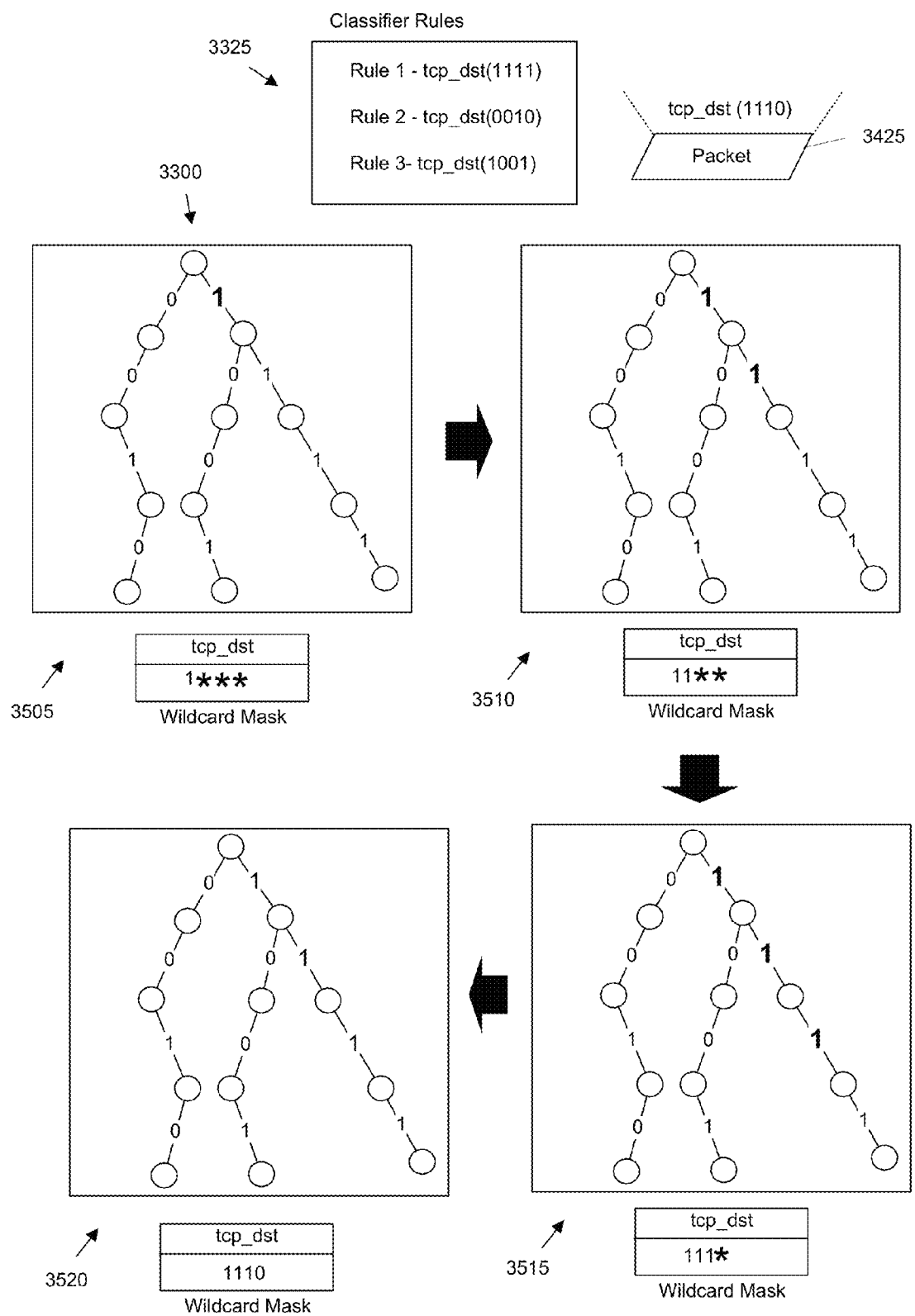
FIG. 35 shows yet another example of generating a wildcard masking by tracing a packet header field down the tree structure.

FIG. 35 shows yet another example of generating a wildcard masking by tracing a packet header field down the tree structure 3300. Four stages 3505-3520 of the tree structure 3300 are shown in the figure. The first three stages 3505-3515 are identical to previous figure. However, in the fourth stage 2010, the last bit of the wildcard mask is un-wildcarded because the algorithm hopped three nodes. The fourth stage 3320 shows the resulting the wildcard mask 3430, which is completely un-wildcarded.

Figure 36:
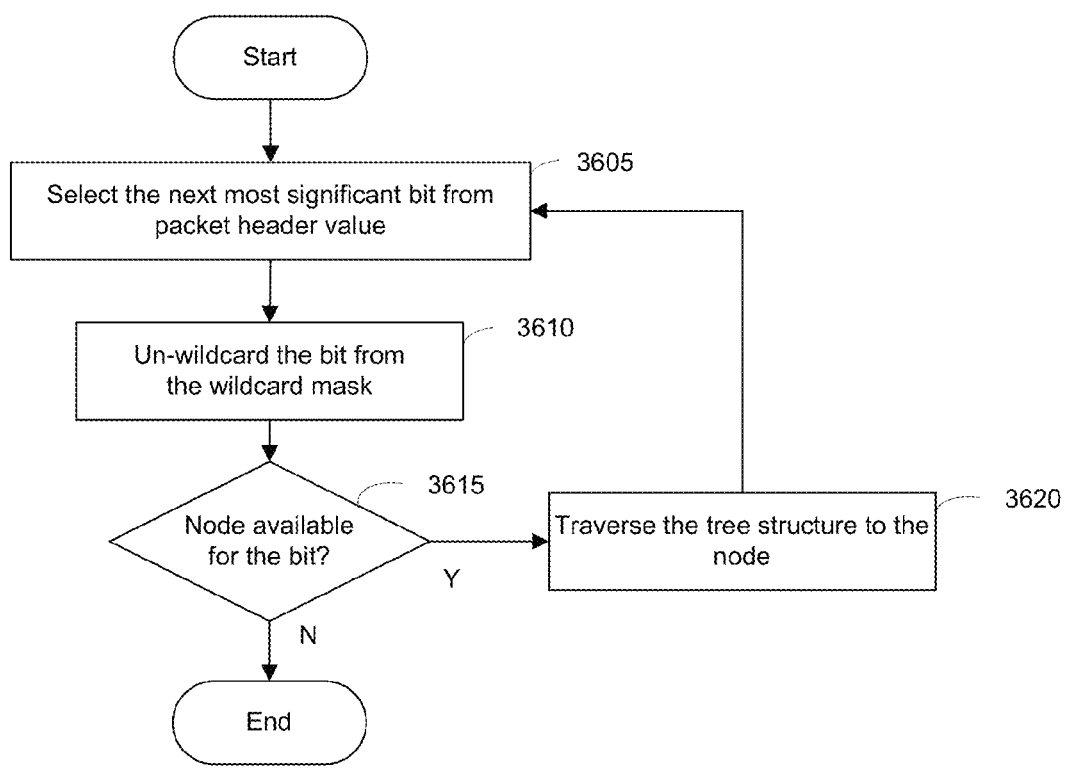
FIG. 36 conceptually illustrates a process that some embodiments implement to generate a wildcard mask by tracing a rule down a tree structure.

FIG. 36 conceptually illustrates a process 3600 that some embodiments implement to generate a wildcard mask by tracing a rule down a tree structure. In some embodiments, the process 3600 is performed by a forwarding element. The process 3600 begins when it selects (at 3605) the next most significant bit from the packet header value. The process 3600 then un-wildcards (at 3615) the bit from the wildcard mask. The process 3600 then determines (at 3615) if a node is available for the bit. If a node is available for the bit, the process 2300 traverses (at 3620) the tree structure to the node. The process then returns to 3605, which is described above. If the node is not available, the process 2300 then ends.

Some embodiments perform variations on the process 3600. The specific operations of the process 3600 may not be performed in the exact order shown and described. The specific operations may not be performed in one continuous series of operations, and different specific operations may be performed in different embodiments. For instance, depending on how the tree is structured, the process might start with the least significant bit instead of the most significant bit. The process might also be implemented for a compressed tree structure (e.g., a compressed binary tree). In such cases, the process 3600 might traverse the tree structure based on a set of one or more bits and un-wildcard the set of bit.

B. Prefix Tracking for L3

Flows (e.g., in OpenFlow) often match IPv4 and IPv6 subnets, e.g. to implement routing. When all the flows use the same subnet size, e.g. all match/16 subnets, the classification algorithm of some embodiments, such as the tuple space lookup algorithm or the staged lookup algorithm, does not un-wildcard any additional bits of the wildcard mask than necessary. If, on the other hand, different flows match different subnet sizes, the constructed megaflows match the longest subnet prefix, e.g. any host match (/32) forces megaflows to match full addresses. Suppose, for example, the forwarding element (e.g., Open vSwitch) is constructing a megaflow for a packet addressed to 10.5.6.7. If flows match subnet 10/8 and host 10.1.2.3/32, one could safely install a megaflow for 10.5/16. This is because 10.5/16 is completely inside 10/8 and does not include 10.1.2.3. However, without additional optimization, the forwarding element installs 10.5.6.7/32. Also, without additional optimization, it is possible that more than the necessary bits of wildcard mask will be un-wildcarded when only some of the rules match on a prefix having a particular length while others match on a longer prefix.

In some embodiments, when the forwarding element constructs a megaflow as it processes a packet, it traverses a tree structure (e.g., a prefix tree) from the root down through nodes with labels matching the corresponding bits in the packet's IP address. If traversal reaches a leaf node, then the megaflow need not match the remainder of the address bits. If, on the other hand, traversal stops due to the bits in the address not matching any of the corresponding labels in the tree, the megaflow should be constructed to match up to and including the bits that could not be found. In some embodiments, the tree structure search returns the length of the prefix, which can be used by the forwarding element in deciding whether to search a particular hash table or forego searching of the particular hash table.

Figure 37:
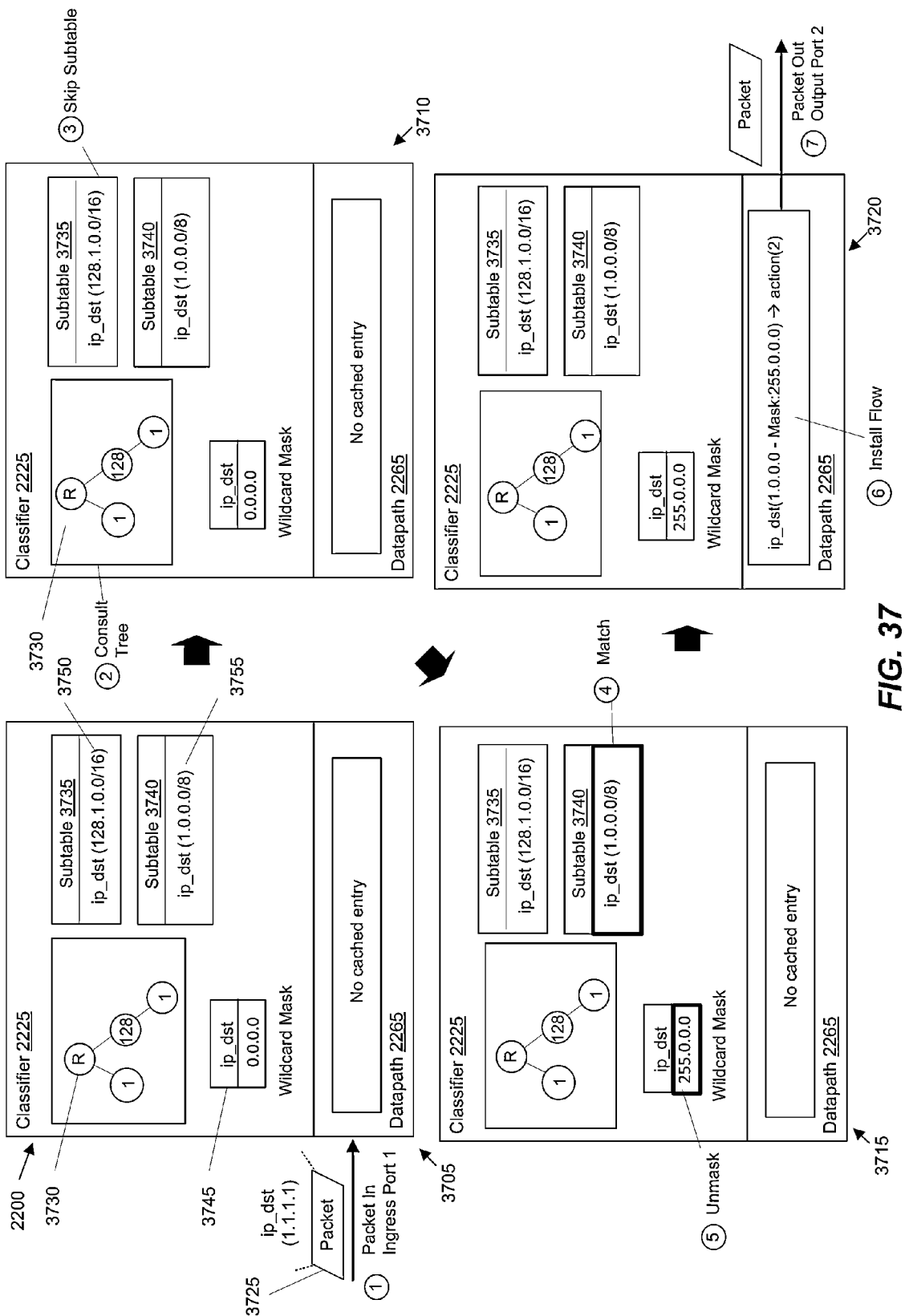
FIG. 37 illustrates an example of a forwarding element that consults a tree structure to generate a wildcard mask and determine whether to skip lookup of a subtable.

For some embodiments of the invention, FIG. 37 illustrates an example of a forwarding element 2200 that consults a tree structure 3730 to (1) generate a wildcard mask and (2) determine whether to skip lookup of a subtable. In particular, when a packet received, the forwarding element of some embodiments traverses the tree structure to define a wildcard mask for the IP address field (e.g., IPv4, IPv6) and identify the length of the prefix that is associated with the IP address. In some embodiments, the forwarding element defines the wildcard mask with the tree traversal by identifying the number of bits that should to be un-wildcarded. In some embodiments, the length of the prefix is used in deciding whether to search one or more different subtables with IP addresses. That is, the returned prefix length informs the forwarding element which zero or more subtables can be skipped.

In the illustrated example, the forwarding element 2200 maintains two subtables 3735 and 3740 with different classifier rules 3750 and 3755. The rule 3750 has an IP address with 16 bits in the network or routing prefix. This means that the first 16 bits of the IP address identify the network and the remaining bits identify the host (e.g., which can also include the subnet identifier). The rule 3755 has an IP address having a prefix length of 8 bits.

As shown in FIG. 37, the forwarding element 2200 has created (e.g., instantiated) the tree structure 3730 and initialized it with the IP addresses of the two classifier rules 3750 and 3755. To simplify the description, the tree structure is in octet format. Following the root node, each level of the tree structure represents the next 8 bits of the IP address. For instance, the first level nodes, which are labeled "1" and "128", represents the first eight bits of the IP addresses of the two rules 3750 and 3755. The second level node represents the next eight bit of the IP address of the rule 3750. As will be described below by reference to FIG. 40, the forwarding element of some embodiments does not use an octet tree but uses a binary tree (e.g., a compressed binary tree). Instead of 8 bits per level, the binary tree can have one level for every bit in the prefix.

In the example of FIG. 37 and in several following examples, the wildcard mask is also represented using a different bitmask notion. As there are 32 bits in an IPv4 address, the mask is represented by four numbers ranging from 0-255, where 0 means all the eight bits of the portion of the IP address is masked, and 255 means all the eight bits of that portion is unmasked.

Four operational stages 3705-3720 of the forwarding element 2200 are shown in FIG. 37. The first stage 3705 shows the forwarding element 2200 receiving a packet 3725. The second stage 3710 shows the classifier 2225 consulting the tree structure 3730 to identify the length of the prefix associated with a packet and to define a wildcard mask 3745. In particular, the classifier 2225 traverses the tree structure, following the bits of the IP address of the packet, and identifies the number of bits that should be un-wildcarded in the wildcard mask. For instance, the algorithm can start with the root node and traverse the tree structure until it reaches a branch with no leaves. The traversal can also stop due to a bit in the address not matching any of the corresponding nodes in the tree structure.

In the second stage 3710, the classifier 2225 has selected the first eight bits of the IP address representing the number 1 (i.e., 00000001 in binary format) and traversed the tree structure to the "1" node. The classifier 2225 has also defined a wildcard mask that has the first eight bits of the IP address field un-wildcarded.

In conjunction with the wildcard mask generation or instead of it, the forwarding element of some embodiments consults a tree structure to make a decision on whether to skip searching a subtable, or a portion thereof. In the example of second stage 3710, the tree structure 3730 essentially informs the classifier 2225 that the longest prefix that the packet 3725 can match on is 8 bits. This is based on the prefix lengths at the tree nodes traversed by the tree lookup. Since the last tree node with rules visited by the tree traversal had eight prefix bits, it is known that the packet cannot match any rule in the classifier that has more than eight prefix bits for the IPv4 destination address. The classifier 2225 uses this information to skip looking at the subtable 3735 with the 16-bit prefix of the IP address of the rule 3750. Thus, the forwarding element 2200 avoids looking at each subtable with IP addresses that has more or less bits than it needs to look at.

The third stage 3715 of FIG. 37 shows the forwarding element 2200 after generating the wildcard mask and deciding not to search the first subtable 3735. Here, the classifier 2225 reuses the prefix length returned from tree lookup and decides to search the second subtable 3740. The reason being that longest prefix that the packet can match on matches the bit pattern of the IP address in that second subtable.

In the third stage 3715, the classifier searches the second subtable and finds a matching rule. As the second subtable was consulted, the classifier un-wildcards the first 8-bits of the wildcard mask. Here, the classifier 2225 does not un-wildcard additional bits based on the number returned from the tree lookup. This is because the required bits have already been un-wildcarded with the subtable matching process. In some embodiments, the tree lookup does not directly un-wildcard any bits that would not be un-wildcarded by the subtable matching process. This avoids un-wildcarding bits in situations where the tree would indicate un-wildcarding of some bits, but a staged lookup would not. In some embodiments, at each subtable, the forwarding element only un-wildcards at most as many bits as the subtable has. In some embodiments, the prefix bits returned from the tree lookup are un-wildcarded afterwards because the tree lookup could result in un-wildcarding more bits than the subtable.

Referring to FIG. 37, the fourth stage 3720 shows that the forwarding element 2200 has processed the packet 3725 and incrementally populated the datapath with a new flow entry that is associated with a wildcard mask.

Figure 38:
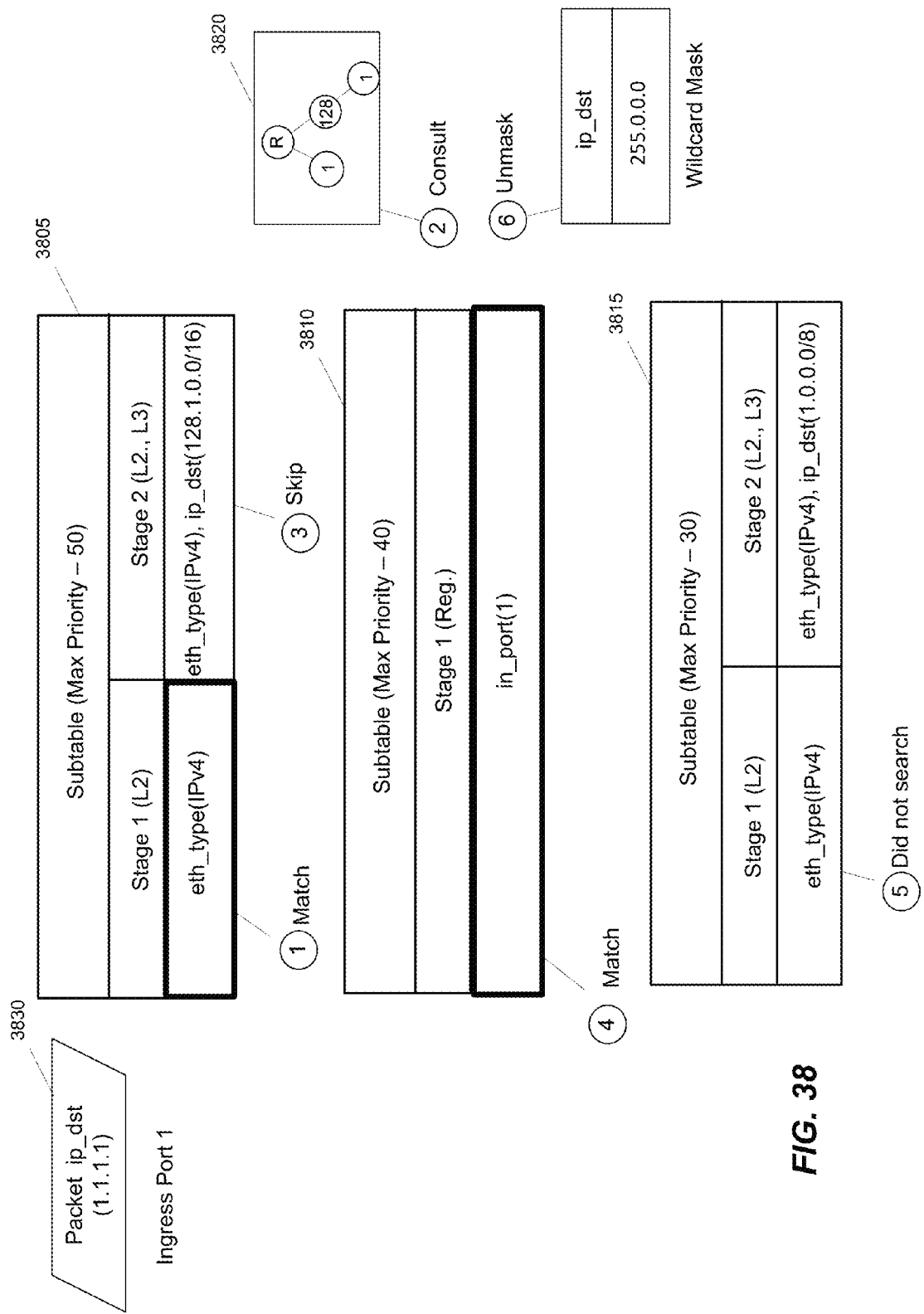
FIG. 38 illustrates another example of consulting a tree structure to generate a wildcard mask and to decide whether to skip lookup of a subtable.

FIG. 38 illustrates another example of consulting a tree structure to generate a wildcard mask and to decide whether to skip lookup of a subtable. Different from the previous example, the figure shows the L3 prefix tracking algorithm operating in unison with the staged lookup algorithm of some embodiments. This figure shows three subtables 3805-3815. Two of the subtables 3805 and 3815 have L3 related stages, which can be searched or skipped altogether depending on the prefix length returned from the tree lookup. Each of the two subtables 3805 and 3815 include two stages: an L2 stage, and L2 and L3 stage. The subtable 3810 includes one stage that represents register or metadata.

FIG. 38 conceptually shows several operations being performed by a forwarding element upon receiving a packet. As shown, the forwarding element first searches the first stage of the subtable 3805. This is because the subtable 3805 is associated the highest priority value amongst the tree subtables 3805-3815. The first stage of the subtable 3805 is associated with an L2 match field, which in this example is Ethernet type. The packet header 3830 matches the IPv4 Ethernet type of the rule in the subtable 3805.

After finding a match in the first stage of the subtable 3805, the forwarding element consults the tree structure 3820 prior to searching its second stage. In some embodiments, the forwarding element performs the tree search the first time it reaches a stage with an IP address field (e.g., source or destination). This is primarily done avoid any unnecessary tree lookup. For instance, depending on the lookup at an earlier stage, the forwarding element may not even reach the L3 stage. In addition, some subtable might not even include L3 fields. Accordingly, similar to the L4 examples described above, the forwarding element of some embodiments postpones the tree lookup operation as late as possible. Different from the L4 examples, the forwarding element of some embodiments maintains one tree for a group of subtables, not just one subtable. In some embodiment, the forwarding element also maintains the result of the tree search (e.g., the prefix length) and reuses the result in order to decide whether to forego searching one or more stages.

In FIG. 38, the forwarding element traverses the tree structure 3820 following the bits of the IP address of the packet in order to define a wildcard mask for the IP address field. The forwarding element of some embodiments start from the root node and traverses the tree until it reaches a branch with no leaves or until it can traverse no further. As mentioned above, the forwarding element of some embodiments consults the tree structure to make a decision on whether to skip searching a subtable, or a portion thereof. Here, the forwarding element decides to skip searching the second stage of the subtable 3805. This is because the longest prefix that the packet 3830 can match on is 8 bits, which is different from the 16-bit prefix of the IP address in the subtable 3805.

As indicated above, one problem with the staged lookup classification algorithms of some embodiments is that whenever a layer 3 stage has been reached and there was any rule that matched on a 32-bit prefix, the forwarding element would un-wildcard all 32 bits of the wildcard mask corresponding to the prefix. This results in a number of datapath flows that have the IP address bits unnecessarily all un-wildcarded. With the L3 prefix tracking methodology and algorithm, the forwarding element can prove that the particular packet cannot possibly match a set of rules in a stage of a subtable because the set has additional prefix bits or fewer bits.

The L3 prefix tracking methodology can potentially first look for a match in a subtable and then consult the tree structure. However, it can be more complex that way. In other words, it can be more efficient to figure out how many bits the packet can match on and, based on that result, look at the subtable (e.g., a stage of the subtable) only if it could possibly match the packet.

Referring to FIG. 38, after consulting the tree, the forwarding element skips the second stage of the subtable 3805. The forwarding element then searches the subtable 3810 and finds a matching rule. As shown, the forwarding element does not search the last subtable 3815. This is because the priority value associated with the matching rule of the subtable 3810 is higher than the maximum priority value associated with the subtable 3815.

Figure 39:
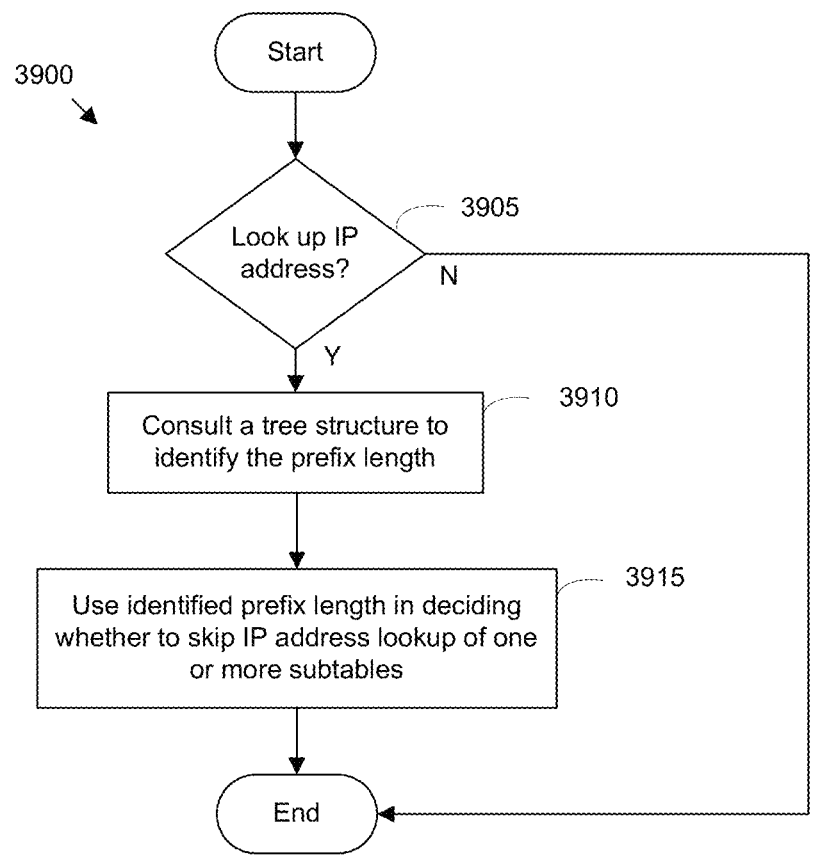
FIG. 39 conceptually illustrates a process that some embodiments implement to forego searching a particular subtable for an IP address.

FIG. 39 conceptually illustrates a process 3900 that some embodiments implement to forego searching a particular subtable for an IP address. In particular, the figure shows an example process or methodology, which makes the tree lookup algorithm operate as efficiently as it can. An example tree lookup algorithm will be described below by reference to FIG. 46.

Referring to FIG. 39, the process 3900 of some embodiments is performed by a forwarding element. The process 3900 begins by determining (at 3805) whether a packet classification operation requires a lookup of an IP address. The IP address can be an IPv4 address or an IPv6 address. The IP address can be a source IP address or a destination IP address.

At 3910, the process 3900 consults the tree structure to identity the prefix length of the packet. In some embodiments, the process 3900 also identifies, for a wildcard mask, the number of bits that should be un-wildcarded. As will be described below by reference to FIG. 40, the process of some embodiments also ensures that enough bits are unmasked such that a packet, which matches the generated flow, cannot match a child node if the traversal ends in a parent node. This can entail identifying an offset value that indicates the position of the first mismatching bit after one or more bits associated with the parent node. Finally, at 3915, the process 3900 then uses the identified prefix length in deciding whether to skip IP lookup of one or more subtable. The process 3900 then ends.

Some embodiments perform variations on the process 3900. The specific operations of the process 3900 may not be performed in the exact order shown and described. The specific operations may not be performed in one continuous series of operations, and different specific operations may be performed in different embodiments. For instance, the process 3900 is a simplified process in that it shows only a few operations relating to identifying the packet's prefix length and using the prefix length in order to decide whether to forego searching one or more subtables. In other words, the process may be a part of a larger macro process, such as the tuple space search algorithm of some embodiments or the staged tuple space search of some embodiments described above.

Figure 40:
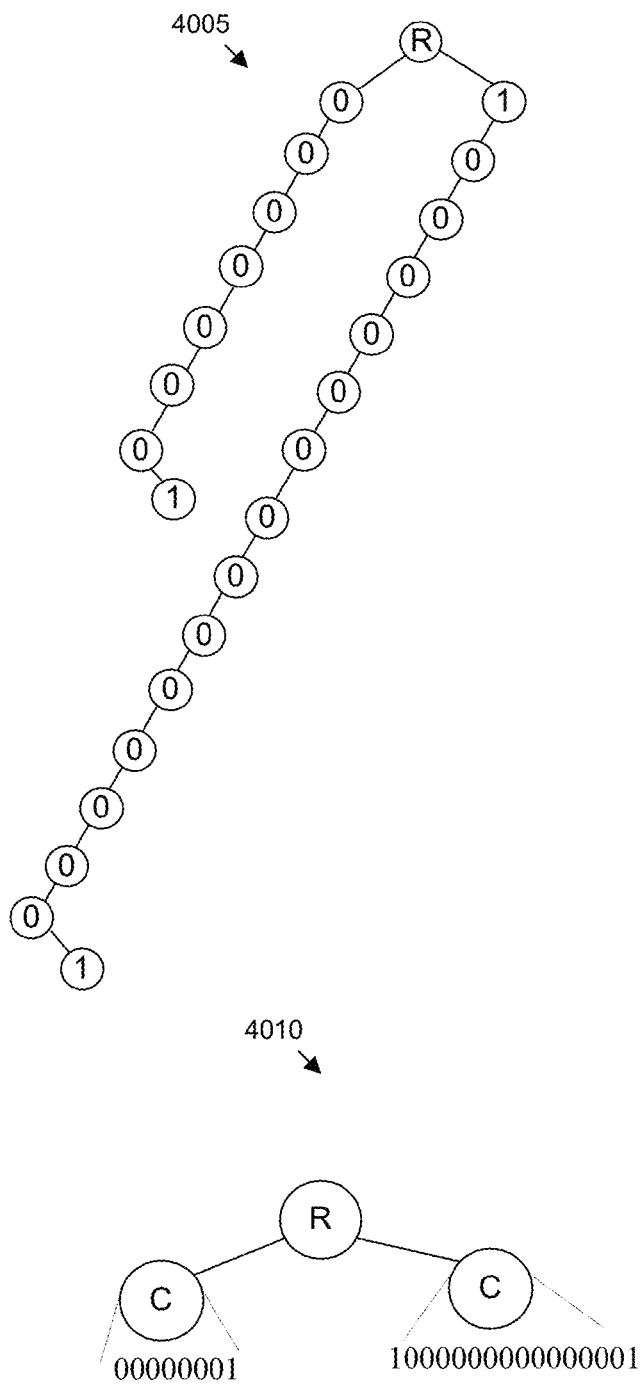
FIG. 40 illustrates several examples of different binary trees to track network prefixes.

As mentioned above, the forwarding element of some embodiments uses a binary tree to track prefixes. In some embodiments, the binary tree is a compressed binary tree. In some embodiments, the binary tree is a trie (i.e., a prefix tree). FIG. 40 illustrates several examples of different binary trees 4005 and 4010, which can be used to track network prefixes. Specifically, the figure shows an uncompressed version 4005 and a compressed version 4010.

In FIG. 40, the uncompressed version 3805 has a root node and a number of child nodes. Each node of the binary tree can include up to two child nodes: one representing the zero bit and the other representing the one bit. For IPV4 addresses, the uncompressed version 4005 can include up to 32 levels, which is one bit for each bit of the 32-bit IP address (e.g., the network prefix). For IPv6, the uncompressed version can include up to 128 levels, which is one bit for each bit of the 128-bit IP address. In some embodiments, the forwarding element populates the same tree structure with IPv4 and IPv6 addresses. In some embodiments, the forwarding element uses different tree structures for different types of IP addresses (e.g., IPv4 and IPv6). In some embodiments, the forwarding element uses different tree structures for different L3 fields, such as the source and destination IP address fields.

As shown in FIG. 40, the tree structure 4005 is initialized with two IP addresses of two different classifier rules. The first classifier rule has an IP address of 1.0.0.0/8, which translates in binary form to Ser. No. 00000001.00000000.00000000.00000000. The second classifier rule has an IP address of 128.1.0.0/16, which translates in binary form to 10000000.00000001.00000000.00000000. The forwarding element of some embodiments populates the tree structure by tracing the IP address of each classifier rule and creating a node for each bit of the network prefix. This means the trailing zeroes of IP addresses are not stored in the tree structure.

Different from the uncompressed version 4005, the compressed version 4010 stores all the common prefix bits in the parent node and stores all the prefix bits of an un-branching series of nodes in one node. For instance, the compressed tree structure is defined by a left branch with one node that represents the first classifier rule. All of the eight prefix bits of the IP address of the first classifier rule are all encompassed by a leaf node labeled "00000001". The compressed tree structure 4010 also includes a right branch with a node labeled "1000000000000001".

Different embodiments compress a tree structure differently. In some embodiments, the compression technique requires that the first bit(s) of each node's children to be different, and if there are no further branches, all the nodes in an un-branching chain can be combined into one node. In some embodiments, the compression algorithm sets a limit on the number bits a node can have. For instance, the algorithm might set a limit of 32 bits per node. This would be the maximum of bits that a node can be associated with. However, this value could easily be different (e.g., 128 bits per node) with some additional memory use.

Figure 41:
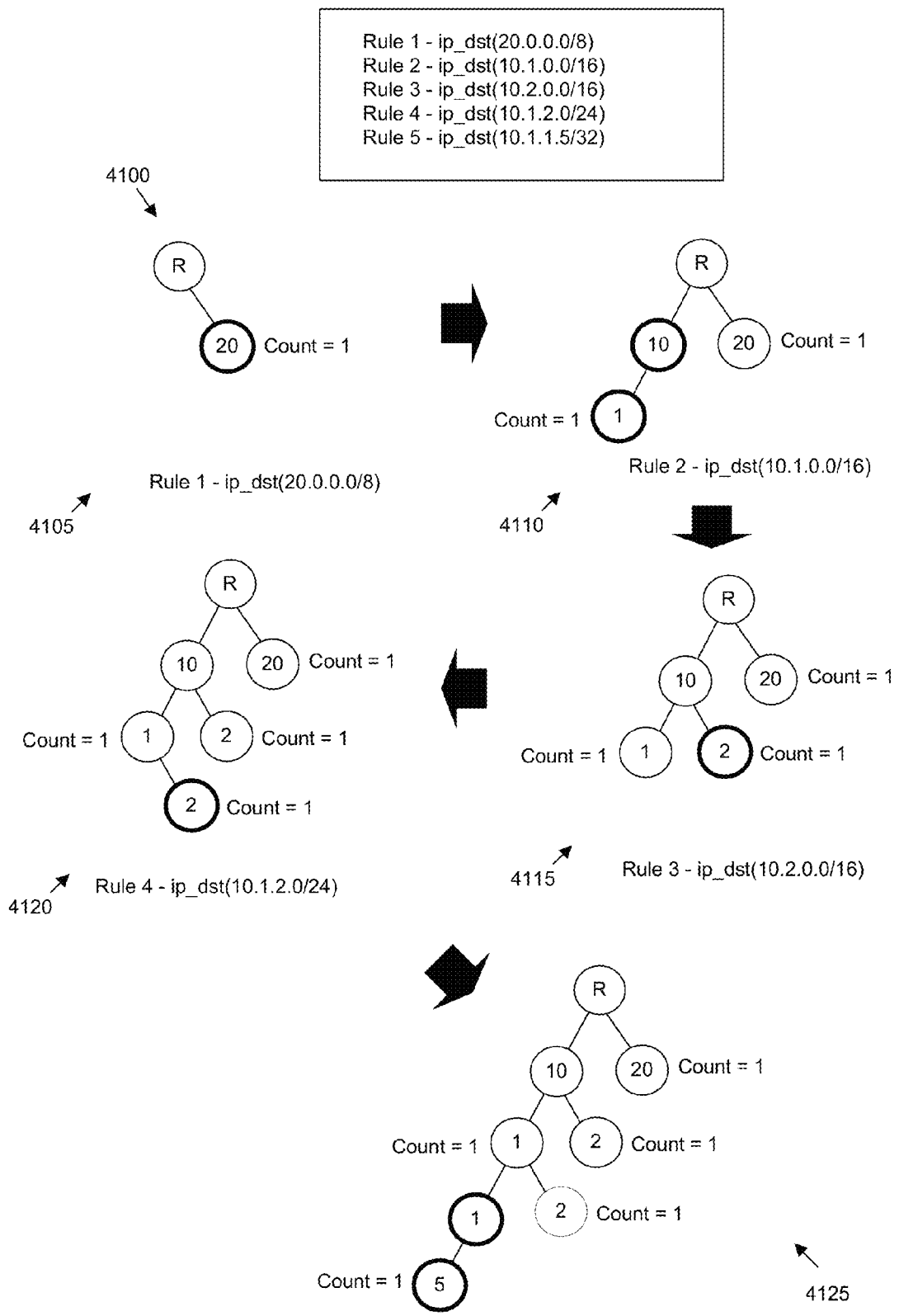
FIG. 41 illustrates an example of how the forwarding element of some embodiments maintains a count of the number of IP address prefixes associated with each node.

FIG. 41 illustrates an example of how the forwarding element of some embodiments maintains a count of the number of IP address prefixes associated with each node. That is, the forwarding element maintains, for each node, a count of how many rules have the specific prefix. One of the reasons for maintaining such a count is because, without the count or some other indication, the forwarding element would not know if a branching node (i.e., a node with one or more children) represents zero, one or more rules.

Five stages 4105-4125 of the tree structure 4100 are shown in FIG. 41. To simply the description, the tree structure 4100 is an octet tree. Accordingly, the binary implementation may have nodes that branch differently at different bit level and not at the octet level, as illustrated in FIG. 41. In the first stage 4105, the forwarding element (not shown) has created the tree structure 4100 and initialized it with the first rule. In some embodiments, the forwarding element creates the tree structure, receives the first rule, and follows the bits of the rule down the tree, starting from the root node. If a leaf node has been reached and there is at least one additional bit in the rule, then the forwarding element creates a new node for each additional bit. If the tree is a compressed binary tree, the forwarding element might create one new node for the additional bits and a new branching node that encompasses multiple common bits.

In the first stage 4105, the forwarding elements has started from the root node of the tree structure 4100 and added one node for the network prefix of the IP address of the first rule. The forwarding element has also incremented the count of the associated node from a zero count or null value to a non-zero count (e.g., the number 1).

In the second stage 4110, the forwarding element attempts to traverse the tree structure 4100 following the bit pattern of the prefix of the second rule. Here, the forwarding element has added two nodes representing the prefix of the IP address of the second rule. Similar to the first stage, the forwarding element has associated a non-zero count to the new leaf node. In the third stage 4115, the forwarding element has traced the third rule and created a new node that represents that rule. The forwarding element has also associated the node with a non-zero count.

The fourth stage 4120 is similar to the previous stages. Here, the forwarding element has created a new leaf node that represents the prefix of the IP address of the fourth rule. By doing so, the leaf node of the second rule has become a branching node. The fifth stage 4125 is similar to the previous stages. As shown, the forwarding element has created two additional nodes that represent the prefix of the IP address of the fifth rule.

In the example described above, the forwarding element populates a tree structure using several different classifier rules. In some embodiments, the forwarding element removes a rule from the tree structure by finding a leaf node or a branching node associated with the rule. This can entail traversing down the tree structure following the bit pattern of the rule. Thereafter, the forwarding element attempts to traverse up the tree structure to a parent node. For instance, if it is at the root node, it may not be able to traverse up the tree structure. If it can traverse up the tree structure, the forwarding element may remove the current node and traverses up to the parent node. In some embodiments, the forwarding element removes a node if that node is not associated with any other rule. If the parent node has no other child node, the forwarding element may remove the parent node. If the current node does not have a child node, the forwarding element does nothing (i.e., retains the parent node). A similar example of removing an L4 match field value from a tree structure is described above by reference to FIG. 32.

Having described populating a tree structure, several examples of searching the tree structure will now be described by reference to FIGS. 41-45. FIG. 41 shows an example of specifying a wildcard masking by tracing an IP address header of a packet down a tree structure. This figure shows the same octet tree structure 4100 that is described above by reference to FIG. 41.

Figure 42:
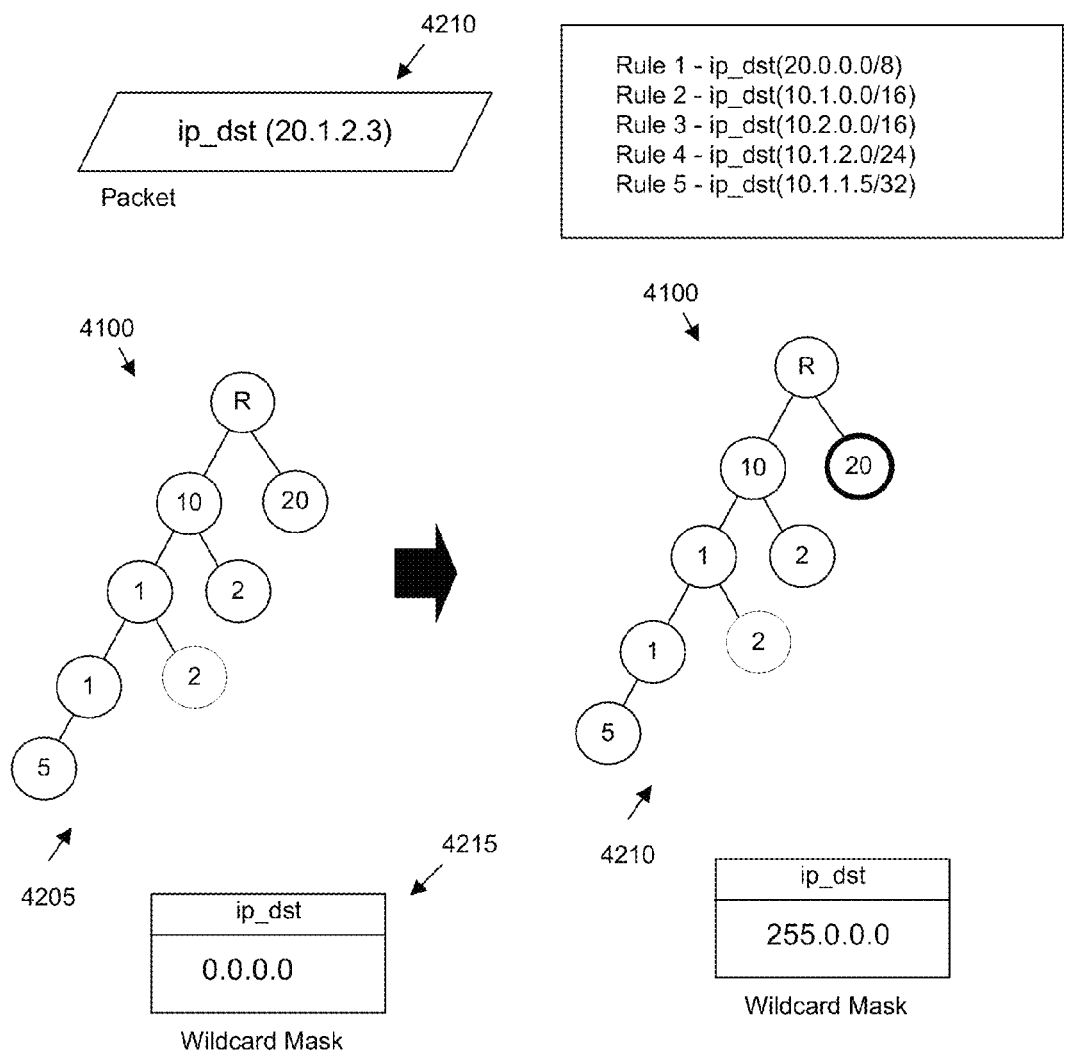
FIG. 42 shows an example of generating a wildcard masking by tracing an IP address header of a packet down a tree structure.

Two stages 4205 and 4210 of the tree structure 4100 are shown in FIG. 42. In the first stage 4205, the wildcard mask 4215 is completely wildcarded. In the second stage 4210, the forwarding element traverses the tree structure from the root node to one of its leaf nodes by tracing the first eight bits of the packet's IP address. Based on the traversal of the first eight bits, the forwarding element specifies a wildcard mask for the IP address having the first eight bits un-wildcarded. This is shown in the second stage 4210 with the wildcard mask being changed from 0.0.0.0 to 255.0.0.0. The classifier may use the wildcard mask produced by the tree lookup as is, or limited to the number of bits of each subtable being searched.

Figure 43:
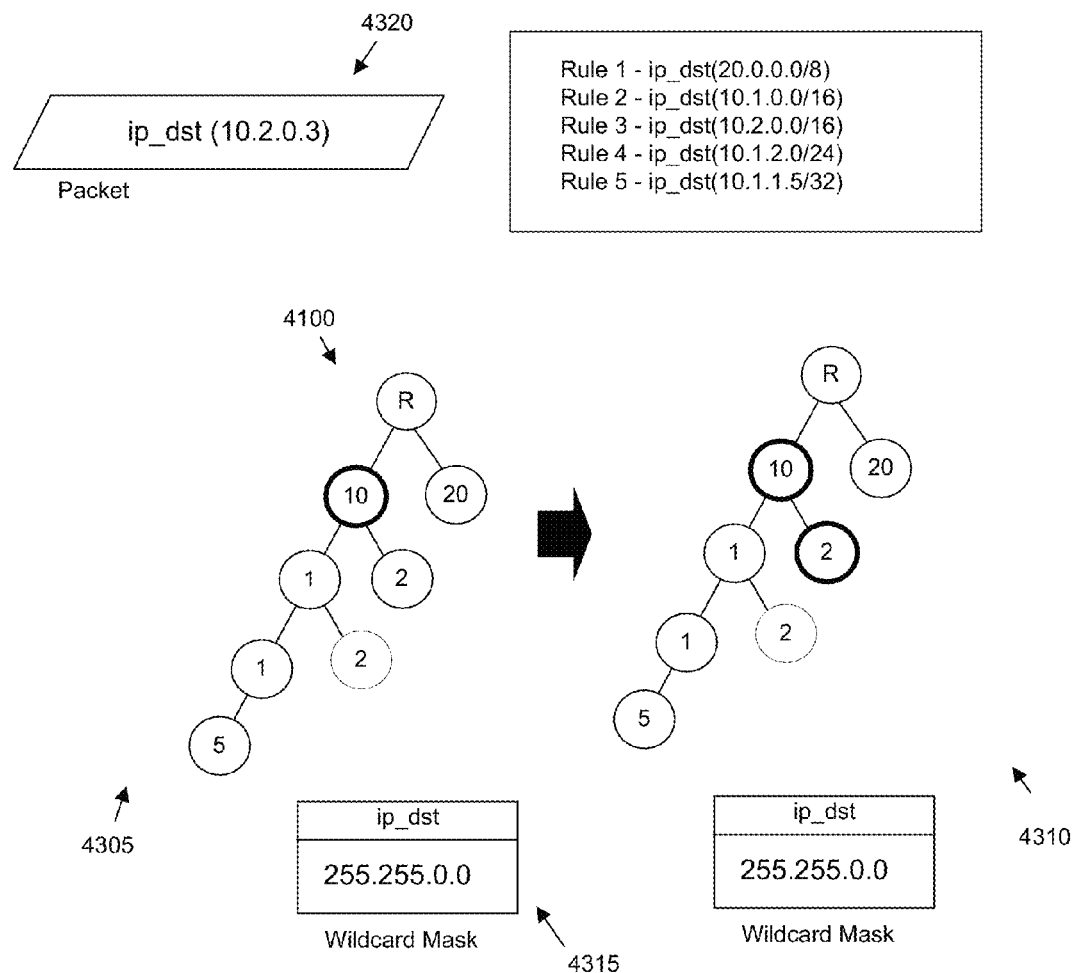
FIG. 43 illustrates another example of generating a wildcard masking by tracing a prefix of an IP address header down the tree structure.

The previous example shows traversing one 8-bit level of the octet tree structure 4100. FIG. 43 illustrates another example of generating a wildcard masking by tracing a prefix of an IP address header down the tree structure 4100. Specifically, this figure shows in two stages 4305-4310 how the forwarding element of some embodiments traverses two 8-bit levels to reach a leaf node. In the first stage 4305, the forwarding element traverses the tree structure 4100 from the root node to one of its leaf nodes by tracing the first eight bits of the packet's IP address. The forwarding element then specifies un-wildcarding the first eight bits of the wildcard mark. This is shown in the first stage 4305 with the wildcard mask 4315 being changed from 0.0.0.0 to 255.0.0.0. In the second stage 4310, the forwarding element continues the traversal of the tree structure by tracing the next eight bits of the same IP address of address. The forwarding element then specifies un-wildcarding the next eight bits of the wildcard mask.

Figure 44:
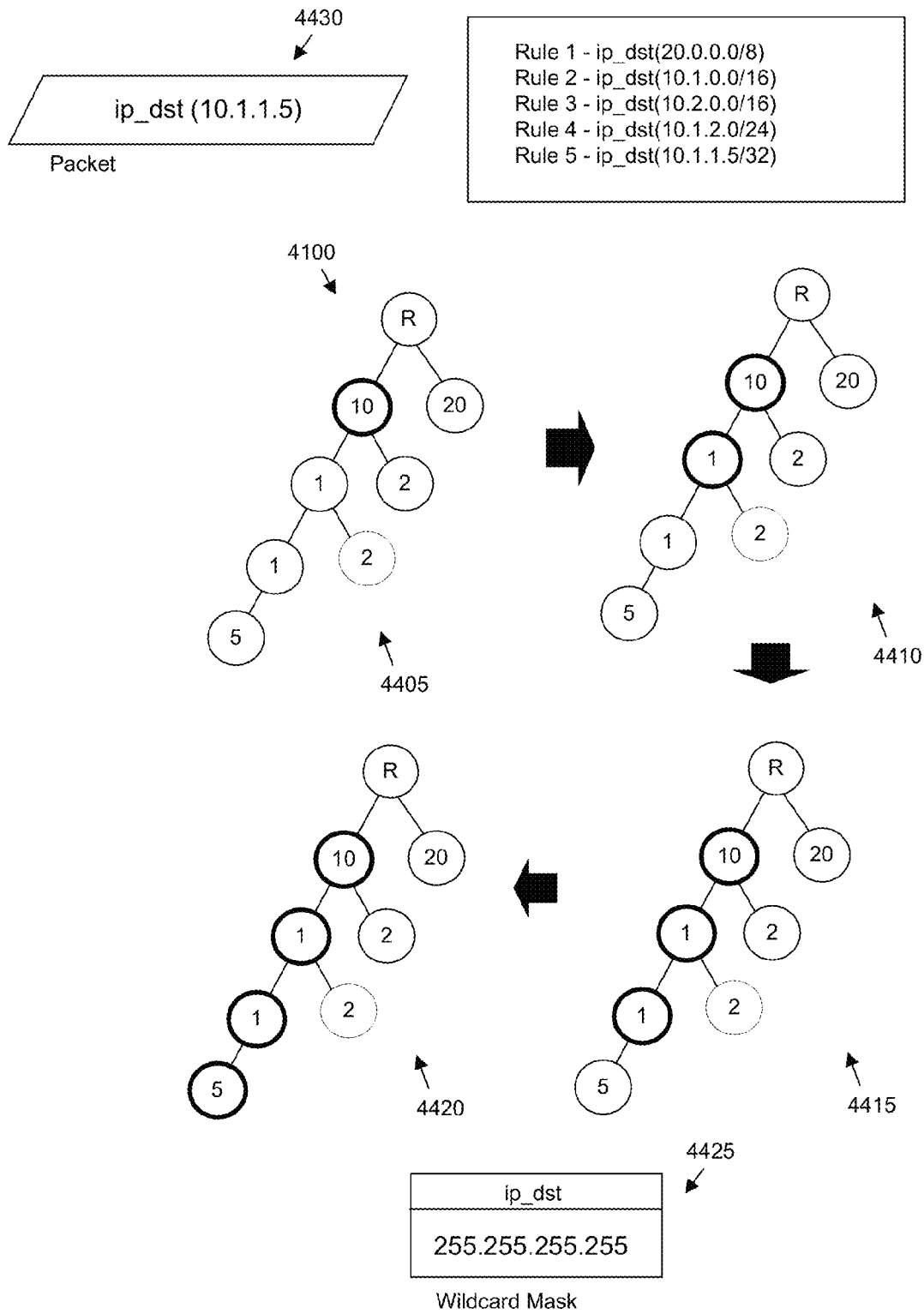
FIG. 44 illustrates another example of generating a wildcard mask by tracing the routing prefix of an IP address header down a tree structure.

FIG. 44 illustrates another example of defining a wildcard mask by tracing the routing prefix of an IP address header down a tree structure. Specifically, this figure shows in four stages 4425 how the forwarding element of some embodiments traverses four 8-bit levels of the tree structure to reach a leaf node. The resulting wildcard mask is 255.255.255.255, which means the entire 32 bits of the IP address field will be unmasked.

Figure 45:
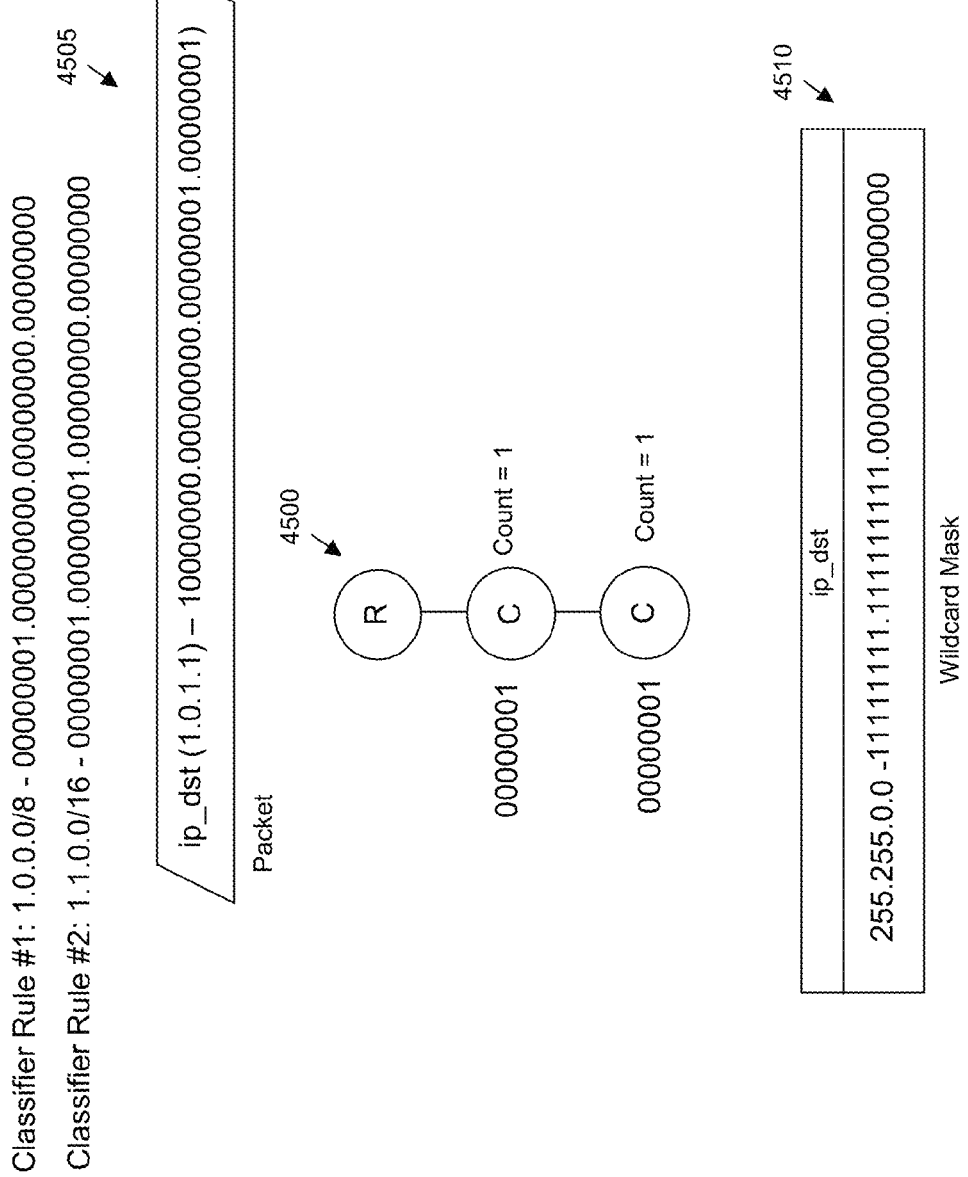
FIG. 45 illustrates an example of un-wildcarding additional bits of a wildcard mask.

The previous three figures illustrate examples of finding a leaf node that represents at least one rule. As mentioned above, in performing the prefix tracking algorithm, the forwarding element might not reach a leaf node of a tree structure but reach a branching node. FIG. 45 illustrates an example of un-wildcarding additional bits of a wildcard mask. In some embodiments, the forwarding element uses a count or some other variable associated with a node to detect that the node contains a set of one or more rules. The main idea here is that, when the traversal ends at a branching node or a parent node, it is not sufficient to simply un-wildcard the bit associated with that node. This is because that would encompass the whole sub tree beneath that node. The forwarding element should un-wildcard additional bits if it is matching a parent node. The additional bits are to prove that the packet does not match one or more other rules, which are represented in the sub tree underneath the parent node.

FIG. 45 shows a compressed binary tree 4500 with two prefixes of IP addresses of two classifier rules. The first rule has an 8-bit prefix, and the second rule has a 16-bit prefix. The first eight bits are shared between the two rules. As such, the compressed tree structure includes the first node under the root node, which has the common 8 bits between the two rules (i.e., 00000001), and the second node has the next eight remaining bits of the second rule with 16-bit prefix (i.e., 00000001). As an additional detail, in this situation, the forwarding element of some embodiments stores the first set of common bits in the root node, rather than the next node from the root.

The forwarding element has also received a packet 4505. Following the header value, the forwarding element then traverses the tree structure 4500 to the node associated with the first rule. The forwarding element of some embodiment uses the non-zero count to determine that the node is associated with a rule. As the node is associated with at least one other node, the forwarding element traces the header value to find if the next bits match the bits in one of the children nodes. Here, the forwarding element finds that there is no match, and that the wildcard mask with 16 bits is sufficient to show that the packet does not match with any of the rules beneath the matching rule.

As shown, the next bit that is different from the packet and the tree structure 4500 is the sixteenth bit of the packet header. The sixteenth bit of the packet header is set to "0". On the other hand, the leaf node of the tree structure, which represents the 16$^{th}$ bit of the second rule, is set to "1". Thus, the forwarding element un-wildcards the 16 bits of the wildcard mask. This is shown in FIG. 45 with the wildcard mask being 255.255.0.0, which means that the first 16 bits of the wildcard mask has been unmasked. Note that if the ninth bit was the mismatching bit, then the wildcard mask may read 255.128.0.0. If the tenth bit was the mismatching bit, then the wildcard mask may read 255.192.0.0, and so forth.

Figure 46:
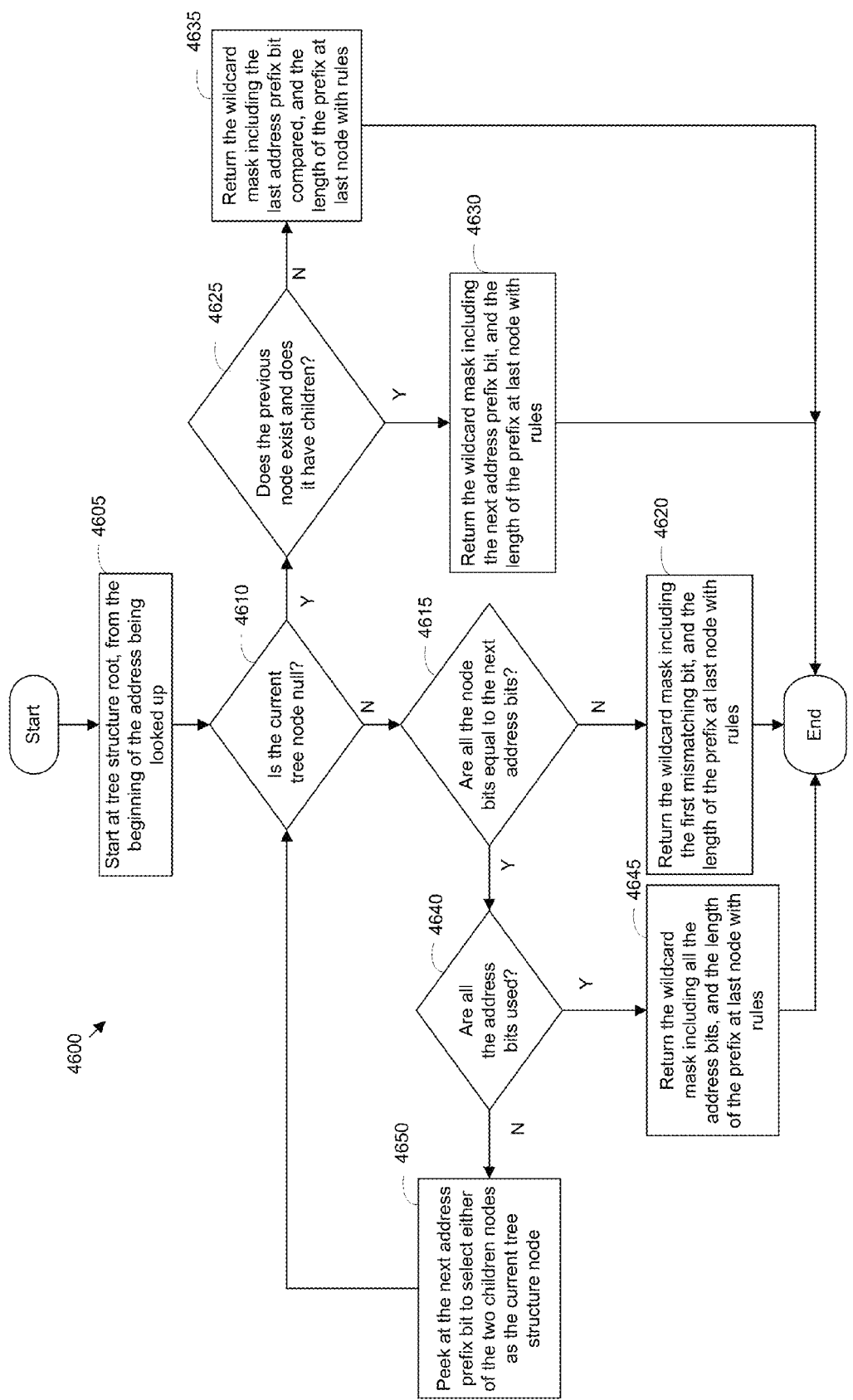
FIG. 46 conceptually illustrates a process that some embodiments implement to generate a wildcard mask and decide whether to skip lookup of one or more subtables.

Different embodiments use different tree lookup algorithms. An example tree lookup algorithm will now be described by reference to FIG. 46. FIG. 46 conceptually illustrates a process 4600 that some embodiments implement to generate a wildcard mask and decide whether to skip lookup of one or more subtables. The figure shows an example implementation for traversing a compressed binary tree. In some embodiments, the process 4600 is performed by a forwarding element.

The process 4600 of some embodiments outputs at least two values. First, the process 4600 returns the length of the prefix (i.e., the prefix length) at last node with one or more rules. All subtables or stages that have longer or shorter prefix than the returned prefix length can be skipped, in some embodiments. Second, the process 4600 returns the number of bits from beginning of the wildcard mask that need to be set to ones. In some embodiments, the two returned values are independent of each other. The wildcard mask gives the number of bits that need to be un-wildcarded in the wildcard mask. The prefix length informs the forwarding element, which subtables can be skipped.

In some embodiments, the two returned values serve distinct purposes. For example, consider a classifier where all the rules have a /32 prefix on a destination IP address. If a packet with a destination IP address, which is not in the classifier is received, then the returned wildcard mask value will contain enough bits to "prove" that the packet did not match any of the rules. This value can be anything between 1 and 32, depending on the actual addresses in the classifier and the packet. For example, if the classifier has a rule with a destination IP address of 1.1.1.3/32 and the packet has an IP address of 1.1.1.2, then the wildcard mask returned from the process is the value 32 as it is the last bit that differs (e.g., must un-wildcard all 32 bits), and the returned prefix length value is 0 (e.g., no match was found at any prefix length), meaning that all subtables with destination IP prefix length greater than 0 can be skipped.

As shown in FIG. 46, the process 4600 begins (at 4605) by starting at the tree structure root node. Specifically, the process attempts to trace the IP address being looked up from its beginning At 4610, the process 4600 determines if the pointer to the current tree node is null. If the pointer to the current tree node is null, the process 4600 determines (4625) whether a previous node exists and if that previous node has at least one child. In some embodiments, there are several cases when a tree node pointer can be a null pointer. First, an empty tree is represented by a null pointer. All trees are initially empty, so the tree node pointer is a null pointer in that case. Second, when a child node is selected as the next tree node, the tree node can become a null pointer, if there was no child node (e.g., when there is no child node, the node pointer will be a null pointer). If both of those conditions are true (i.e., a previous node exists and if that previous node has at least one child), the process 4600 returns (at 4630) the wildcard mask including the next address prefix bit. In some embodiments, this means that the total number of bits from the beginning up to and including the address prefix bit is returned by the process. The process also returns (at 4630) and the length of the prefix at the last node that is associated with one or more rules. The process (4600) then ends.

If both of those conditions are false, the process 4600 returns (at 4635) the wildcard mask including the last address prefix bit compared. In some embodiments, this means the total number of bits from the beginning up to and including the last compared address prefix bit is returned by the process. The process also returns (at 4635) the length of the prefix at the last node with one or more rules. The process 4600 then ends.

If the current tree node is not null, the process 4600 determines (at 4615) whether all node bits are equal to the next address bits. If all node bits are not equal to the next address bits, the process 4600 returns (at 4620) the wildcard mask including the first mismatching bit. In some embodiments, this means the total number of bits from the beginning up to and including the first mismatching bit is returned by the process. The process also returns (at 4620) the length of the prefix at the last node that is associated with one or more rules. The process 4600 then ends.

If all node bits are equal to the next address bits, the process 4600 determines (at 4640) if all the address bits (e.g., the significant bits) of the packet have been used or traced. If all the address bits have been used, the process 4600 returns (at 4645) the wildcard mask including all the address bits. In some embodiments, this means the total number of bits from the beginning up to and including all the address bits is returned by the process. As shown, the process also returns (at 4645) length of the prefix at the last node with one or more rules. If not all of the address bits have been traced, the process 4600 peeks (at 4650) at the next address prefix bit to select either one of the two children nodes as the current tree structure node. Here, the process is traversing the binary tree to one of the two nodes. The process 4600 then returns to 4610, which is described above.

Some embodiments perform variations on the process 4600. The specific operations of the process 4600 may not be performed in the exact order shown and described. The specific operations may not be performed in one continuous series of operations, and different specific operations may be performed in different embodiments. As mentioned above, the process 4600 of some embodiments can be implemented to traverse a compressed binary tree. One of ordinary skill in the art would realize that the process could be implemented differently for different types of tree structures. As an example, for an octet tree implementation, the process might traverse the tree and check if the current node is associated with one or more rules. If yes, the process can un-wildcard the octet. Otherwise, the process might select the next octet of the IP address.

VII. Common Match Algorithms

In some embodiments, the forwarding element uses a common match algorithm to generate a wildcard mask. Alternatively, or conjunctively, the forwarding element of some embodiments uses a multi-bit common match algorithm to generate a wildcard mask. Several examples of different common match algorithms will now be described by reference to FIG. 47-62.

A. Example Common Match Algorithms

In some embodiments, the forwarding element uses a common match algorithm to generate a wildcard mask. The common match algorithm of some embodiments examines a set of one or more rules to find a "common match". That is, the algorithm attempts to find one or more bits at different positions in which each rule in the set of rules shares with one another. The algorithm then attempts to find the position of one bit from the packet header, which has a different value than the shared bit at the same bit position. The algorithm then unmasks the corresponding bit from the wildcard mask.

Figure 47:
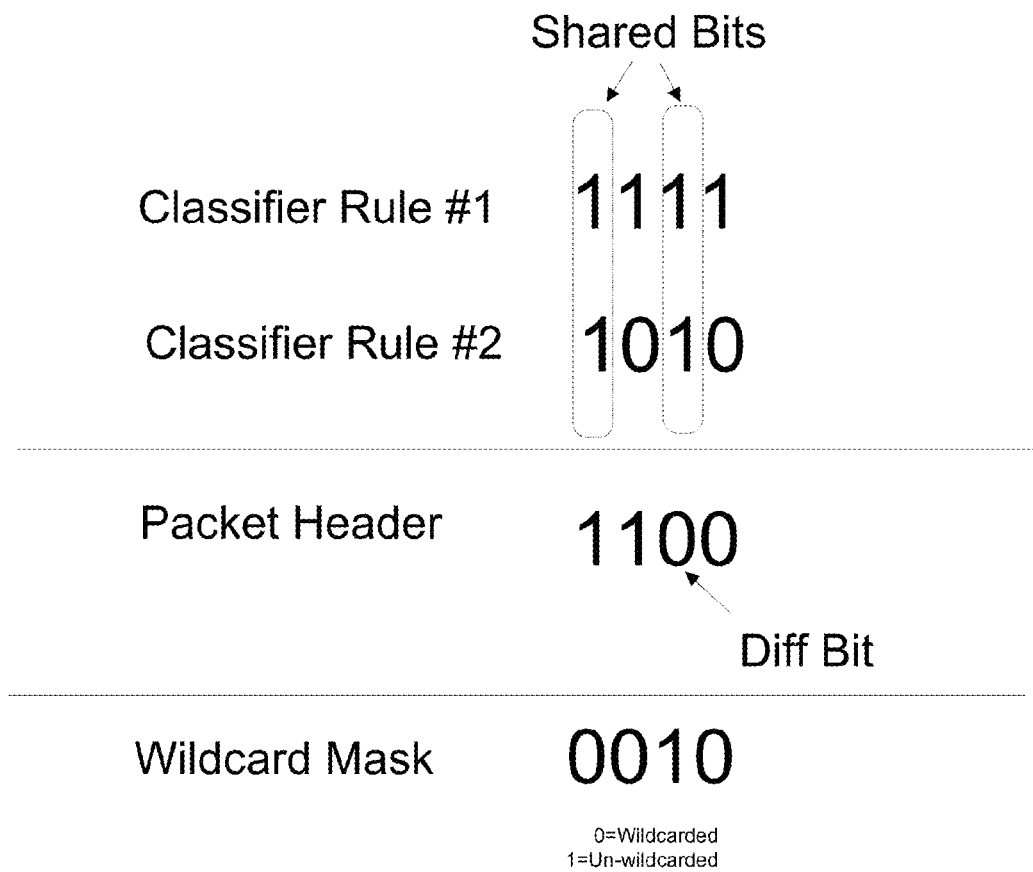
FIG. 47 conceptually illustrates the common match algorithm of some embodiments.

FIG. 47 conceptually illustrates the common match algorithm of some embodiments. The figure shows two classifier rules having two different values that relate to the same set of match fields (e.g., for Layer N header or metadata). The first rule has the bits 1111, while the second rule has the bits 1010. The first and second rules have two bits in common. The shared bits are the second and fourth bits, which are set to "1". In some embodiments, the common match algorithm iterates through each classifier rules attempting to find such a set of shared bits at different bit positions.

The algorithm of some embodiments takes the packet header value relating to the same set of match fields and determines if the corresponding set of header bits is different from the set of shared bits. To simply the description, the header bit, which is different from the corresponding shared bit, may be referred to herein as a differing bit or simply a diff bit. If the header bit is different from the shared bit, the algorithm unmasks the corresponding bit from the wildcard mask.

As shown in FIG. 47, the two classifier rules share the fourth bit (i.e., the most significant bit). However, the fourth bit cannot be a diff bit because it is also shared with the packet header. Different from the fourth bit, the second bit of the packet header is a diff bit. The common match algorithm of some embodiments unmasks the corresponding bit from the wildcard mask. For instance, in the figure, the second bit of the wildcard mask is set to 1, where 1 means un-wildcarded and 0 means wildcarded. The wildcard mask indicates that, to prove that the packet cannot match the two rules, a forwarding element can compare the second bit of the header value with the corresponding bit of the match field value. In some cases, the algorithm may find multiple bit positions of multiple diff bits. In such cases, the algorithm chooses one of those bit positions and un-wildcards the corresponding bit from of the wildcard mask. This is because it only takes one bit to disqualify the classifier rules.

Figure 48:
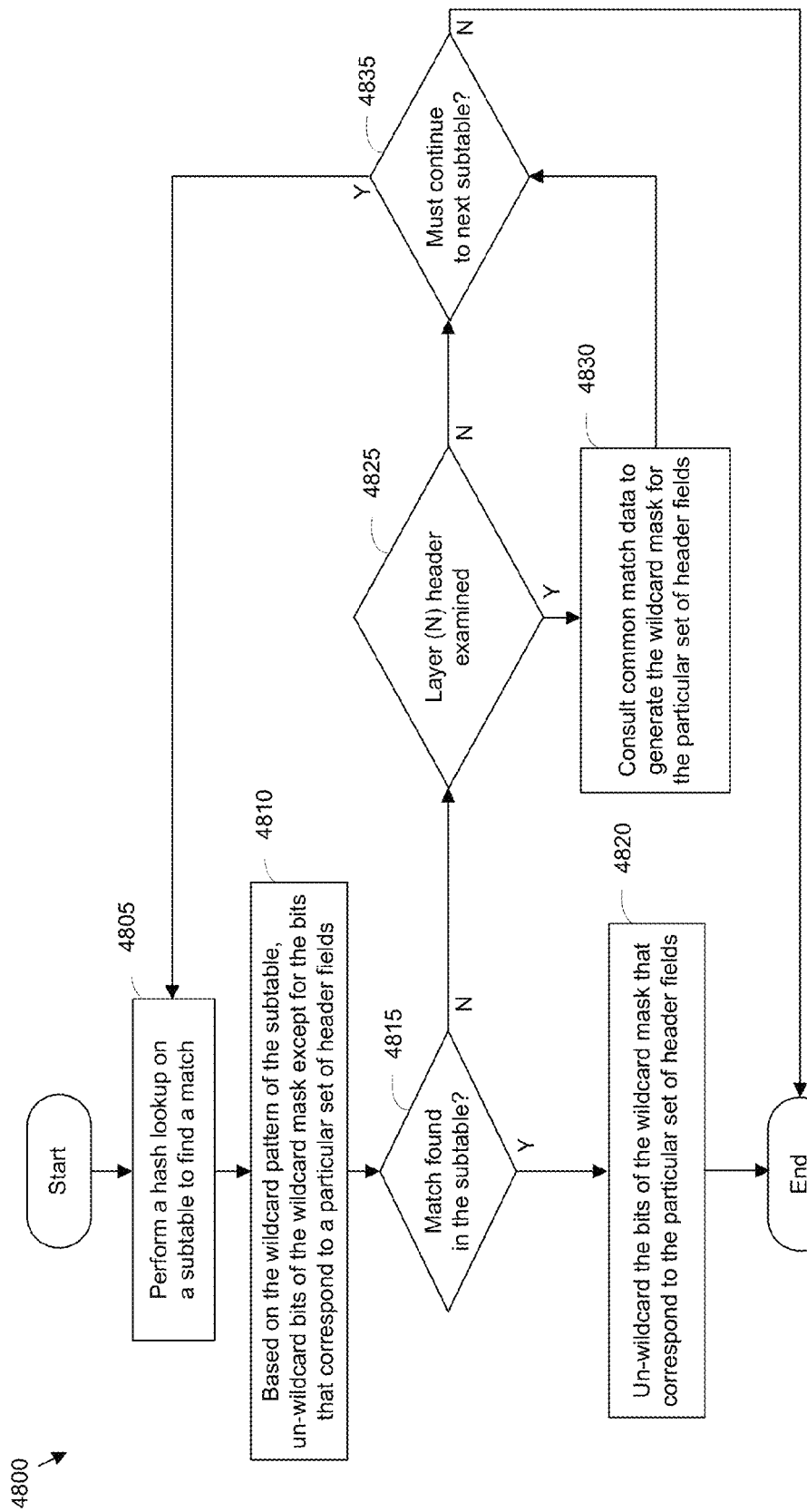
FIG. 48 conceptually illustrates a process that some embodiments implement to generate a wildcard mask by consulting common match data.

FIG. 48 conceptually illustrates a process 4800 that some embodiments implement to generate a wildcard mask by consulting common match data. This figure is similar to FIG. 26. However, instead of consulting a tree structure, the process 4800 consults the common match data.

As shown in FIG. 48, the process 4800 begins by performing (at 4805) a hash-based lookup operation on a subtable to find a matching rule for packet. For staged lookup implementations, the lookup operation might entail searching multiple stages. Based on the wildcard pattern of the subtable, the process 4800 then un-wildcards (at 4810) some bits of the wildcard mask except for the bits that corresponds to the Layer N header.

At 4815, the process 4800 determines if a matching rule has been found in the subtable. If a match is found, the process un-wildcards (at 4820) those bits of the wildcard mask that corresponds to the Layer N header. If a match is not found, the process 4800 determines (at 4825) whether the Layer N header was examined in the hash-based lookup operation. The process of some embodiments makes this determination because a multi-stage lookup operation might have terminated the search without reaching the stage with the Layer N header. In some embodiments that use non-staged algorithms, the process might not make such determination and simply proceed to operation 4830, which is described below.

If a set of match fields relating to the Layer N header was examined, the process 4800 consults (at 4830) common match data to generate the wildcard mask for the Layer N header. If a set of match fields relating to the Layer N header was not examined, the process 4800 determines (at 4835) whether it must continue to the next subtable. In some embodiments, the process 4800 makes this decision based on a priority value (e.g., a maximum priority value) associated with each other subtable. If it must continue, the process 4800 returns to 4805, which is described above. Otherwise, the process 4800 ends.

Some embodiments perform variations on the process 4800. The specific operations of the process 4800 may not be performed in the exact order shown and described. The specific operations may not be performed in one continuous series of operations, and different specific operations may be performed in different embodiments.

Figure 49:
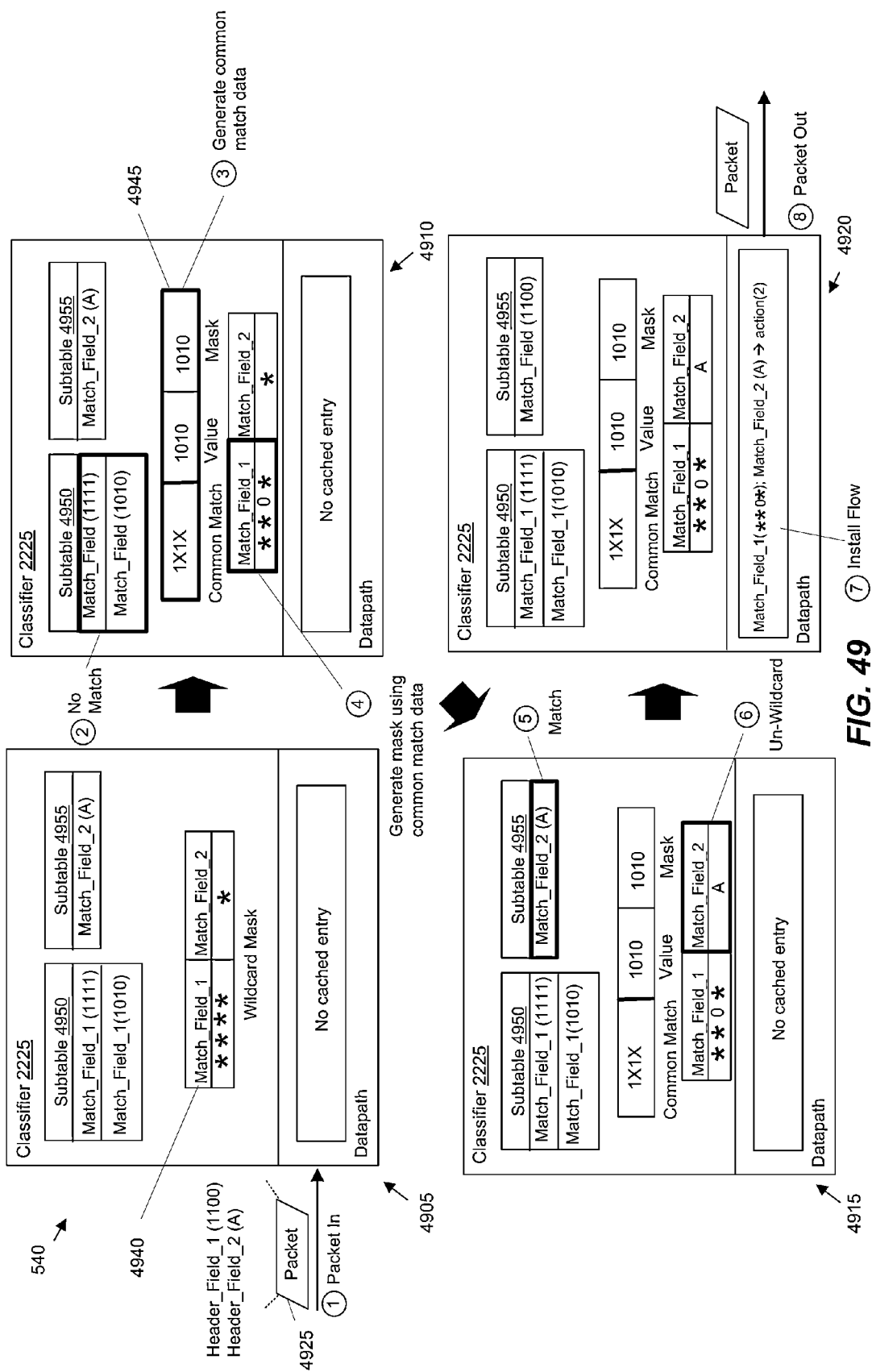
FIG. 49 illustrates an example of a forwarding element that consults common match data when generating a wildcard mask relating to a Layer N header.

FIG. 49 illustrates an example of a forwarding element 2200 that consults common match data 4945 when generating a wildcard mask 4940 relating to a Layer N header. To perform packet classification, the forwarding element 2200 includes the classifier 2225 that finds a matching classifier rule for a packet and generates a wildcard mask. Four operational stages 4905-4920 of the forwarding element 2200 are shown in the figure.

The first stage 4905 shows the forwarding element 2200 receiving a packet. The second stage 4910 shows the classifier 2225 performing a lookup operation on a first subtable 4950. The classifier has failed to find a matching rule for the packet. Here, instead of un-masking all of the bits relating to the match field, the classifier generates common match data based on the rules in the subtable 4950. In some embodiments, the common match data includes a value and a mask. The common match mask identifies which one or more bits a set of one or more rules have in common with one another, and the position of each shared bit. The common match value identifies the value of each shared bit.

In the example of the second stage 4910, the classifier 2225 has generated the common match data 4945 by examining the rules in the subtable 1650. The common match mask reads 1010, with 0 being not shared and 1 being shared. Thus, the common match mask indicates that the second and fourth bits are shared by two rules. The value of each of the bits is 1. So, the common match value is 1010, which means that the second and fourth bits are set to 1 in the two rules. To make it easier to understand, the common match data is also expressed using the following notations 1, 0, and X (e.g., 1X1X), where 1 is the value of the shared bit, 0 is the value of the shared bit, and X is not shared.

In the second stage 4910, after generating the common match data 4945, the classifier 2225 then uses the data to generate a wildcard mask. The classifier of some embodiments uses the common match data 4945 and the header data of the packet 4925 to identify the positions of one or more diff bits. For instance, in the second stage 4910, the classifier has determined that the second bit is different from the two rules. As such, the classifier has unmasked that corresponding bit from the wildcard mask.

In the third stage 4915, the classifier 2225 performs a lookup on the second subtable 4955 and finds a matching rule for the packet. The classifier also unmasks bits of the wildcard mask associated with the second match field. The fourth stage 4920 shows that the forwarding element 2200 has processed the packet and installed a new flow entry 4960 in the datapath.

In generating a mask, the forwarding element of some embodiments consults more than one set of common match data. The sets of common match data can be for different sets of header fields or the same set of header fields. The forwarding element of some embodiments can consult different sets of common match data associated with different subtables (e.g., hash tables). In some embodiments, one set of common match data is consulted to generate a wildcard mask, and another set of common match data is consulted to generate another wildcard mask. The wildcard masks are then combined (e.g., using a bitwise OR operation) to generate a new wildcard mask. Some similar examples that use different tree structures, instead of different common match data sets, are described above by reference to FIG. 28. For brevity sake, the same examples will not be shown for the common match data sets. However, one of ordinary skill in the art would understand that the examples of FIG. 28 are equally applicable to the common match data.

In some embodiments, the common match algorithms (e.g., the single bit common match algorithms, the multi-bit common match algorithms) perform their respective operations on non-wildcarded bits. For example, in FIG. 31, the forwarding element uses unmasked bits to populate a tree structure and ignores each masked bit. Similarly, with the common match algorithm, the forwarding element might use only unmasked bits to generate the common match data set. In some embodiments, if a particular field has wildcarded bits, the forwarding element initializes the common match mask of the common match data set with the wildcard pattern (e.g., in accordance with the subtable's wildcard mask) instead of all ones as described below by reference to FIGS. 50 and 56.

Figure 50:
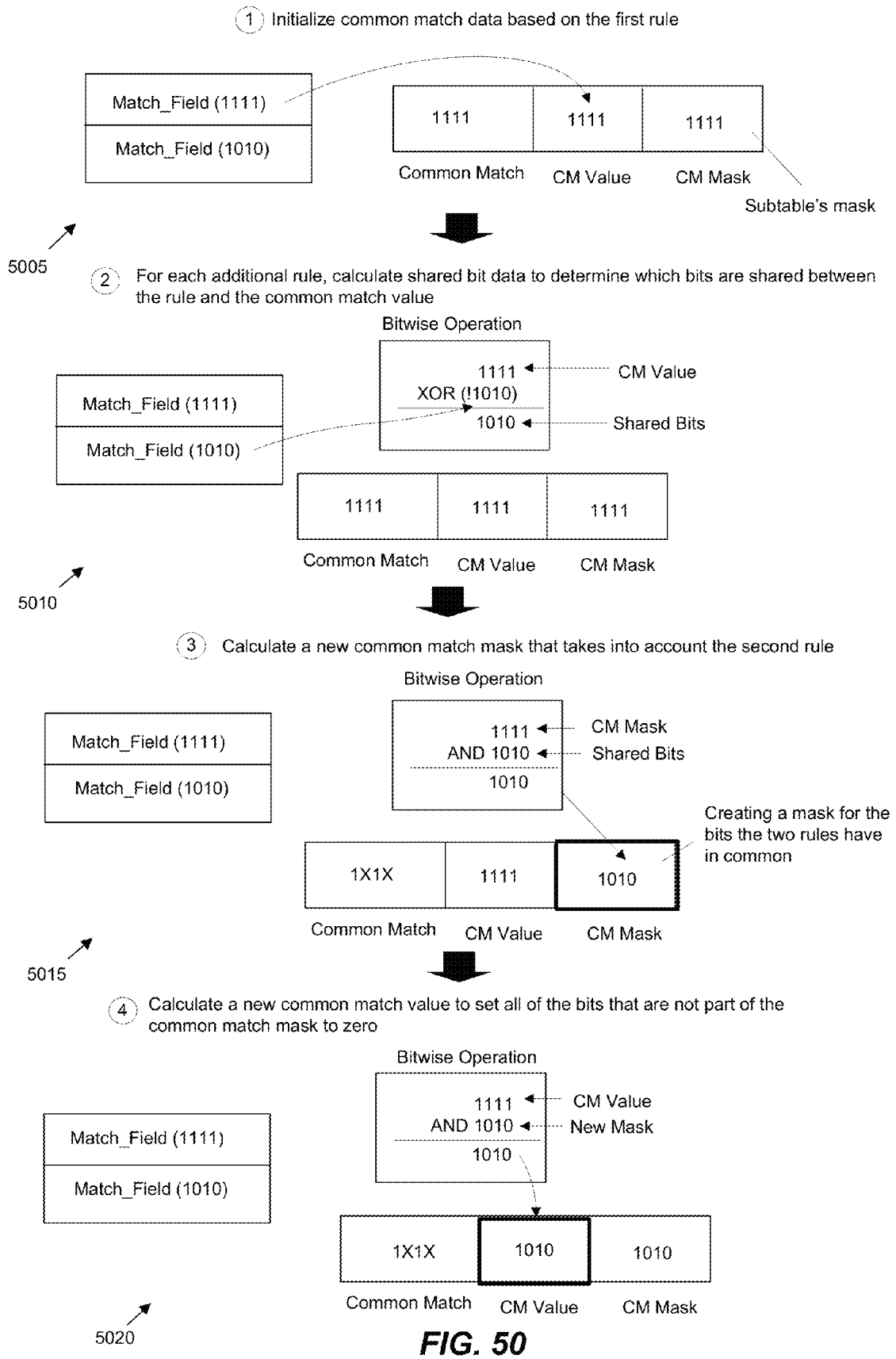
FIG. 50 illustrates an example of generating common match data from two classifier rules.

Different embodiments implement the common match algorithm differently. An example implementation of the common match algorithm will now be described by reference to FIGS. 50-54. FIG. 50 illustrates an example of generating common match data from two classifier rules. Four stages 5005-5020 of operations of the common match algorithm are shown in the figure. The first stage 5005 shows creating the common match data and initializing the data using the first classifier rule. The common match data includes a value and a mask. As mentioned above, the common match mask identifies which one or more bits a set of one or more rules have in common with one another, and the position of each shared bit. The common match value identifies the value of each shared bit.

In the first stage 5005, the common match value is set to 1111 using the first classifier rule. The common match mask is also set to 1111, which means that the first rule shares all bits with itself. The common match value shows the value of those shared bits. The common match data is also represented as 1111, where X means the bit is not shared, 1 means the bit is shared and the value is 1, and 0 also means the bit is shared and the value is 0. If a subtable or a group of rules is associated with a wildcard mask, the forwarding element of some embodiments initializes the common match mask using the wildcard pattern of the wildcard mask. That is, instead of all ones, the common match mask may include one or more zeroes.

In the second stage 5010, the algorithm takes the second rule and begins the process of folding the second rule into the common match data. The common match algorithm of some embodiments folds a rule into the common match data by first determining which set of one or more bits the second rule share with the current common match mask. In the example of the second stage 5010, the common match algorithm generates the shared bit by taking the common match value (1111) from the common match data and taking the bitwise NOT of the second rule (!1010), and performing the logical exclusive OR (XOR) operation on each pair of corresponding bits. The result of the XOR operation is a value (1010), which identifies the bits that the second rule shares with the common match mask.

The third stage 5015 shows the continuation of the fold operation. Specifically, the second portion of the fold operation entails calculating a new common match data that takes into account the second rule. In the example of third stage 5020, the algorithm of some embodiments performs a bitwise AND operation between the current common match mask (1111) and the calculated shared bits (1010). The bitwise AND operation sets each bit that is not shared between the shared bits with the current common match mask to 0. The result of the bitwise AND operation is a new common match mask that encompasses both the first and second rules. As shown, since the second rule contains the bits 1010, the first and third bits are no longer shared with the first rule. Hence, the common match mask is set to 1010, which means that the first and third bits are not shared, and the second and fourth bits are shared.

In the fourth stage 5020, the common match algorithm of some embodiments updates the common match value. Specifically, the algorithm performs a bitwise operation to set all of the bits that are not part of the common match to zero. The algorithm of some embodiments performs this for cleanliness. As shown, the algorithm of some embodiments performs a bitwise AND operation between the current common match value (1111) and the new common match mask (1010). The bitwise operation sets each bit that is not common between the two rules to 0. The result of the bitwise operation is the new common match value, in some embodiments.

Figure 51:
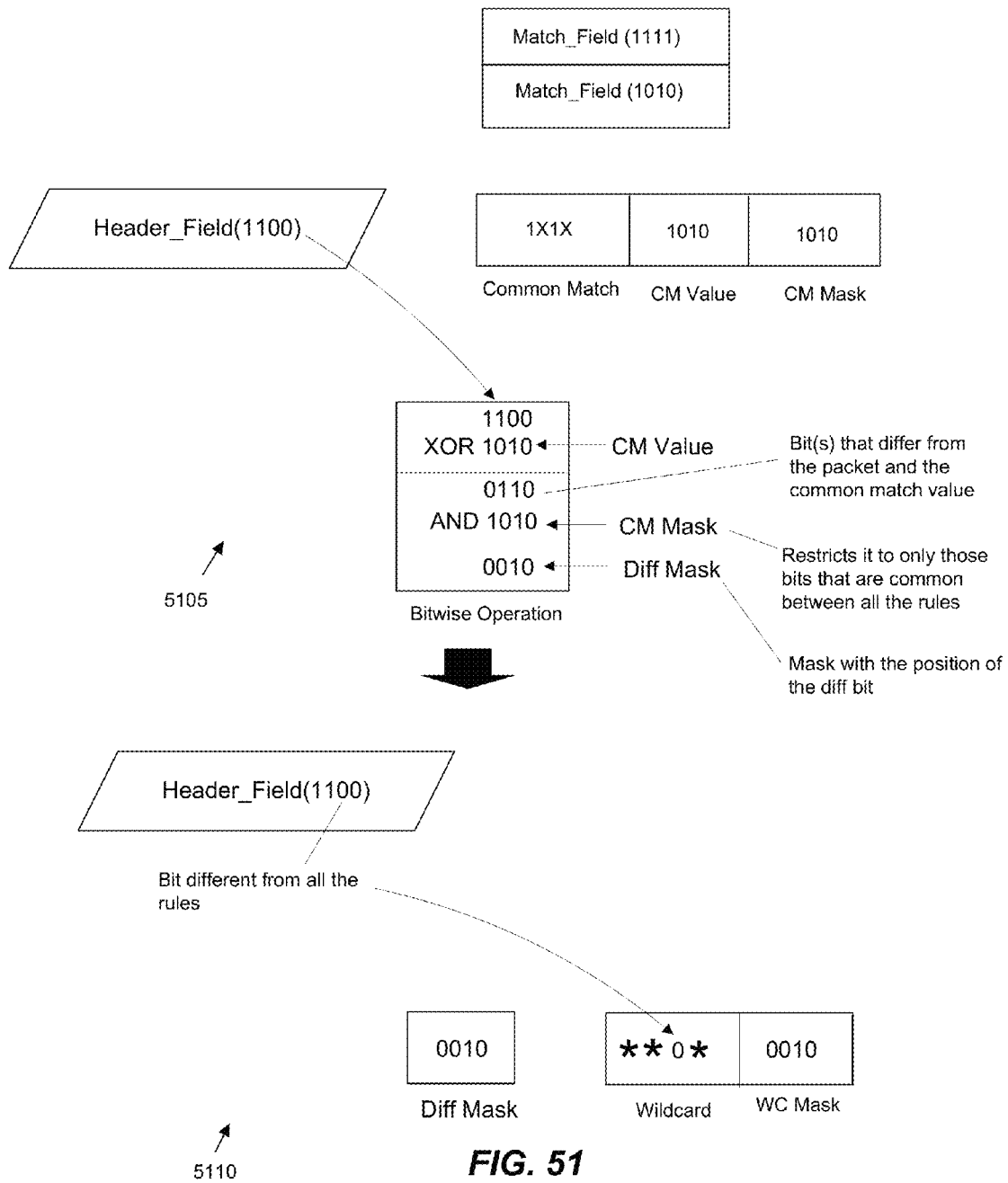
FIG. 51 illustrates an example of using the common match data and packet header data to generate a wildcard mask.

FIG. 51 illustrates an example of using the common match data and packet header data to generate a wildcard mask. Two stages 5105 and 5110 of operations of the common match algorithm of some embodiments are illustrated in the figure. In the first stage 5105, the common match algorithm takes the header value (1100) and the common match value (1010), and performs a bitwise XOR operation on those two values. The result of the bitwise XOR operation is a value (0110) that identifies zero or more bits that are different from the packet and the common match value. For instance, the value 0110 indicates that the second and third bits of the packet header are different from the common match value.

As shown in the first stage 5105, the common match algorithm then takes the result of the first bitwise operation and the current common match mask, and performs a bitwise AND operation of those binary numbers. The bitwise AND restricts the one or more differing bits to zero or more bits that are common between each of the rules. The result of the bitwise operations is a differing mask or diff mask that identifies the position of each diff bit. The diff mask is then used to generate the wildcard mask.

FIG. 52 conceptually illustrates several examples of generating a wildcard mask from a diff mask. In some embodiments, the wildcard mask is generated by choosing one bit from diff mask and unmasking the corresponding bit from the wildcard mask. Different embodiments can choose different bits. For instance, the top portion of the figure shows that the algorithm of some embodiments starts from the most significant bit and chooses the first binary number that is set to 1. The algorithm then un-masks the corresponding bit from the wildcard mask. The bottom portion of the figure shows that some embodiments starts from the least significant bit and chooses the first binary number that is set to 1.

Figure 53:
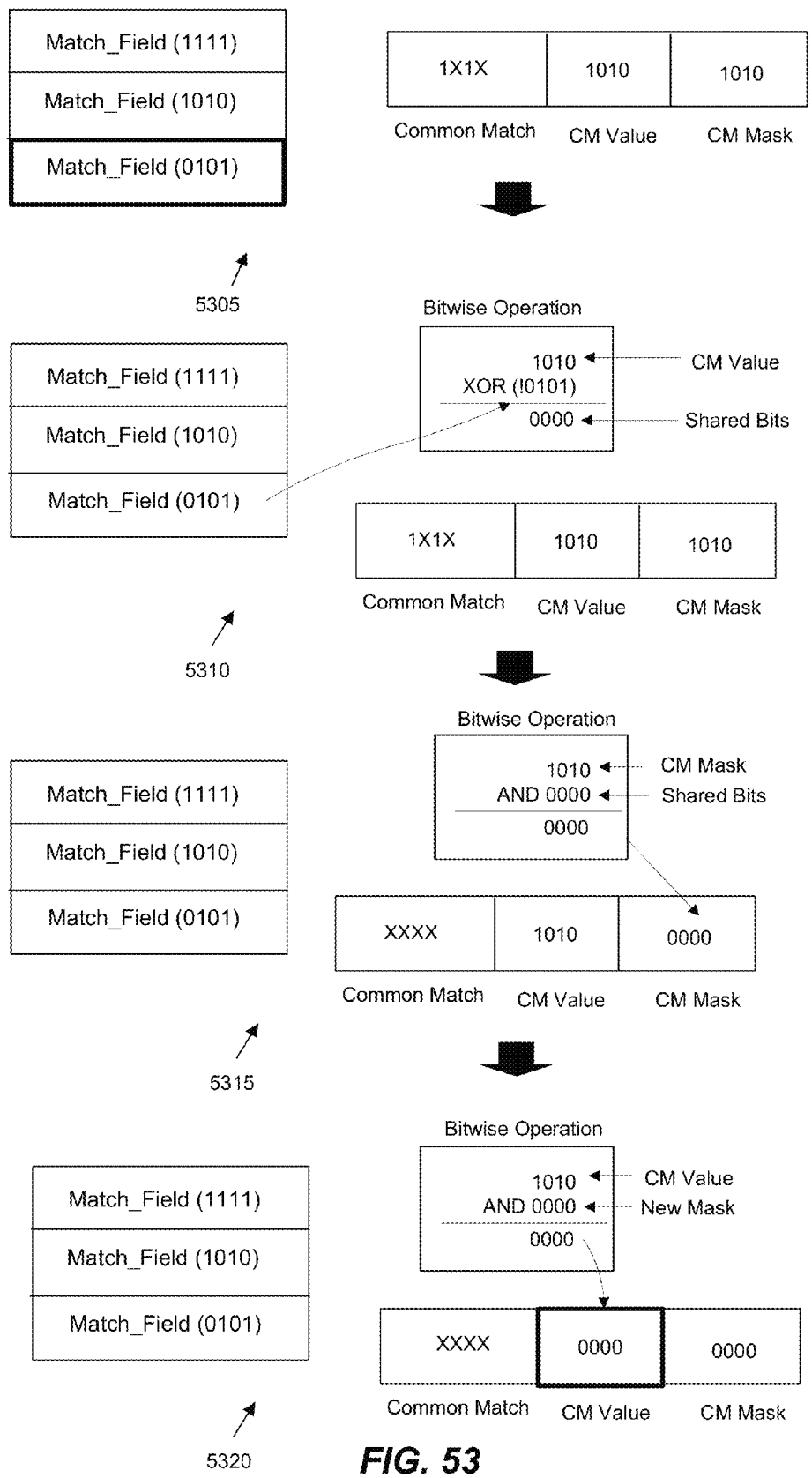
FIG. 53 illustrates an example of performing the common match algorithm of some embodiments and finding no common match.

A problem with the single bit common match algorithm is that often times a group of rules have no bits in common with one another. FIG. 53 illustrates an example of performing the common match algorithm of some embodiments and finding no common match. Four stages 5305-5320 of operations of the common match algorithm of some embodiments are shown in the figure. These stages 5305-5320 are a continuation of the ones shown in FIG. 51.

The first stage shows that, in addition to the two existing classifier rules, there is a new rule with the value 0101. The first stage 5305 also shows that common match algorithm of some embodiments can re-use the previously generated common match data. In some embodiments, when a forwarding element receives a first packet, it iterates through a group of rules to generate the common match data. When a new rule is added to the forwarding element, the classifier might run the algorithm again to fold the new rule into the previously generated common match data.

In the second stage 5310, the common match algorithm takes the bitwise NOT of the match field value (!0101) of the new rule and the current common value (1010), and once again performs a bitwise XOR operation on those two values. The result of the bitwise XOR operation is a value, which identifies each shared bit between the match field value and the current common match value. Here, the result of the operation is 0000, which means that there are no shared bits.

In the third stage 5315, the common match algorithm once again performs the bitwise AND operation using the current common match mask (1010) and the shared bit value (0000). The result of the bitwise AND operation is the new common match mask. The new common mask is 0000 because the three rules collectively do not have any common bits. Each rule may share one or more bits with one other rule; however, that rule does not share one or more bits with each other rule.

As shown in fourth stage 5320, the common match algorithm updates the common match value. Specifically, the common match algorithm of some embodiments takes the current common match value 1010 and the new common match mask 0000, and performs a bitwise AND operation. The bitwise AND operation results in a new common match value with all the bits that are not shared set to 0. Here, as no bits are shared, the new common match value is 0000.

Figure 54:
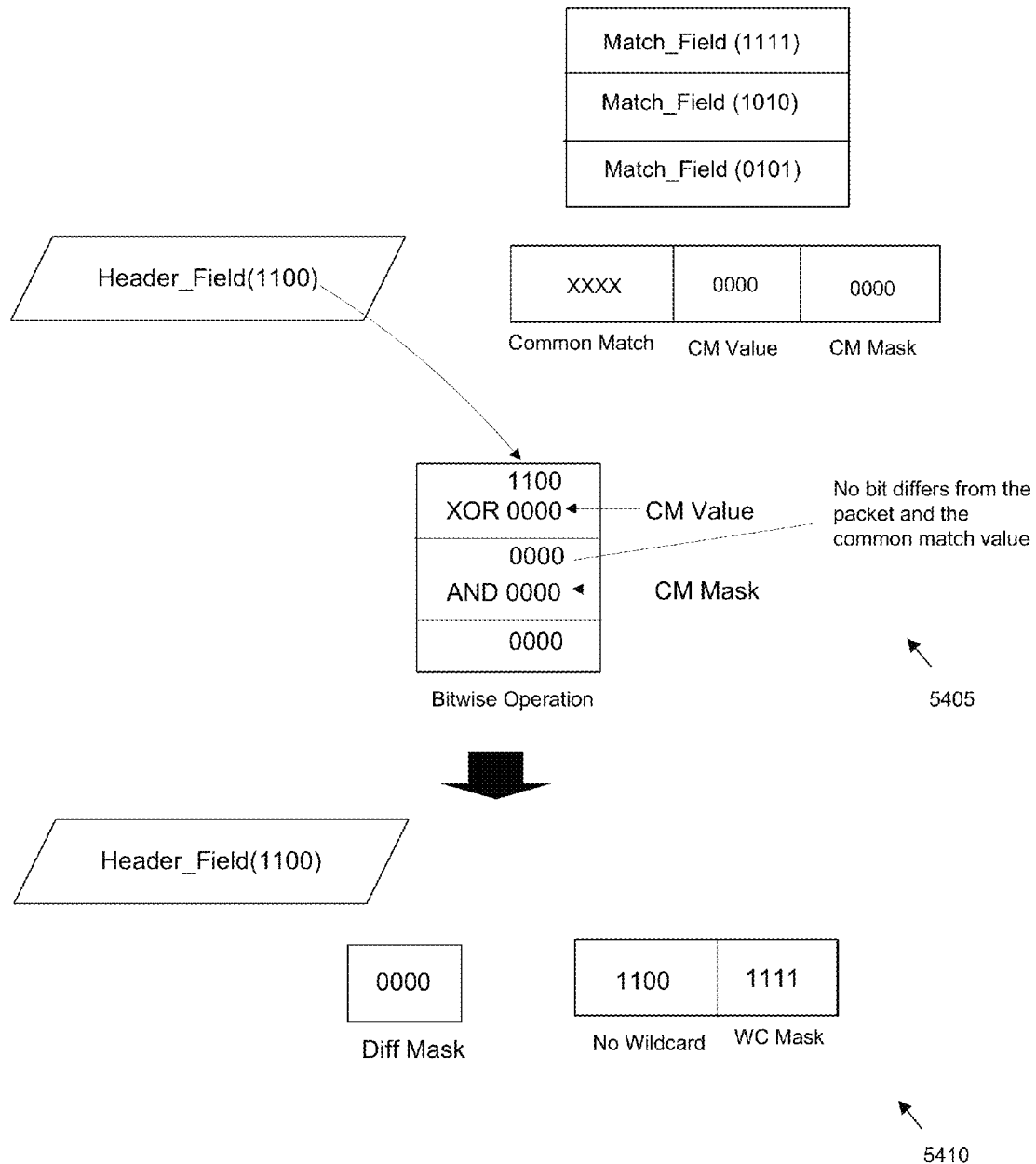
FIG. 54 illustrates another example of using the common match data and packet header data to generate a wildcard mask.

FIG. 54 illustrates another example of using the common match data and packet header data to generate a wildcard mask. Two stages 5405 and 5410 of operations of the common match algorithm are illustrated in the figure. This figure is similar to FIG. 51. However, as the common match mask indicates that the rules share no bits, the end result is a wildcard mask that is completely un-wildcarded (i.e., unmasked). In other words, it does not matter what the packet header value is because the resulting wildcard mask will be the same, which is 1111, where 0 means the corresponding bit is wildcarded, and 1 means it is not wildcarded.

As shown in the first stage 5405 of FIG. 54, the common match algorithm takes the header value (1100) and the common match value (0000), and performs a bitwise XOR operation on those two values. The result of the bitwise XOR operation is a value (0000) that identifies zero or more bits that are different from the packet and the common match value. For instance, the value 0000 indicates that there are no bits that differ from the packet header and the common match value.

In the second stage 5410, the common match algorithm then takes the result of the first bitwise operation and the current common match mask, and performs a bitwise AND operation of those binary numbers. The bitwise AND restricts the one or more differing bits to zero or more bits that are common between each of the rules. The result of the bitwise operations is a differing mask or diff mask that identifies the position of each diff bit. The diff mask is then used to generate the wildcard mask. Here, the diff mask is determined to be 0000. Based on the diff mask, the wildcard mask is then set to 1111, where 1 means un-wildcarded and 0 means wildcarded. Also, the value of the match field 1100 is also shown in the second stage 5410 without any wildcard symbol.

B. Example Multi-Bit Common Match Algorithms

Some embodiments extend the common bit test to include a test of multiple bits if necessary. That is, the multi-bit common match algorithm of some embodiments can be used to disqualify one set of one or more rules using a first bit and each other set of rules using a second different bit. By different, the first bit and each other bit can be at the same bit position if the bits are the same, but the two bits cannot be at the same bit position if the bits are not the same. This is because the packet, depending on the header value, will match one of the two sets of contradictory rules, which means that the one set of rules is not disqualified. Thus, one of the keys to this multi-bit common match algorithm is identifying, from the sets of rules, the different shared bits at different bit positions, where each bit disqualifies at least one set of rule in the sets of rule.

Figure 55:
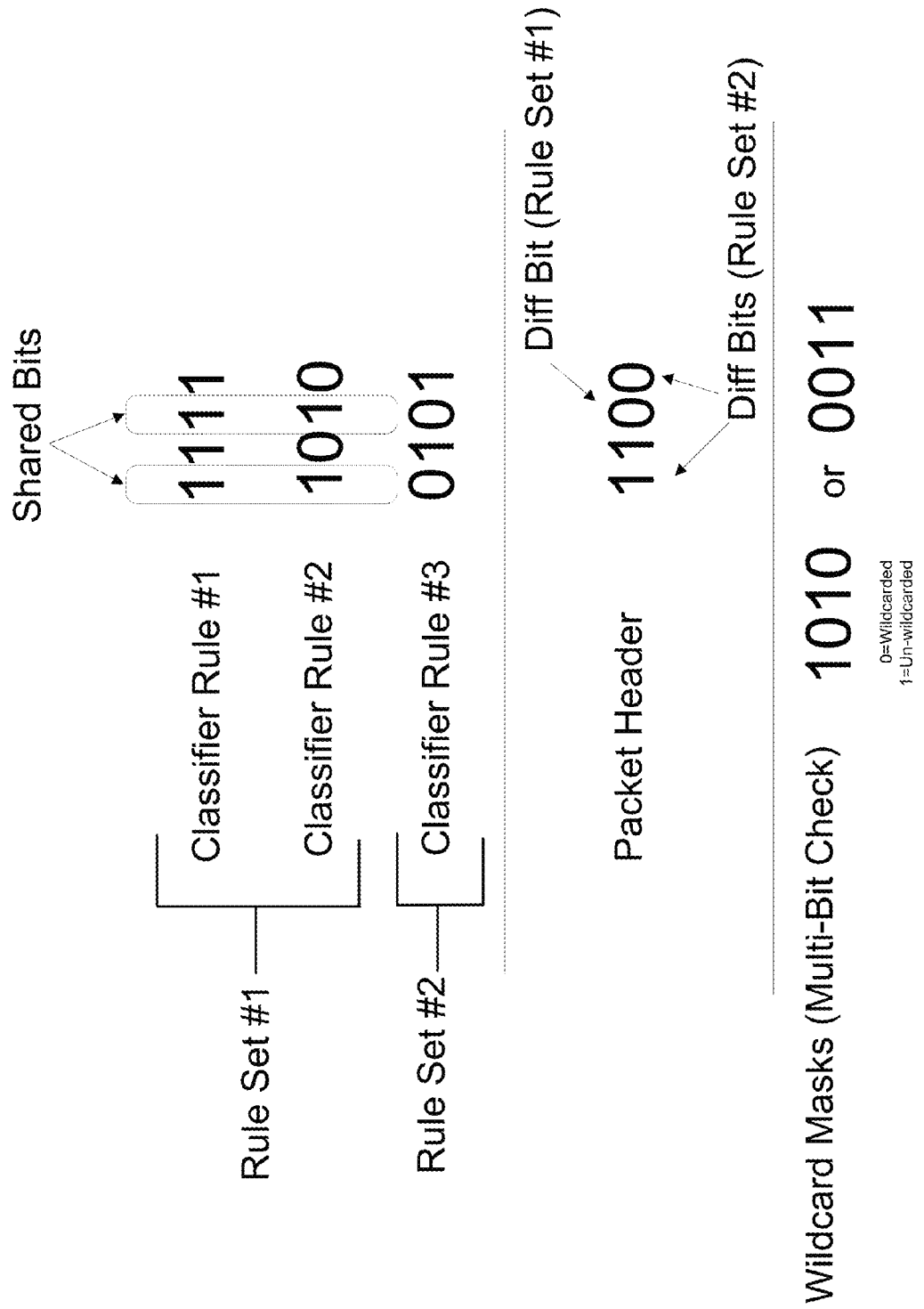
FIG. 55 conceptually illustrates an example of the multi-bit common match algorithm of some embodiments.

FIG. 55 conceptually illustrates an example of the multi-bit common match algorithm of some embodiments. As shown, the figure shows three classifier rules having three rules. To highlight the difference between the one bit approach and the multi-bit approach, this figure shows the same three rules that the one bit approach has determined to collectively have no bits in common, as described above by reference to FIGS. 53 and 30.

As shown in FIG. 55, the first rule has the bits 1111, the second rule has the bits 1010, and the third rule has the bits 0101. The first and second rules share two bits, namely the second and fourth bits. In some embodiments, the multi-bit common match algorithm takes one of the rules (e.g., the first rule) as a baseline and iterates through each next rule in an attempt to find a set of one or more of shared bits. If at least one shared bit is found for that next rule, the algorithm has successively folded the rule into the first common match and proceeds to the next rule. However, if there are no shared bits, the algorithm uses that next rule as a new baseline to compare against each next rule that cannot be folded into the previous common match. For instance, in FIG. 55, the multi-bit algorithm has found the position of the one diff bit based on the two shared bits of the two rules in the first set of rules. The multi-bit algorithm has also found the positions of the two diff bits of the third rule in the second set of rules. Accordingly, the figure shows two possible wildcard masks. There are two possible masks because the second set of rules has two diff bits, and depending on the implementation, the algorithm can choose either one of the two bits.

Figure 56:
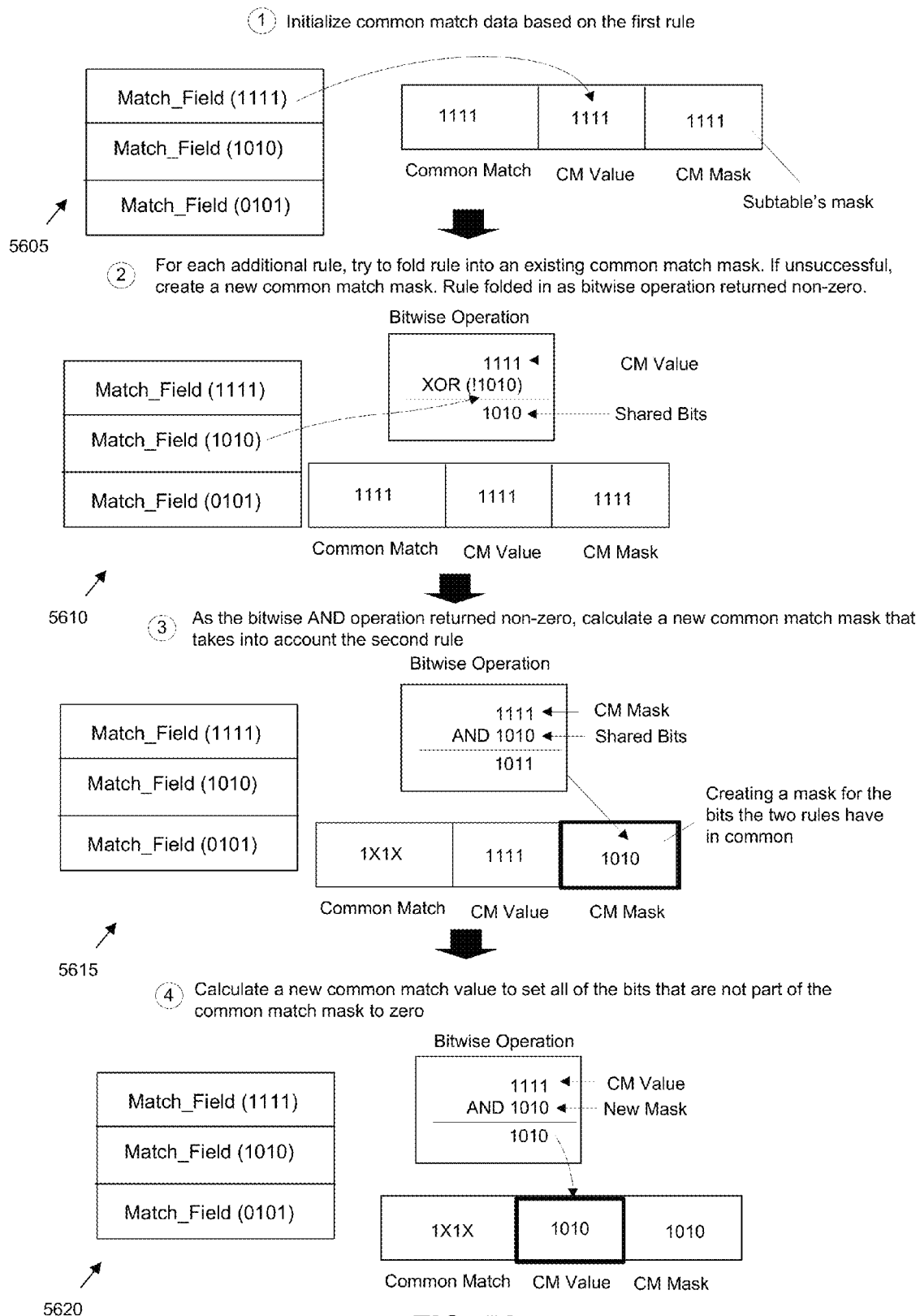
FIG. 56 illustrates an example of generating common match data from two classifier rules.

Different embodiments implement the multi-bit common match algorithm differently. An example implementation of the multi-bit common match algorithm will now be described by reference to FIGS. 56-61. FIG. 56 illustrates an example of generating common match data from two classifier rules. Four stages 5605-5620 of operations of the multi-bit common match algorithm are shown in the figure. The bitwise operations shown in these stages 5605-5620 are the same as the ones described above by reference to FIG. 50. As such, the multi-bit common match algorithm of some embodiments begins in a similar manner as some single bit algorithms.

The first stage 5605 shows creating common match data set and initializing data set using the first classifier rule. The common match data includes a value and a mask. As mentioned above, the common match mask identifies which one or more bits a set of one or more rules have in common with one another, and the position of each shared bit. The common match value identifies the value of each shared bit.

In the second stage 5610, the common match value is set to 1111 using the first classifier rule. The common match mask is also set to 1111, which means that the first rule shares all bits with itself. The common match value shows the value of those shared bits. The common match data is also represented as 1111, where X means the bit is not shared, 1 means the bit is shared and the value is 1, and 0 also means the bit is shared and the value is 0.

In the second stage 5410, the algorithm takes the second rule and begins the process of folding the second rule into the common match data. The common match algorithm of some embodiments folds a rule into the common match data by first determining which set of one or more bits the second rule share with the current common match mask. In the example of the second stage 5010, the common match algorithm generates the shared bit by taking the common match value (1111) from the common match data and taking the bitwise NOT of the second rule (!1010), and performing the logical exclusive OR (XOR) operation on each pair of corresponding bits. The result of the XOR operation is a value (1010), which identifies the bits that the second rule shares with the common match mask.

The third stage 5415 shows the continuation of the fold operation. Specifically, the second portion of the fold operation entails calculating a new common match data that takes into account the second rule. In the example of third stage 5020, the algorithm of some embodiments performs a bitwise AND operation between the current common match mask (1111) and the calculated shared bits (1010). The bitwise AND operation sets each bit that is not shared between the shared bits with the current common match mask to 0. The result of the bitwise AND operation is a new common match mask that encompasses both the first and second rules. As shown, since the second rule contains the bits 1010, the first and third bits are no longer shared with the first rule. Hence, the common match mask is set to 1010, which means that the first and third bits are not shared, and the second and fourth bits are shared.

In some embodiments, the fold operation is successful if the result of the bitwise operations results in a common match mask having at least one bit that is set to 1. This means that the common match mask cannot be all zeroes. The reason for this is that, once all the bits are set to zero, the rules collectively have nothing in common. For instance, each time a new rule is evaluated, the algorithm might set one or more bits to zeroes if the common match is different from the new rule. If the new rule sets each remaining 1s to 0s, then the common match data set cannot be used to at least disqualify the first set of rules. This idea will be further clarified in the next figure.

In the fourth stage 5420, the common match algorithm of some embodiments updates the common match value. Specifically, the algorithm performs a bitwise operation to set all of the bits that are not part of the common match to zero. The algorithm of some embodiments performs this for cleanliness. As shown, the algorithm of some embodiments performs a bitwise AND operation between the current common match value (1111) and the new common match mask (1010). The bitwise operation sets each bit that is not common between the two rules to 0. The result of the bitwise operation is the new common match value, in some embodiments.

Figure 57:
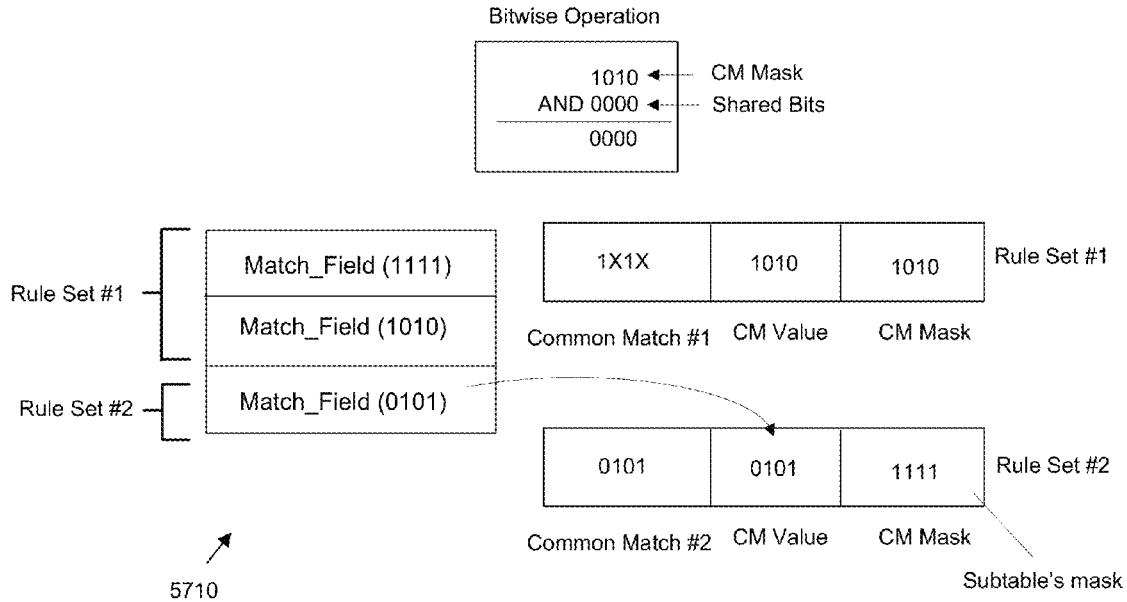
FIG. 57 illustrates an example of creating a new common match data set for a rule if the rule cannot be folded into a previously generated common match data set.

In the example described above, the second rule has been successfully folded into the common match data. This is because the bitwise operations resulted in a common match mask having at least one bit set to 1, which means that the first two rules shares at least one bit. FIG. 57 illustrates an example of creating a new common match data set for a rule if the rule cannot be folded into a previously generated common match data set. Two operational stages 5705 and 5710 of the multi-bit common match algorithm of some embodiments are shown in this figure. These stages 5705 and 5710 are a continuation of the ones shown in the previous figure. Also, when compared with FIG. 53, these stages 5705 and 5710 show one of the key differences between the single bit common match and the multi-bit common match algorithms. The key difference being that the multi-bit algorithm of some embodiments creates an array of common match data sets for the multi-bit test.

In the second stage 5705, the multi-bit common match algorithm starts the process of folding the third rule into the common match data set. The multi-bit common match algorithm of some embodiments takes the bitwise NOT of the match field value (!0101) of the third rule and the current common value (1010), and once again performs a bitwise XOR operation on those two values. The result of the bitwise XOR operation is a value, which identifies each shared bit between the match field value and the current common match value. Here, the result of the operation is 0000, which means that there are no shared bits.

In the second stage 5710, the multi-bit common match algorithm determines that the fold operation of the third rule into the existing common match data set has failed and creates a new common match data set that encompasses the third rule. Specifically, the multi-bit common match algorithm once again performs the bitwise AND operation using the current common match mask (1010) and the shared bit value (0000). The result of the bitwise AND operation is the new common match mask.

As mentioned above, the fold operation is successful if the result of the bitwise operations results in a common match mask data set having at least one bit that is set to 1. This means that the common match mask cannot be all zeroes. The reason for this is that, once all the bits are set to zero, the rules collectively have nothing in common. For instance, in the example of the second stage 5710, the new common mask is 0000 because the three rules collectively do not have any common bits.

Accordingly, in the third stage 5715, the multi-bit common match algorithm does not update the existing common match data set (e.g., the common match mask) but creates a second new common match data set that encompasses the third rule. The second common match data set is initialized in a similar manner as the first common match data set. Specifically, the common match value is set to 0101 using the value of third classifier rule. The common match mask is also set to 1111, which means that the third rule shares all bits with itself. The common match value shows the value of those shared bits. The second common match data set is also represented as 0101, where X means the bit is not shared, 1 means the bit is shared and the value is 1, and 0 also means the bit is shared and the value is 0.

In the example described above, the multi-bit common match algorithm of some embodiments create a second new common match dataset to account for the third rule that cannot be folded into the first common match data set. In some embodiments, the multi-bit common match algorithm attempts to fold each rule into each existing common match data set. In other words, the multi-bit common match algorithm iterates through each common match data set attempting to fold the rule into the common match data set. If the fold is successful, the multi-bit common match algorithm updates the corresponding common match data set and moves onto the next rule. However, if the fold is unsuccessful, the multi-bit common match algorithm creates another common match data set.

Figure 58:
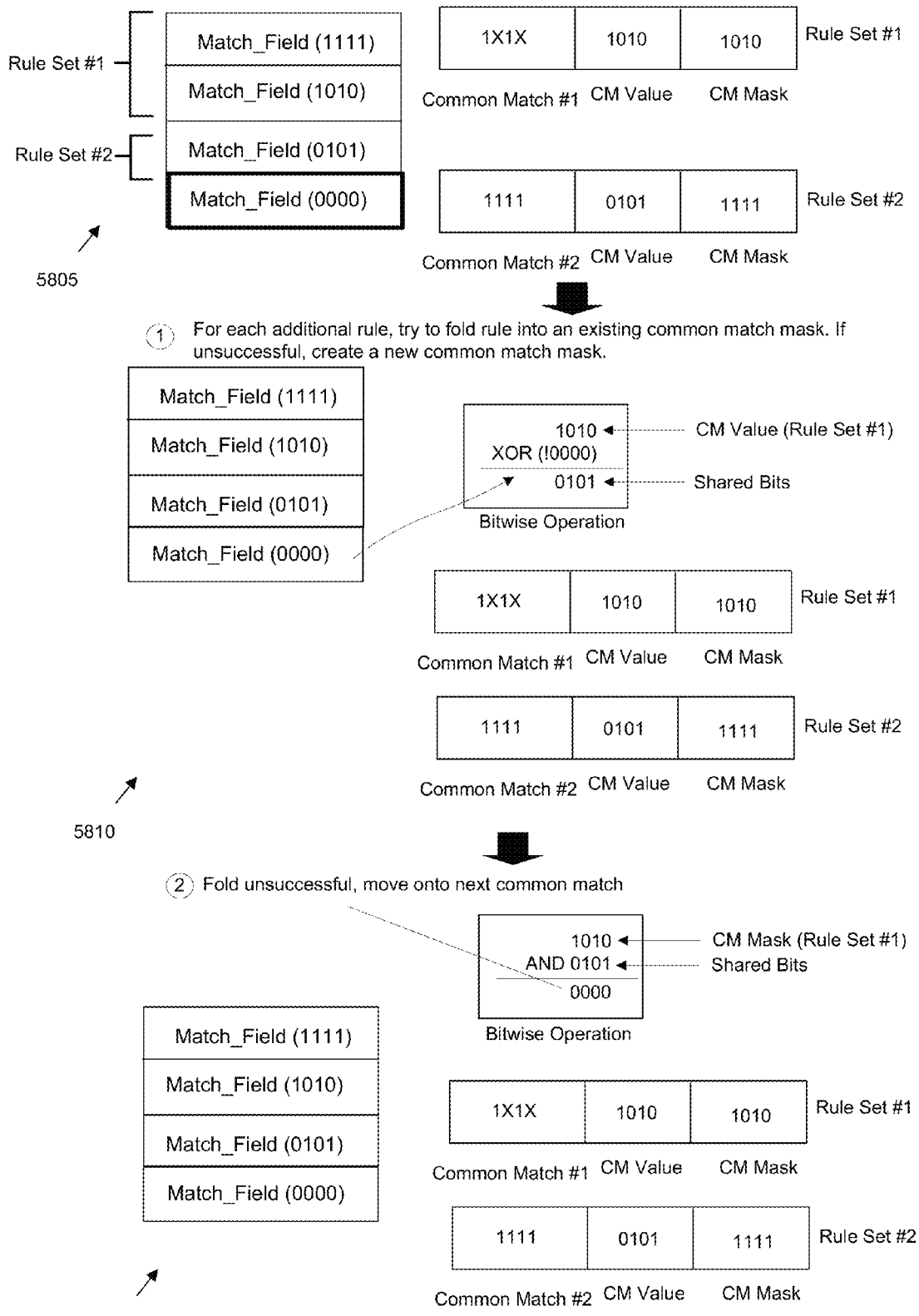
FIG. 58 illustrates another example of how the multi-bit common match algorithm attempts to fold a rule into an existing common match data set.

FIG. 58 illustrates another example of how the multi-bit common match algorithm attempts to fold a rule into an existing common match data set. Three operational stages 5805-5815 of the multi-bit common match algorithm of some embodiments are shown in the figure. These stages are a continuation of the ones shown in FIG. 57. The first stage 5805 shows that, in addition to the three existing classifier rules, there is a new rule with the value 0000. The first stage 5805 also shows that multi-bit common match algorithm of some embodiments can re-use the previously generated common match data sets.

In the second stage 5705, the multi-bit common match algorithm starts the process of folding the fourth rule into the common match data set. The multi-bit common match algorithm of some embodiments takes the bitwise NOT of the match field value (!0000) of the fourth rule and the current common value (1010) of the first common match data set, and once again performs a bitwise XOR operation on those two values. The result of the bitwise XOR operation is a value, which identifies each shared bit between the match field value and the current common match value. Here, the result of the operation is 0101, which means that the first and third bits are shared between the common match mask and the value of the fourth rule.

In the third stage 5715, the multi-bit common match algorithm determines that the fold operation of the fourth rule into the first common match data set has failed. Specifically, the multi-bit common match algorithm once again performs the bitwise AND operation using the current common match mask (1010) and the shared bit value (0101). The result of the bitwise AND operation is 0000. This means that the first, second, and fourth rules collectively have no bits in common.

Figure 59:
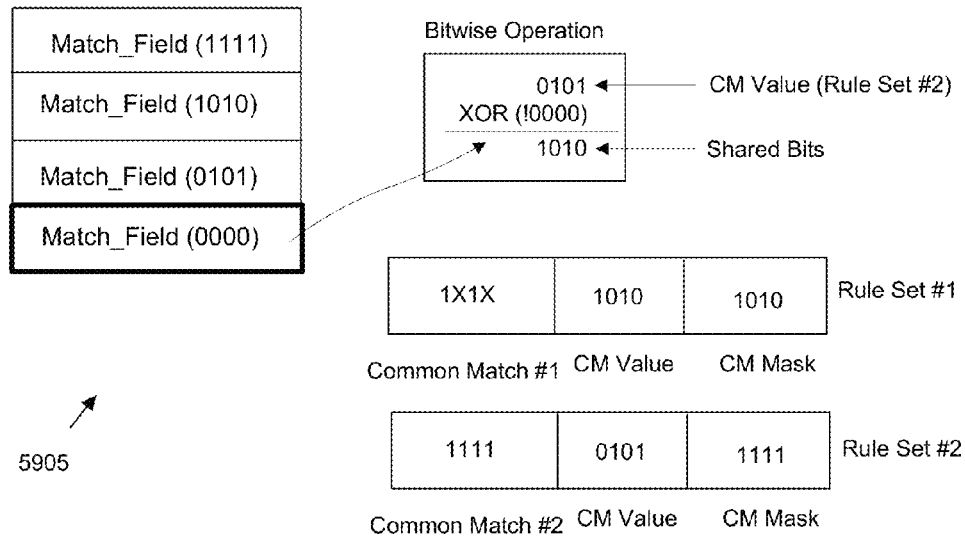
FIG. 59 illustrates an example of how the multi-bit common match algorithm attempts to fold a rule into the second common match data set because it failed to fold that same rule into the first common match data set
Figure 59:
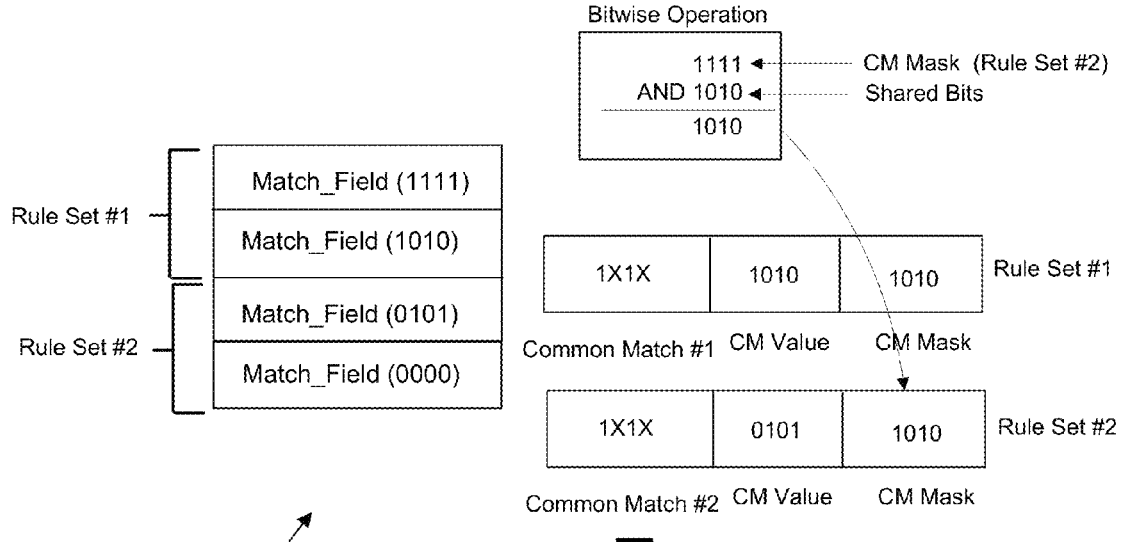

FIG. 59 illustrates an example of how the multi-bit common match algorithm attempts to fold a rule into the second common match data set because it failed to fold that same rule into the first common match data set. Two operational stages 5905-5910 of the multi-bit common match algorithm of some embodiments are shown in the figure. These stages are a continuation of the ones shown in FIG. 58. In the first stage 5905, the multi-bit common match algorithm starts the process of folding the fourth rule into the second common match data set. The multi-bit common match algorithm of some embodiments takes the bitwise NOT of the match field value (!0000) of the fourth rule and the current common value (0101) of the second common match data set, and once again performs a bitwise XOR operation on those two values. The result of the bitwise XOR operation is a value, which identifies each shared bit between the match field value and the current common match value. Here, the result of the operation is 1010, which means that the second and fourth bits are shared between the common match mask and the value of the fourth rule.

In the second stage 5710, the multi-bit common match algorithm successfully folds the fourth rule into the second common match data set. Specifically, the multi-bit common match algorithm once again performs the bitwise AND operation using the current common match mask (1111) of the second common match data set and the calculated shared bit value (1010). The result of the bitwise AND operation is 1010. This value indicates that the second and fourth rules have the second and fourth bits in common with one another.

Figure 60:
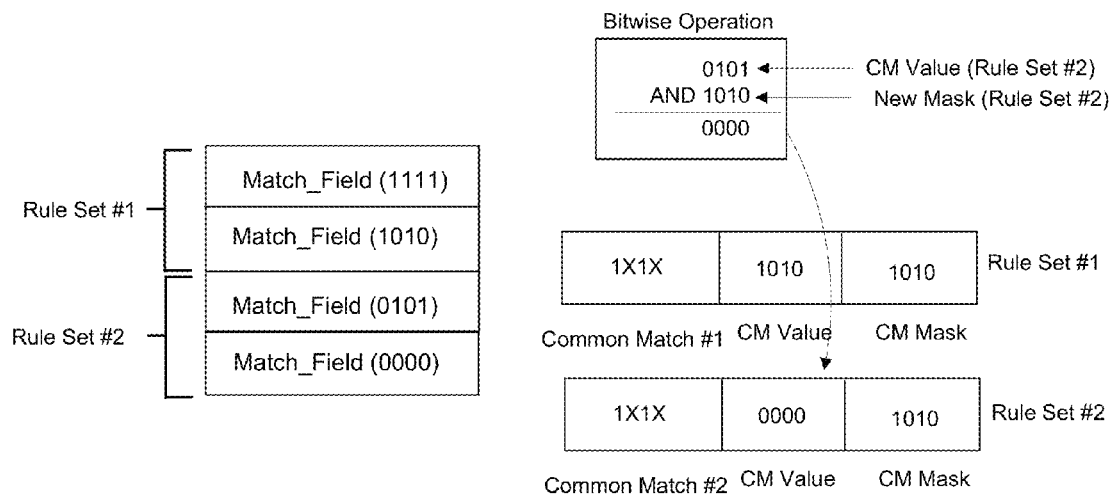
FIG. 60 illustrates an example of updating the common match data associated with a common match data set.

FIG. 60 illustrates an example of updating the common match data associated with a common match data set. This figure is a continuation of the previous figure. The figure shows the common match algorithm updating the common match value of the second common match data set by taking the current common match value and the new common match mask, and performing a bitwise AND operation. The bitwise operation sets each bit that is not common between the two rules to 0. The result of the bitwise operation is the new common match value for the second common match data set, in some embodiments.

Figure 61:
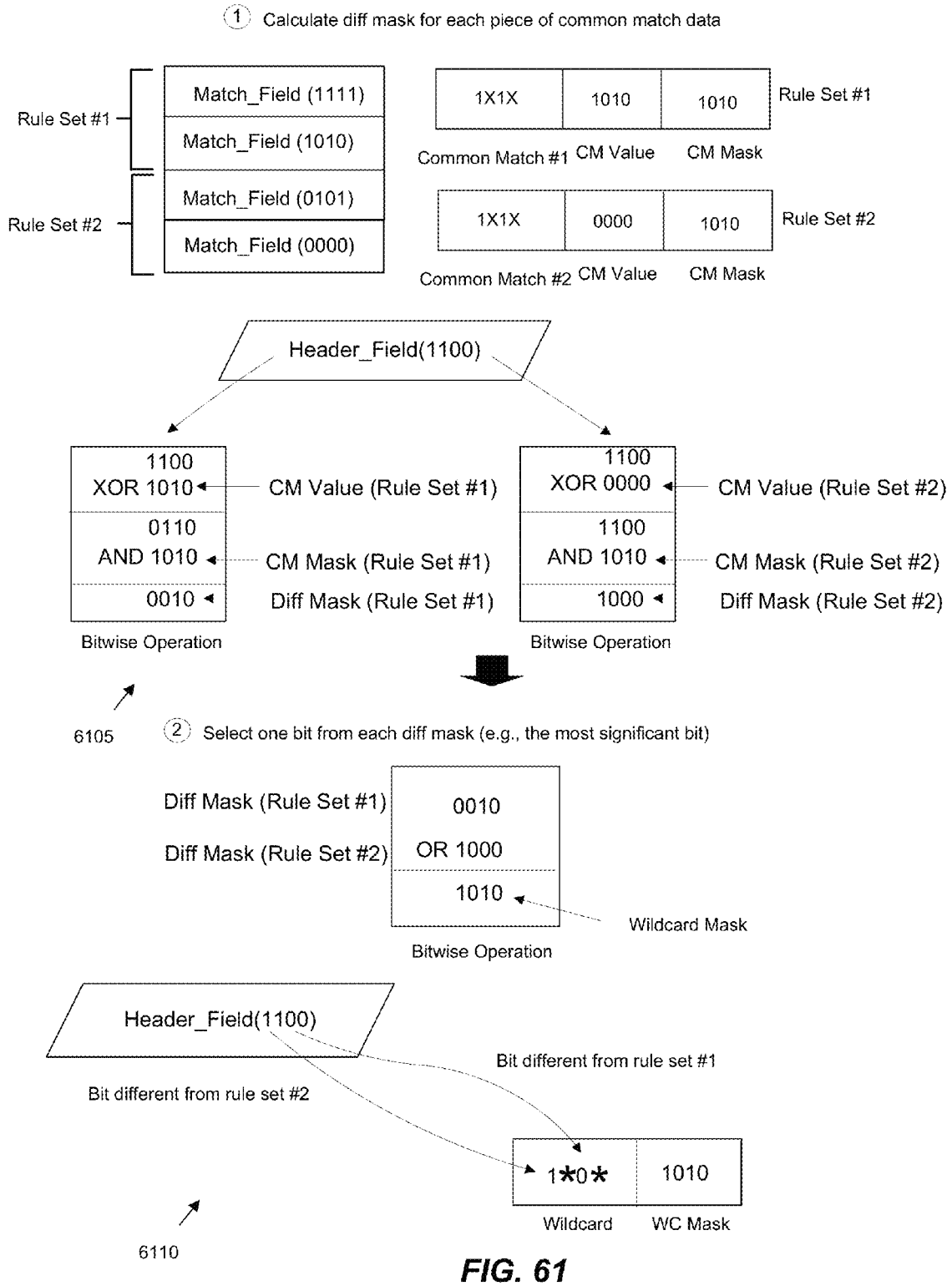
FIG. 61 illustrates an example of using the first and second common match data sets to generate a wildcard mask.

FIG. 61 illustrates an example of using the first and second common match data sets to generate a wildcard mask. Two stages 6105 and 6110 of operations of the multi-bit common match algorithm of some embodiments are illustrated in the figure. This figure is similar to the single bit common match algorithm shown in FIG. 51. However, the wildcard mask is generated by taking one bit from each common match data set and un-wildcarding the corresponding bit from the wildcard mask.

In the first stage 6105, the multi-bit common match algorithm takes the header value and the common match value of the first common match data set, and performs a bitwise XOR operation on those two values. The result of the bitwise XOR operation is a value that identifies zero or more bits that are different from the packet and the common match value. The multi-bit common bit algorithm then takes that calculated value and the current common mask value of the first common match data set to generate a first diff mask. The multi-bit common match algorithm does the same for the second common match data set to generate a second diff mask.

As shown in the second stage, the two diff masks are associated with two different sets of rules. Also, as shown, the common match algorithm of some embodiments takes one bit from each diff bit and un-wildcarding the corresponding bit of the wildcard mask. In some embodiments, the common match algorithm performs a bitwise OR operation and the result is the wildcard mask.

One of ordinary skill in the art would that the implementations of the different single bit or multi-bit common match algorithms are example implementations and that different embodiments might implement the algorithms differently. One of ordinary skill in the art would also understand that different embodiments could use different operations (e.g., replace several bitwise operations with different ones). Further, one of ordinary skill in the art would understand each algorithm (e.g., the single bit versions, the multi-bit versions) could be performed following a different order of operations. For instance, in several of the examples described above, the common match algorithms start with the first rule to generate the common match data, and compare that common match data to each other rule.

Figure 63:
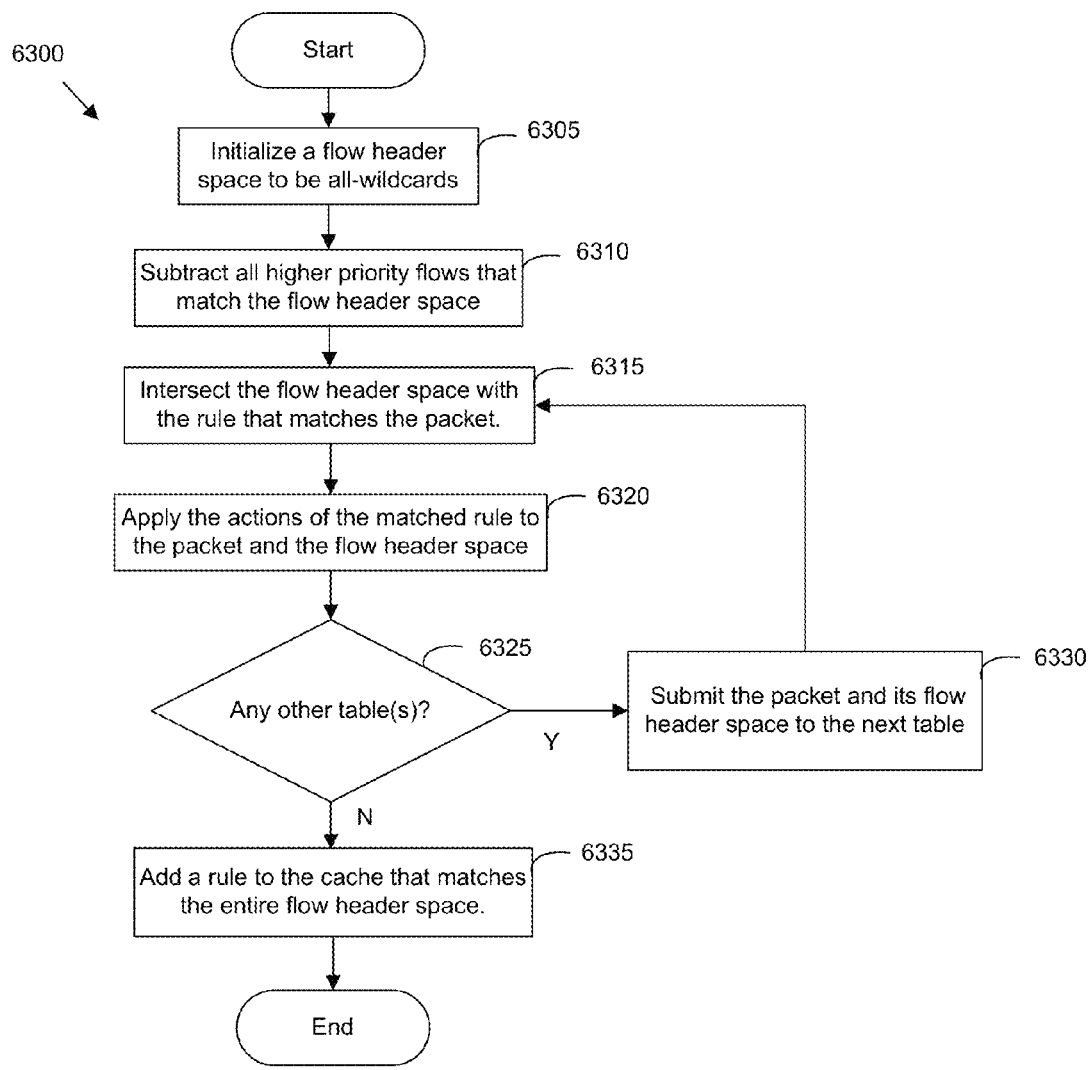
FIG. 63 illustrates an example of how different common match algorithms can start with a packet rather than a rule.

Instead of a rule, the common match algorithms or the multi-bit common match algorithms can start with the packet header value. FIG. 63 illustrates an example of how different common match algorithms can start with a packet rather than a rule. For the single bit common match, the algorithm of some embodiments can begin with the complement of the packet, try to find a common match amongst (e.g., higher priority) rules, and un-wildcard one bit from the common match if it finds one. For the multi-bit approach, the algorithm can begin with the complement of the packet and try to find a common match amongst (e.g., higher priority) rules. The algorithm can stop, when there no longer exist any common bits to the rules, and create a new common match bit array for the remaining rules. By the end of examining (e.g., the higher priority rules), there is a list of bitarrays that each match a section of the rules and differ from the packet. The algorithm can then un-wildcard one bit from each of these common match bitarrays to produce a flow that is unique to the packet but differs from all (e.g., higher priority) flows. The problem with these approaches is that the common match data set or data sets are computed each time a classification engine receives a new packet. Whereas, in several of the implementations described above, the common match data or data sets can be reused in some manner once they are generated.

VIII. Example Datapath Flows

FIG. 64 illustrates several examples of flows 6400 that are stored in a datapath cache. In some embodiments, the flows are stored in the datapath cache based on the number of flows that are currently stored in the cache. For example, if the switching element is not heavily loaded, a flow will stay in the cache if it was not used within a particular time period (e.g., five seconds). If the flow was not used within the particular time period, the flow may be dropped from the cache. Once the datapath reaches a certain threshold number, the switching element may change how long a flow stays in the cache. For example, if the cache is heavily loaded, a flow might only last a hundred milliseconds if it was not used. In some embodiments, the userspace makes the decisions about how long a flow stays in the cache based on how recently it was used and/or the amount of flows in the datapath cache.

In the example of FIG. 64, the datapath 6400 includes two flows. Each of these flows has the Ethernet sources and destination match fields un-wildcarded. The remaining fields are all wildcarded. Specifically, the IP source, IP destination, protocol, time to live, time of service, fragment, (Internet Control Message Protocol) ICMP type, and IMCP code match fields have all been wildcarded. Each flow is also associated with several other values such as byte size, last used, packets, and action.

IX. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 65:
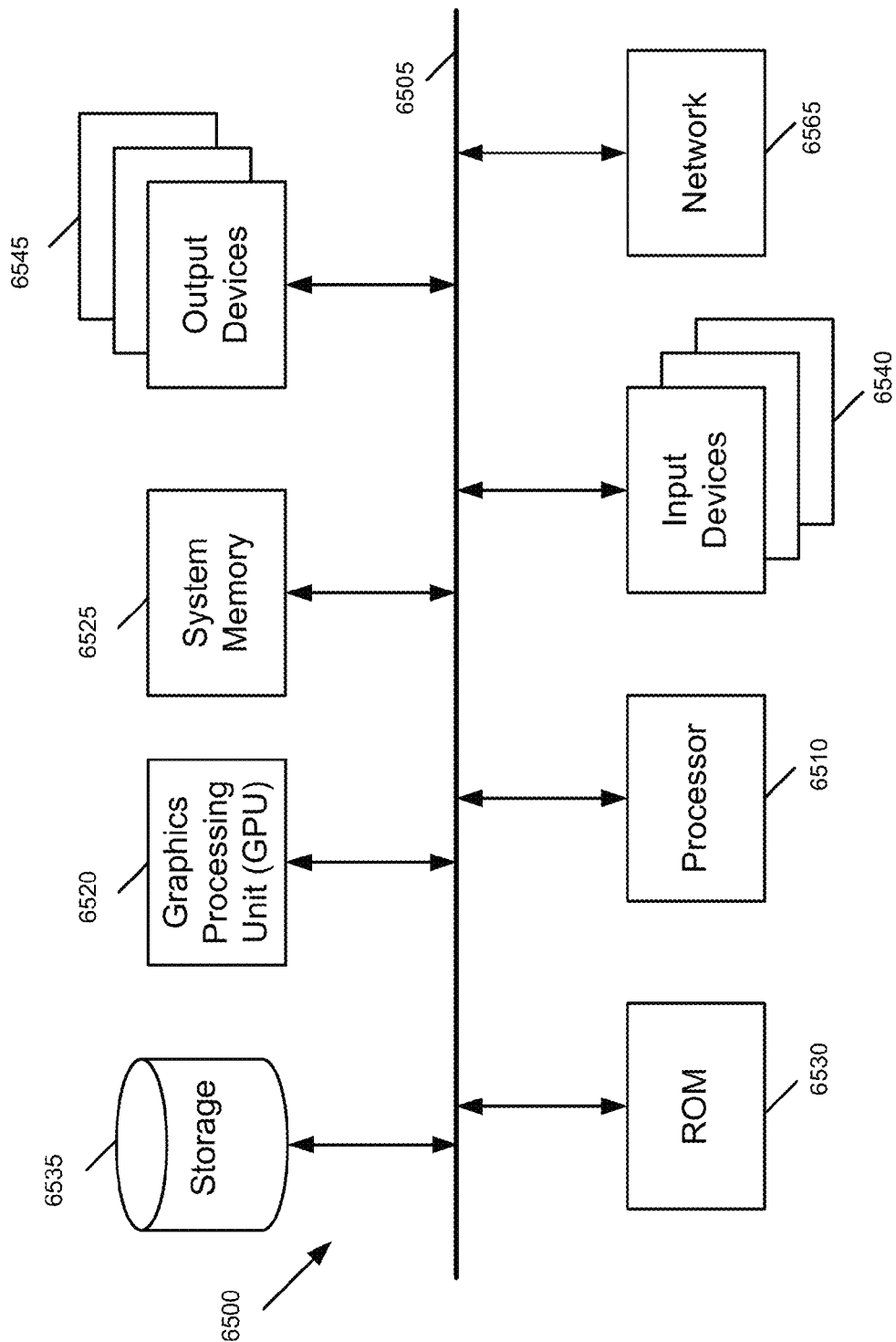
FIG. 65 conceptually illustrates an electronic system with which some embodiments of the invention are implemented.

FIG. 65 conceptually illustrates an electronic system 6500 with which some embodiments of the invention are implemented. The electronic system 6500 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 6500 includes a bus 6505, processing unit(s) 6510, a system memory 6525, a read-only memory 6530, a permanent storage device 6535, input devices 6540, and output devices 6545.

The bus 6505 collectively represents all system, peripheral, and chipset buses that communicatively connect the numerous internal devices of the electronic system 6500. For instance, the bus 6505 communicatively connects the processing unit(s) 6510 with the read-only memory 6530, the system memory 6525, and the permanent storage device 6535.

From these various memory units, the processing unit(s) 6510 retrieves instructions to execute and data to process in order to execute the processes of the invention. The processing unit(s) may be a single processor or a multi-core processor in different embodiments.

The read-only-memory (ROM) 6530 stores static data and instructions that are needed by the processing unit(s) 6510 and other modules of the electronic system. The permanent storage device 6535, on the other hand, is a read-and-write memory device. This device is a non-volatile memory unit that stores instructions and data even when the electronic system 6500 is off. Some embodiments of the invention use a mass-storage device (such as a magnetic or optical disk and its corresponding disk drive) as the permanent storage device 6535.

Other embodiments use a removable storage device (such as a floppy disk, flash memory device, etc., and its corresponding drive) as the permanent storage device. Like the permanent storage device 6535, the system memory 6525 is a read-and-write memory device. However, unlike storage device 6535, the system memory 6525 is a volatile read-and-write memory, such a random access memory. The system memory 6525 stores some of the instructions and data that the processor needs at runtime. In some embodiments, the invention's processes are stored in the system memory 6525, the permanent storage device 6535, and/or the read-only memory 6530. From these various memory units, the processing unit(s) 6510 retrieves instructions to execute and data to process in order to execute the processes of some embodiments.

The bus 6505 also connects to the input and output devices 6540 and 6545. The input devices 6540 enable the user to communicate information and select commands to the electronic system. The input devices 6540 include alphanumeric keyboards and pointing devices (also called "cursor control devices"), cameras (e.g., webcams), microphones or similar devices for receiving voice commands, etc. The output devices 6545 display images generated by the electronic system or otherwise output data. The output devices 6545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 65, bus 6505 also couples electronic system 6500 to a network 6565 through a network adapter (not shown). In this manner, the computer can be a part of a network of computers (such as a local area network ("LAN"), a wide area network ("WAN"), or an Intranet, or a network of networks, such as the Internet. Any or all components of electronic system 6500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 5, 16, 17, 19, 21, 26, 36, 39, 46, 48, and 63) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for a forwarding element that forwards packets, the method comprising:

receiving a packet;

defining a wildcard mask comprising a plurality of bits, each bit in the wildcard mask (i) corresponding to a bit in a header of the packet and (ii) initially set as a wildcard bit;

performing a first stage lookup, of a hash table comprising a set of rules, for a first hash of a first set of fields of the header of the packet and un-wildcarding a first set of bits of the wildcard mask that corresponds to the first set of fields;

if a matching hash is found in the first stage lookup, performing a second stage lookup of the hash table for a second hash of a second set of fields of the header of the packet and un-wildcarding a second set of bits of the wildcard mask that corresponds to the second set of fields;

identifying a matching rule for the packet based on the first stage lookup of the hash table and the second stage lookup of the hash table; and generating a flow entry comprising a set of un-wildcarded bits based on the matching rule and the un-wildcarded first and second sets of bits of the wildcard mask, wherein the flow entry is used to process other packets that match each un-wildcarded bit of the flow entry.

2. The method of claim 1, wherein the first stage lookup is performed on a first stage of the hash table, the method further comprising, prior to performing the second stage lookup, determining whether the hash table comprises a second stage.

3. The method of claim 1, wherein the hash table is a first hash table, the method further comprising performing a first stage lookup of a second, different, hash table for a third hash of a third set of fields of the packet header and un-wildcarding bits of the wildcard mask that corresponds to the third set of fields of the packet header.

4. The method of claim 3, wherein each of the first and second hash tables is searched in order based on a maximum priority value associated with the hash table.

5. The method of claim 4 further comprising, prior to performing the first stage lookup of the second hash table, determining whether to search the second hash table based on the maximum priority value associated with the second hash table.

6. The method of claim 1, wherein the hash table comprises a plurality of stages comprising at least one of a first stage associated with a set of register or metadata fields, a second stage associated with a set of metadata and network layer 2 (L2) fields, a third stage associated with a set of metadata, L2, and network layer 3 (L3) fields; and a fourth stage associated with each set of fields, wherein each of said first stage lookup of the hash table and the second stage lookup of the hash table lookup one of said plurality of stages of the hash table.

7. The method of claim 6, wherein the lookup of the hash table is performed on each stage of the hash table in an order starting with the first stage if the corresponding stage in included in the hash table and the lookup results in a match.

8. A non-transitory machine readable medium storing a program that when executed by at least one processing unit forwards packets, the program comprising sets of instructions for:
receiving a packet;
defining a wildcard mask comprising a plurality of bits, each bit in the wildcard mask (i) corresponding to a bit in a header of the packet and (ii) initially set as a wildcard bit;
performing a first stage lookup, of a hash table comprising a set of rules, for a first hash of a first set of fields of the header of the packet and un-wildcarding a first set of bits of the wildcard mask that corresponds to the first set of fields;
performing, if a matching hash is found in the first stage lookup, a second stage lookup of the hash table for a second hash of a second set of fields of the header of the packet and un-wildcarding a second set of bits of the wildcard mask that corresponds to the second set of fields;
identifying a matching rule for the packet based on the first stage lookup of the hash table and the second stagelookup of the hash table; and
generating a flow entry comprising a set of un-wildcarded bits based on the matching rule and the un-wildcarded first and second sets of bits of the wildcard mask, wherein the flow entry is used to process other packets that match each un-wildcarded bit of the flow entry.

9. The non-transitory machine readable medium of claim 8, wherein the first stage lookup is performed on a first stage of the hash table, wherein the program further comprises a set of instructions for determining, prior to performing the second stage lookup, whether the hash table comprises a second stage.

10. The non-transitory machine readable medium of claim 8, wherein the hash table is a first hash table, the program further comprising a set of instructions for performing a first stage lookup of a second, different, hash table for a third hash of a third set of fields of the packet header and un-wildcarding bits of the wildcard mask that corresponds to the third set of fields of the packet header.

11. The non-transitory machine readable medium of claim 10, wherein each of the first and second hash tables is searched in order based on a maximum priority value associated with the corresponding hash table.

12. The non-transitory machine readable medium of claim 11, wherein the program further comprises a set of instructions for determining, prior to performing the first stage lookup of the second hash table, whether to search the second hash table based on the maximum priority value associated with the second hash table.

13. The non-transitory machine readable medium of claim 8, wherein the hash table comprises a plurality of stages comprising at least one of a first stage associated with a set of register or metadata fields, a second stage associated with a set of metadata and network layer 2 (L2) fields, a third stage associated with a set of metadata, L2, and network layer 3 (L3) fields; and a fourth stage associated with each set of fields, wherein each of said first stage lookup of the hash table and the second stage lookup of the hash table looks up one of said plurality of stages of the hash table.

14. The non-transitory machine readable medium of claim 13, wherein the lookup of the hash table is performed on each stage of the hash table in an order starting with the first stage if the corresponding stage in included in the hash table and the lookup results in a match.

15. A computing device comprising:
at least one processing unit; and
a storage, which stores a program that when executed by the at least one processing unit implements a forwarding element, the program comprising sets of instructions for:
receiving a packet;
defining a wildcard mask comprising a plurality of bits, each bit in the wildcard mask (i) corresponding to a bit in a header of the packet and (ii) initially set as a wildcard bit;
performing a first stage lookup, of a hash table comprising a set of rules, for a first hash of a first set of fields of the header of the packet and un-wildcarding a first set of bits of the wildcard mask that corresponds to the first set of fields;
performing, if a matching hash is found in the first stage lookup, a second stage lookup of the hash table for a second hash of a second set of fields of the header of the packet and un-wildcarding a second set of bits of the wildcard mask that corresponds to the second set of fields;
identifying a matching rule for the packet based on the first stage lookup of the hash table and the second stage lookup of the hash table; and
generating a flow entry comprising a set of un-wildcarded bits based on the matching rule and the un-wildcarded first and second sets of bits of the wildcard mask, wherein the flow entry is used to process other packets that match each un-wildcarded bit of the flow entry.

16. The computing device of claim 15, wherein the first stage lookup is performed on a first stage of the hash table, wherein the program further comprises a set of instructions for determining, prior to performing the second stage lookup, whether the hash table comprises a second stage.

17. The computing device of claim 15, wherein the hash table is a first hash table, wherein the program further comprises a set of instructions for performing a first stage lookup of a second, different, hash table for a third hash of a third set of fields of the packet header and un-wildcarding bits of the wildcard mask that corresponds to the third set of fields of the packet header.

18. The computing device of claim 17, wherein each of the first and second hash tables is searched in order based on a maximum priority value associated with the hash table.

19. The computing device of claim 18, wherein the program further comprises a set of instructions for determining, prior to performing the first stage lookup of the second hash table, whether to search the second hash table based on the maximum priority value associated with the second hash table.

20. The computing device of claim 15, wherein the s hash table comprises a plurality of stages comprising at least one of a first stage associated with a set of register or metadata fields, a second stage associated with a set of metadata and network layer 2 (L2) fields, a third stage associated with a set of metadata, L2, and network layer 3 (L3) fields; and a fourth stage associated with each set of fields, wherein each of said first stage lookup of the hash table and the second stage lookup of the hash table looks up one of said plurality of stages of the hash table.

\* \* \* \* \*